(12) United States Patent
Mallett

(10) Patent No.: US 11,792,463 B2
(45) Date of Patent: Oct. 17, 2023

(54) METHOD OF VIDEO TRANSMISSION AND DISPLAY

(71) Applicant: TV ONE Limited, Margate (GB)

(72) Inventor: Richard Peter Disney Mallett, Margate (GB)

(73) Assignee: TV ONE Limited, Margate (GB)

(*) Notice: Subject to any disclaimer, the term of this patent is extended or adjusted under 35 U.S.C. 154(b) by 0 days.

(21) Appl. No.: 17/237,807

(22) Filed: Apr. 22, 2021

(65) Prior Publication Data

US 2021/0314647 A1     Oct. 7, 2021

Related U.S. Application Data

(63) Continuation of application No. 16/530,826, filed on Aug. 2, 2019, now abandoned, which is a (Continued)

(30) Foreign Application Priority Data

Feb. 3, 2017 (GB) ........................ 1701859
Feb. 3, 2017 (GB) ........................ 1701860

(51) Int. Cl.
*H04N 21/41* (2011.01)
*H04N 21/239* (2011.01)
(Continued)

(52) U.S. Cl.
CPC ....... *H04N 21/4122* (2013.01); *G06F 3/1446* (2013.01); *H04N 19/33* (2014.11);
(Continued)

(58) Field of Classification Search
CPC ........... H04N 21/4122; H04N 21/2393; H04N 21/41415; H04N 21/437; H04N 21/4622;
(Continued)

(56) References Cited

U.S. PATENT DOCUMENTS 5,481,297 A * 1/1996 Cash .................. H04N 7/152
348/E7.083
5,623,308 A * 4/1997 Civanlar .......... H04N 21/44004
375/240.21
(Continued)

FOREIGN PATENT DOCUMENTS

CN       101937325 A  *  1/2011
CN       101937325 B     7/2012
(Continued)

OTHER PUBLICATIONS

International Search Report and Written Opinion dated May 15, 2018 for PCT Application No. PCT/GB2018/050318.
(Continued)

*Primary Examiner* — Robert J Hance
(74) *Attorney, Agent, or Firm* — EIP US LLP

(57) ABSTRACT

Aspects of the present disclosure relate to a method, in a video output device, for acquiring video data for outputting to a display. The method comprises subscribing to a multicast stream of a plurality of multicast streams. Each multicast stream is streamed from a video source and comprises video frame data corresponding to a portion of a video frame. The multicast stream to which the video output device subscribes comprises video frame data that is for display on a display associated with the video output device. The method then comprises receiving the video frame data that is for display on the display.

10 Claims, 35 Drawing Sheets

Related U.S. Application Data continuation of application No. PCT/GB2018/050318, filed on Feb. 2, 2018.

(51) Int. Cl.
| | |
|---|---|
| *H04N 19/59* | (2014.01) |
| *H04N 19/33* | (2014.01) |
| *G06F 3/14* | (2006.01) |
| *H04N 21/414* | (2011.01) |
| *H04N 21/437* | (2011.01) |
| *H04N 21/462* | (2011.01) |

(52) U.S. Cl.
CPC ......... *H04N 19/59* (2014.11); *H04N 21/2393* (2013.01); *H04N 21/41415* (2013.01); *H04N 21/437* (2013.01); *H04N 21/4622* (2013.01)

(58) Field of Classification Search
CPC ...... H04N 19/59; H04N 19/33; G06F 3/1446; G09G 2300/026
See application file for complete search history.

(56) References Cited

U.S. PATENT DOCUMENTS

| | | | |
|---|---|---|---|
| 5,682,441 | A | 10/1997 | Ligtenberg et al. |
| 6,331,869 | B1 | 12/2001 | Furlan et al. |
| 6,337,708 | B1 | 1/2002 | Furlan et al. |
| 6,459,451 | B2 | 10/2002 | Driscoll et al. |
| 7,071,894 | B1 | 7/2006 | Thielemans et al. |
| 7,760,272 | B2 | 7/2010 | Miller |
| 7,777,691 | B1 | 8/2010 | Nimmer et al. |
| 8,410,993 | B2 | 4/2013 | Jenks et al. |
| 9,008,168 | B2 | 4/2015 | Miller et al. |
| 9,264,678 | B2 | 2/2016 | Nuyttens et al. |
| 2002/0003544 | A1* | 1/2002 | Ohtsuka ............ G06F 3/1446 345/589 |
| 2005/0259729 | A1* | 11/2005 | Sun .................. H04N 19/36 375/240.1 |
| 2007/0033289 | A1* | 2/2007 | Nuyttens ........... G06F 3/1446 348/E7.086 |
| 2007/0140350 | A1* | 6/2007 | Sakazume .......... H04N 19/33 375/E7.079 |
| 2008/0123635 | A1 | 5/2008 | Mortensen et al. |
| 2009/0002263 | A1* | 1/2009 | Pasetto ............... G06F 3/1454 345/1.3 |
| 2009/0220163 | A1* | 9/2009 | Wu .................... G06F 17/147 382/249 |
| 2009/0243962 | A1 | 10/2009 | Hioki et al. |
| 2010/0123732 | A1* | 5/2010 | Jenks ................. H04N 9/12 345/592 |
| 2011/0206119 | A1* | 8/2011 | Bivolarsky .......... H04N 19/547 375/240.12 |
| 2011/0206132 | A1* | 8/2011 | Bivolarsky .......... H04N 19/119 375/E7.176 |
| 2014/0119670 | A1* | 5/2014 | Arai .................. G06T 3/4092 382/233 |
| 2016/0034240 | A1 | 2/2016 | Kreiner et al. |
| 2016/0357493 | A1 | 12/2016 | Zerwas |
| 2017/0078609 | A1* | 3/2017 | Kim .................. H04N 19/423 |

FOREIGN PATENT DOCUMENTS

| | | | |
|---|---|---|---|
| EP | 1064817 B1 | 10/2005 | |
| EP | 2846254 A2 | 3/2015 | |
| EP | 2446413 B1 | 12/2015 | |
| EP | 3028447 A1 | 6/2016 | |
| FR | 2643531 A1 * | 8/1990 | |
| GB | 2311681 A * | 10/1997 | .......... G11B 27/034 |
| WO | 1997030551 A1 | 8/1997 | |
| WO | 2000008889 A1 | 2/2000 | |
| WO | 2007105998 A1 | 9/2007 | |
| WO | 2015016569 A1 | 2/2015 | |
| WO | 2015114387 A1 | 8/2015 | |
| WO | 2016036373 A1 | 3/2016 | |
| WO | 2016072927 A1 | 5/2016 | |
| WO | 2016182541 A1 | 11/2016 | |

OTHER PUBLICATIONS

UK Search Report dated Jul. 25, 2017 for Application No. GB1701860.7.

UK Search Report dated Jul. 24, 2017 for Application No. GB1701859.9.

United Kingdom Search Report dated Jul. 24, 2017 for UK Application No. GB1701859.9.

United Kingdom Section 18(3) Examination report dated Jul. 5, 2021 UK Application No. GB1701859.9.

United Kingdom Search Report Jul. 25, 2017 for Application No. GB1701860.7.

"Clarity VCS Video Wall Processor", Dec. 6, 2016.

* cited by examiner

| Video resolution | Pixel rate (Mpix/s) | 4:4:4 12bit (Gbits/s) | 4:4:4 8bit (Gbit/s) | 4:2:2 10bit (Gbit/s) | 4:2:0 8bit (Gbit/s) |
|---|---|---|---|---|---|
| 720p60 | 57.6 | 2.07 | 1.38 | 1.15 | 0.69 |
| 1080p60 | 129.6 | 4.67 | 3.11 | 2.59 | 1.56 |
| 4k30 | 259.2 | 9.33 | 6.22 | 5.18 | 3.11 |
| 4k60 | 518.4 | 18.7 | 12.4 | 10.4 | 6.22 |
| 8k60 | 2073.6 | 74.6 | 49.8 | 41.5 | 24.9 |

| 121 | 121 | 88  | 88  |
|-----|-----|-----|-----|
| 121 | 121 | 154 | 154 |
| 44  | 44  | 154 | 154 |
| 0   | 44  | 121 | 88  |
| 0   | 44  | 121 | 0   |
| 0   | 44  | 121 | 0   |
| 192 | 44  | 121 | 0   |
| 256 | 44  | 121 | 0   |

3420

| 44  | 77  | 77 | 44 | 44 | 44 | 44 | 44 |
|-----|-----|----|----|----|----|----|----|
| 77  | 44  | 44 | 77 | 77 | 77 | 77 | 77 |
| 44  | 0   | 0  | 44 | 77 | 77 | 77 | 77 |
| 0   | 0   | 0  | 44 | 77 | 44 | 44 | 44 |
| 0   | 0   | 0  | 44 | 77 | 44 | 0  | 0  |
| 0   | 0   | 0  | 44 | 77 | 44 | 0  | 0  |
| 128 | 64  | 0  | 44 | 77 | 44 | 0  | 0  |
| 128 | 128 | 0  | 44 | 77 | 44 | 0  | 0  |

*Figure 34*

|  | No. sent | 8-Bit | 10-Bit | 12-Bit | 16-Bit |
|---|---|---|---|---|---|
| H0 | 32 | 8 | 10 | 12 | 16 |
| V0 | 16 | 9 | 11 | 13 | 17 |
| H1 | 8 | 10 | 12 | 14 | 18 |
| V1 | 4 | 11 | 13 | 15 | 19 |
| H2 | 2 | 12 | 14 | 16 | 20 |
| V2 | 1 | 13 | 15 | 17 | 21 |
| H3V3 | 1 | 14 | 16 | 18 | 22 |
|  |  |  |  |  |  |
| Total for streams |  | 575 | 703 | 831 | 1087 |
| Original video frame: |  | 512 | 640 | 768 | 1024 |
| Efficiency: |  | 89% | 91% | 92% | 94% |

*Figure 35*

METHOD OF VIDEO TRANSMISSION AND DISPLAY

CROSS-REFERENCE TO RELATED APPLICATIONS

This application is a continuation of U.S. patent application Ser. No. 16/530,826, filed Aug. 2, 2019, which is a continuation of International Application No. PCT/GB2018/050318, filed Feb. 2, 2018, which claims priority to UK Application No. GB1701860.7, filed Feb. 3, 2017, and UK Application No. GB1701859.9, filed Feb. 3, 2017, under 35 U.S.C. § 119(a). Each of the above-referenced patent applications is incorporated by reference in its entirety.

BACKGROUND OF THE INVENTION

Technical Field

The present invention relates to methods, apparatus and systems for requesting, transmitting and/or receiving video data for a display.

Background

A video wall is a video system in which a number of video monitors or displays are arranged in an array formation to create a relatively larger overall display screen. A typical video wall system includes a video processing unit which comprises a number of video input modules for providing a variety of video inputs, a central processing module for processing video data from the input modules, and a number of video output modules for providing video outputs for connection via standard video cables to the video monitors. The number of video outputs can be increased by adding further output modules to the video processing unit. However, the number of video outputs, and hence the number of monitors supported by the system, is limited by bandwidth capability of the central processing module. Increasing resolution of the video inputs places further load on the central processing module which can result in further limitations on the number of supported video outputs.

SUMMARY

There is provided a method for encoding a frame of original video data by a component of a video system into a plurality of frames for inclusion in video streams of different spatial resolutions, the method comprising: dividing the original frame of original video data into grids each grid containing a predetermined number of pixel values; summing pixel values within each of the grids of pixel values to form a total pixel value for each grid of pixel values; encoding the total pixel values to form a downscaled frame; encoding the original pixel values in each of the plurality of grids of pixel values to form a higher resolution frame, wherein fewer than all the pixel values within each grid of pixel values are encoded in the higher resolution frame and a final pixel value that is not encoded is derivable using the encoded total value of a corresponding grid of the downscaled frame and the pixel values encoded in the grid of the higher resolution frame.

There is provided a component of a video system comprising a processor and a non-transitory computer-readable storage medium comprising a set of instructions that, when executed by the processor, cause the component to perform a method for encoding a frame of original video data into a plurality of frames for inclusion in video streams of different spatial resolutions, the method comprising: dividing the original frame of original video data into grids each grid containing a predetermined number of pixel values; summing pixel values within each of the grids of pixel values to form a total pixel value for each grid of pixel values; encoding the total pixel values to form a downscaled frame; encoding the original pixel values in each of the plurality of grids of pixel values to form a higher resolution frame, wherein fewer than all the pixel values within each grid of pixel values are encoded in the higher resolution frame and a final pixel value that is not encoded is derivable using the encoded total value of the corresponding grid of the downscaled frame and the pixel values encoded in the grid of the higher resolution frame.

Further features and advantages of the invention will become apparent from the following description of preferred embodiments of the first and second aspects of the invention, given by way of example only, which is made with reference to the accompanying drawings.

BRIEF DESCRIPTION OF THE DRAWINGS

FIG. 13 shows a table of example bit rates required to transmit video data at various resolutions and chroma subsampling schemes according to some embodiments of the first and second aspects of the invention.

FIGS. 31 to 34 show a method of transmitting downscaled video data, according to an embodiment.

FIG. 35 shows a table of example efficiencies for transmitting downscaled video data.

DETAILED DESCRIPTION OF CERTAIN INVENTIVE EMBODIMENTS

In the following description, reference is made to videos and video data. In general, videos that are processed by computers and video processing devices can be thought of as a sequence of individual still images which are often referred to as video frames. Each image or video frame consists of a number of pixels which are typically arranged in a grid of horizontal rows and vertical columns. The number of horizontal rows (or lines) and vertical columns (or lines) determines a resolution characteristic of the image or frame as well as the corresponding video.

Multicast Video Wall

Figure 1:
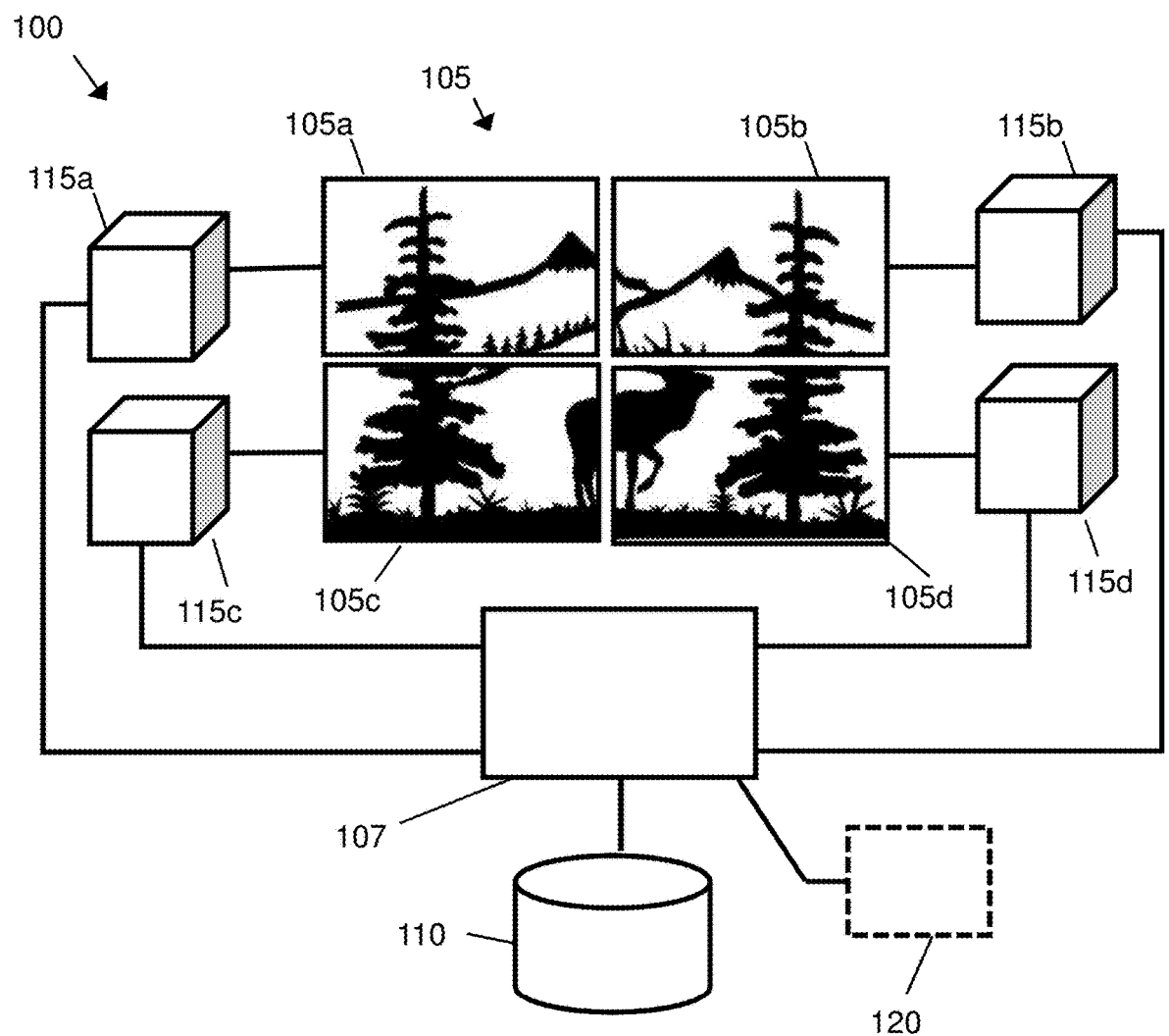
FIG. 1 shows a video wall system according to an embodiment of the first aspect of the invention.

FIGS. 1 to 17 show examples and representations relating variously to a multicast aspect of the present invention. Referring to FIG. 1, there is shown an example video system 100. Links between entities of the system 100 may for example comprise 1G, 10G or 25G copper or fibre links.

The system 100 comprises a video wall 105 comprising an array of four display devices 105a-d arranged in a two-by-two layout. Although the video system 100 is shown as a video wall system, it will be appreciated that embodiments of the present disclosure are also applicable to other video systems including, for example, systems where a plurality of displays do not necessarily form a video wall. Examples video systems include systems used in courtrooms, government assemblies, boardrooms, command & control centers, simulators, operating theatres, television studios, live stage events, casinos, and sports stadiums.

Each display device may, for example, be a computer monitor, a video projector or a television screen. The displays may be general purpose display devices or, alternatively, they may be display devices designed specifically for use in a video wall 105.

The system 100 comprises a network switch 107, such as a non-blocking network switch. A network switch includes a number of bidirection input/output ports, and a non-blocking network switch is one where each port can typically pass data to every other port, and typically the internal bandwidth of the switch can handle all the port bandwidths, at the same time, at full capacity. The switch 107 is configured to handle multicast subscription requests. The switch 107 may be utilised to provide a master Dynamic Host Configuration Protocol (DHCP) server and/or time server for the system 100.

The video system 100 comprises one or more video sources 110. The video source 110 is coupled to the network switch 107 and together they are configured to provide a plurality of multicast streams via the network switch 107. Each multicast stream comprises video frame data corresponding to a portion of a video frame. For example, a video frame with a particular resolution may be divided into fixed-size lower-resolution portions as described in more detail below. Preferably, the video frame is divided in both the horizontal and vertical direction so that each portion of the video frame data corresponds to a block of pixels. Each block may be a rectangular block having the same aspect ratio as the original video frame. Or the blocks could be square blocks of pixels. Each portion of the video frame would then be transmitted in a respective multicast stream.

The portion of the video frame may be a region within the video frame, or an area within the video frame. If the video frame is available in different resolutions, the portion of a video frame may be a portion of a video frame at a particular resolution. If the video frame at a particular resolution has particular number of pixels then the portion of the video frame may be a portion, region or area of the video frame covering a subset of the full set of pixels. If the video frame at a particular resolution is represented by a particular set of video frame data then the portion of the video frame may be a portion, region or area of the video frame incorporating a subset of video frame data.

In some embodiments, a single video source 110 provides a single video for display on the video wall 105. In a further embodiment, the system 100 comprises a plurality of video sources 110, each of which are configured to provide respective video frame data for display on the video wall 105. Some or all of the plurality of sources may comprise separate hardware. Alternatively or additionally, some or all of the plurality of sources may comprise logically separate sources within the same source hardware. In this manner, a single physical video source 110 can provide multiple videos for simultaneous display on the video wall 105. In some embodiments wherein sources comprise separate hardware, multiple video sources 110 provide the same video frame data. Such an arrangement provides redundancy in the system so that a loss of video from one video source 110 can be compensated for by the provision of the same video from another video source.

In some embodiments, for example where provision of video frames would require particularly high bandwidth or processing power, a single source video can be divided, for example spatially, into separate videos, each corresponding to a region of the single source video. For example, video frames may be divided into a number of evenly spaced vertical strips. The separate videos can then be provided by physically separate video sources. This approach is useful for relatively high resolution source videos.

In the example shown in FIG. 1, the video source 110 provides a single video for display across the entire video wall 105 such that the top-left quarter of a given video frame is displayed on display device 105a, the top-right quarter is displayed on video device 105b, the bottom-left quarter is displayed on display device 105c and the bottom-right quarter is displayed on video device 105d.

The video source 110 may include a storage medium such as a hard disk or flash memory for storing a video file, which can be retrieved when a video needs to be output by the video source. The video could also originate from a live source such as a video from a video camera. Such a storage medium or live source of video can be local to the video source 110 hardware. For example, a video may be provided from a flash memory in the same cabinet as the video source 110. Alternatively, the storage medium or live source of video can be remote from the video source 110 hardware. For example, a live source may comprise a video camera coupled via a wireless link to the video source 110.

The video system 100 further comprises a plurality of video output devices 115a-d. Each video output device 115a-d is coupled to the network switch 107 and is also coupled to a corresponding display device 105a-d of the video wall 105. In some embodiments, a given video output device 115a-d is incorporated within the functionality of its corresponding display device 105a-d. For example, a display device 105a-d may comprise a dedicated video output device 115a-d hardware. Alternatively, a general purpose processor of a display device 105a-d may implement the functionality of a video output device 115a-d. Each video output device 115a-d is configured to transmit a subscription request to the network switch 107. The subscription request is for at least one of the plurality of multicast streams provided by the video source 110. The requested stream comprises video frame data that is for display on the display device 105a-d to which that video output device 115a-d is coupled. As an example, video output device 115a, associated with the top-left display 105a, would transmit a subscription request for at least one multicast stream corresponding to the top-left quarter of the video frame.

In an embodiment, a video output device 115a-d is configured to subscribe to at least one further stream of the plurality. Each of the at least one further streams comprises video frame data that is for display on the corresponding display 105a-d such that the combined requested streams together provide the entirety of video frame data that is for display on the display device 105a-d. In an example, a video output device 115a-d may submit separate subscription requests for each such stream. Alternatively, a video output device 115a-d may submit a single subscription request for multiple streams.

In some embodiments, the multicast streams are managed by a stream controller 120. Each video source 110 transmits to the stream controller 120 a description of the streams that it provides. The description may for example include a unique identifier of each stream and details of the specific portion of the video frame to which each stream relates. The stream controller 120 then transmits such a description to each video output device 115a-d. Each video output device 115a-d can thus determine which streams it should subscribe to, as described in more detail below.

In other embodiments, the system 100 does not comprise a stream controller 120. In such embodiments, each video source 110 broadcasts a description of the streams that it provides to each video output device 115a-d. As above, the description may include a unique identifier of each stream and details of the specific portion of the video frame to which each stream relates. Each video output device 115a-d can thus receive the broadcast stream descriptions and hence determine which streams it should subscribe to.

The network switch 107 is configured to receive subscription requests. In response to receiving a subscription request from a video output device 115a-d, the network switch transmits each requested stream to that video output device 115a-d. A given video output device 115a-d thus only receives video frame data based on the portion or portions to which it subscribes. Hence, the system 100 avoids the need to transmit the entirety of the video frame data to each video output device. As such, the overall bandwidth requirements of the system 100 can be reduced.

By using a network switch to distribute video streams to different video output devices, as well as manage streaming requests, the number of components of the system 100 can be kept low. For example, the system 100 may be configured with the network switch, the video input(s) 110, and the video output devices but without using any separate video servers to receive video frame data from the video source 110 and provide the data to the video output devices 105a-d.

It has been observed that, in systems in which the entire video frame is sent to each video output device 105a-d, the required network bandwidth increases with the number of displays. Similarly, the required processing power of a video source 110 increases with the number of displays. This can increase to the point that no further displays can be added to the video wall. The present system 100 enables pixel data of a video frame, provided by a video source 110, to be transmitted only to a subset of the video output device 115a-d that require that pixel data for their respective displays 105a-d. The system 100 can also enable a multicast stream relating to a portion of the video frame which is to be partially displayed on one display and partially displayed on one or more further displays to be subscribed to by the video output devices of those displays. Furthermore, in the case of edge blending, where two or more projectors acting as display devices provide partially overlapping video output, the system 100 enables the output of overlapping video by providing pixel data for the overlapping portion to the two or more projectors.

As such, the system 100 enables the bandwidth of video frame data transmitted from the video source 110 to each video output devices 115a-d, via the network switch 107, to be significantly lower than the bandwidth required for transmitting a complete version of the video frame data from the video source 110 to each display device 115a-d, regardless of how many displays 105a-d the video frame is spread across. Additional displays, with corresponding video output devices, can thus be added to the system without requiring additional or upgraded video source hardware. This remains true if such an additional display is physically remote from the rest of the network hardware, but it may be necessary to connect the additional display via upgraded connection hardware capable of transmission over an extended distance.

Suitably, the number of videos and/or the resolution of video available in the system 100 can be increased by upgrading individual video source 110 devices so that they are capable of handling increased bandwidth. Additionally or alternatively, the number of videos and/or the resolution of video available in the system 100 can be increased by adding additional video source 110 devices.

Typically, a video output device 115a-d will be capable of outputting video frame data at the maximum resolution of its corresponding display 105a-d. Therefore, even if the number of videos and/or the resolution of video available in the system 100 is increased, this would typically not require an upgrade the video output devices 115a-d.

After receiving the video frame data from the network switch 107, each video output device 115a-d then outputs display data, based on the received video frame data, to its corresponding display 105a-d. For example, the display data may comprise data in accordance with the HDMI standard, the DVI standard, or the VGA standard. In some examples, a video output device 115a-d may produce the display data by identifying a part of the received video frame data as not being for display, and producing the display data so as to exclude the identified part of the received video frame data. For example, where each multicast stream corresponds to a fixed-size block of a video frame, a given video output device 115a-d subscribes to streams such that the blocks corresponding to each requested stream together include the portion of the video frame that is for display on its corresponding display 105a-d. The received blocks may also cover further portions of the video frame, adjoining the portion that is for display. The video output device 115a-d may thus identify such further portions as not for display, and produce the display data omitting such further portions.

In some embodiments, when a video output device 115a-d does not receive a given block, for example due to network errors, the video output device 115a-d can interpolate the missing data from surrounding pixel blocks. Alternatively, the video output device 115a-d may replace the missing block with a corresponding block from the previous frame, for example held in a buffer. However, provided that a large number of blocks are not missing, such errors are typically not very noticeable on a display.

In some embodiments, multiple switches 107 can be used. In an example video wall 105 in which the total required bandwidth, for all displayed videos, does not exceed 10 Gb, the one or more video sources 110 may be linked to a single 10 Gb switch. This is then linked via a single 10 Gb link to a similar switch, to which all video output devices 115a-d are connected. For large video walls 105, multiple switches could be configured, with each switch being connected to a subset of the video output devices 115a-d. In some embodiments in which multiple switches are used, each switch is located physically near the video output devices 115a-d and/or video sources 110 to which it is connected. The switches may then be connected to each other via a fast interconnection, such as a fibre interconnection. In such examples, it is preferable for the interconnection to be capable of supporting non-blocking usage over all connected ports. The interconnection should preferably be capable of handling the greater of the total video output device 115a-d bandwidth and the total video source 110 bandwidth.

As a further example of network hardware, two or more connections could be used to send video frame data from the network switch 107 to a given video output device 115a-d. Such a configuration is particularly useful in embodiments such as control rooms, wherein multiple lower resolution sources are displayed on a higher resolution display, as this configuration allows a higher resolution display to be used since more video frame data can be transmitted from the network switch 107 to a given video output device 115a-d. Alternatively, a single high-bandwidth connection could be used instead of two or more lower-bandwidth connections.

Alternatively or additionally, two or more connections could be used to transmit multicast streams from a video source 110 to the network switch 107. This configuration is particularly advantageous in embodiments where the resolution of the video from the video source 110 is higher than the display resolution, as it allows a higher resolution video frame to be displayed on the video wall 205. Alternatively, a single high-bandwidth connection could be used instead of two or more lower-bandwidth connections.

A further advantage of the use of two connections to video output devices 115a-d and/or video sources 110 is that such a system could, in response for example to a network issue, use only one of the two connections. Such a system thus provides redundancy in case of network faults. As an example, when two links from a video source 110 are in use, video frame data could be streamed at a lower compression ratio and when a single link is in use, video frame data could be streamed at a higher compression ratio. Switching between these modes of operation may be triggered by automated sensing of a network issue, for example by further network hardware such as a network controller.

Figure 2:
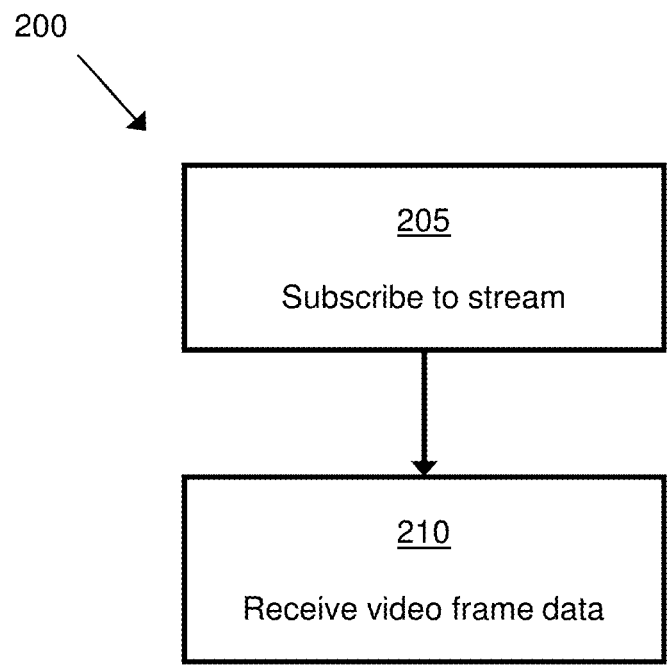
FIG. 2 shows a schematic representation of a method according to an embodiment of the first aspect of the invention.

FIG. 2 shows a schematic representation of a method 200, in a video output device, for acquiring video data for outputting to a display according to an aspect of the present disclosure.

The method 200 comprises a subscribing step 205 of subscribing to a multicast stream of a plurality of multicast streams. Each multicast stream is streamed from a video source and comprises video frame data corresponding to a portion of a video frame. The multicast stream to which the video output device subscribes comprises video frame data that is for display on a display associated with the video output device.

The method then comprises a receiving step 210 of receiving the video frame data that is for display on the display.

Figure 3:
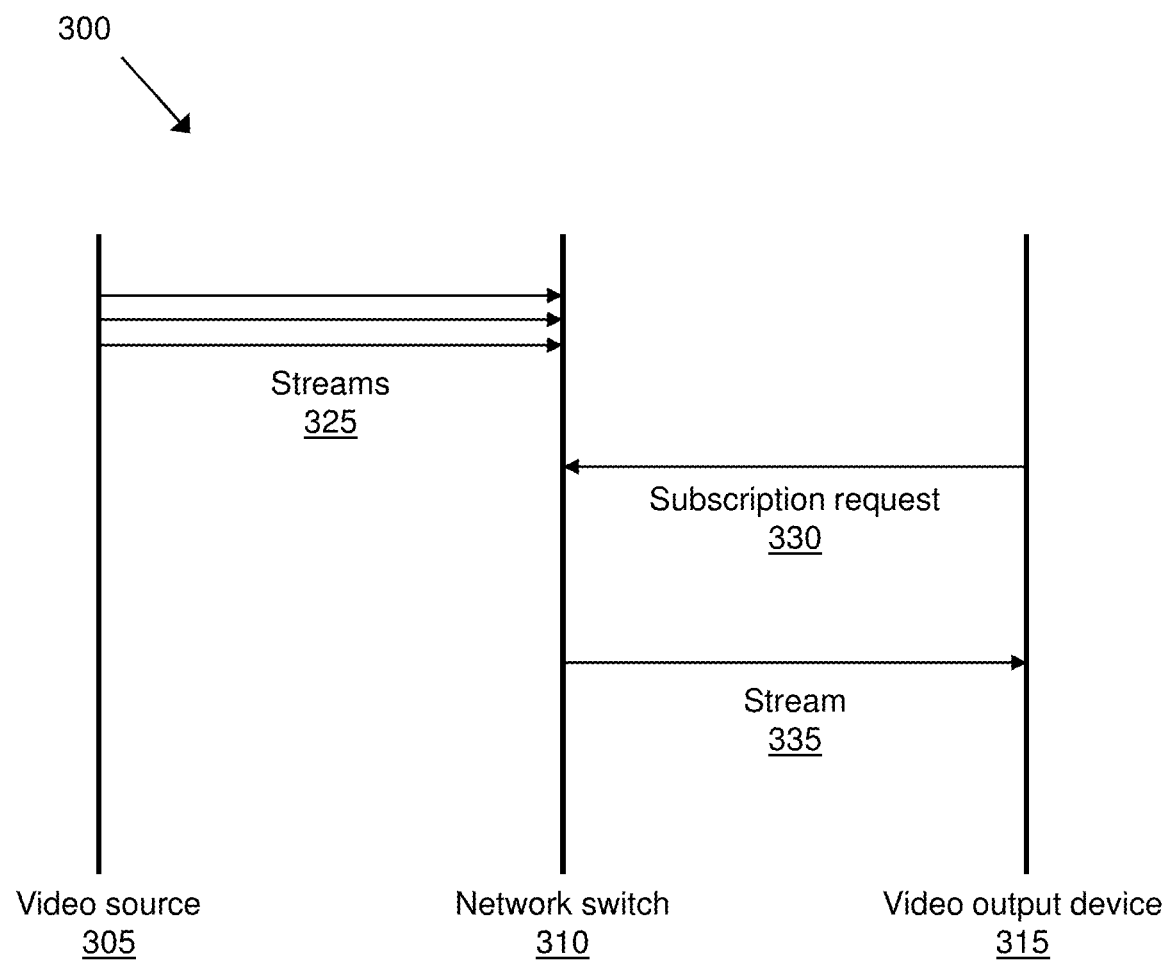
FIG. 3 shows a schematic representation of a method according to an embodiment of the first aspect of the invention.

FIG. 3 shows a schematic representation of a similar method 300 of video frame transmission in a video system. The system, as described above in connection with FIG. 1, comprises at least one video source 305, a network switch 310 and at least one video output device 315. The method comprises data flow between a given video source 305 and a given video output device 315 via the network switch 310.

The video source 305 transmits to the network switch 310 a plurality of multicast streams 325. As set out above, each multicast stream comprises video frame data corresponding to a portion of a corresponding video frame.

The video output device 315 transmits to the network switch 310 a subscription request 330 for at least one of the plurality of streams. Each requested stream comprises video frame data that is for display on a display device associated with the video output device.

In response to receiving a said subscription request, the network switch 310 transmits each requested stream 335 to the video output device 315.

Figure 4:
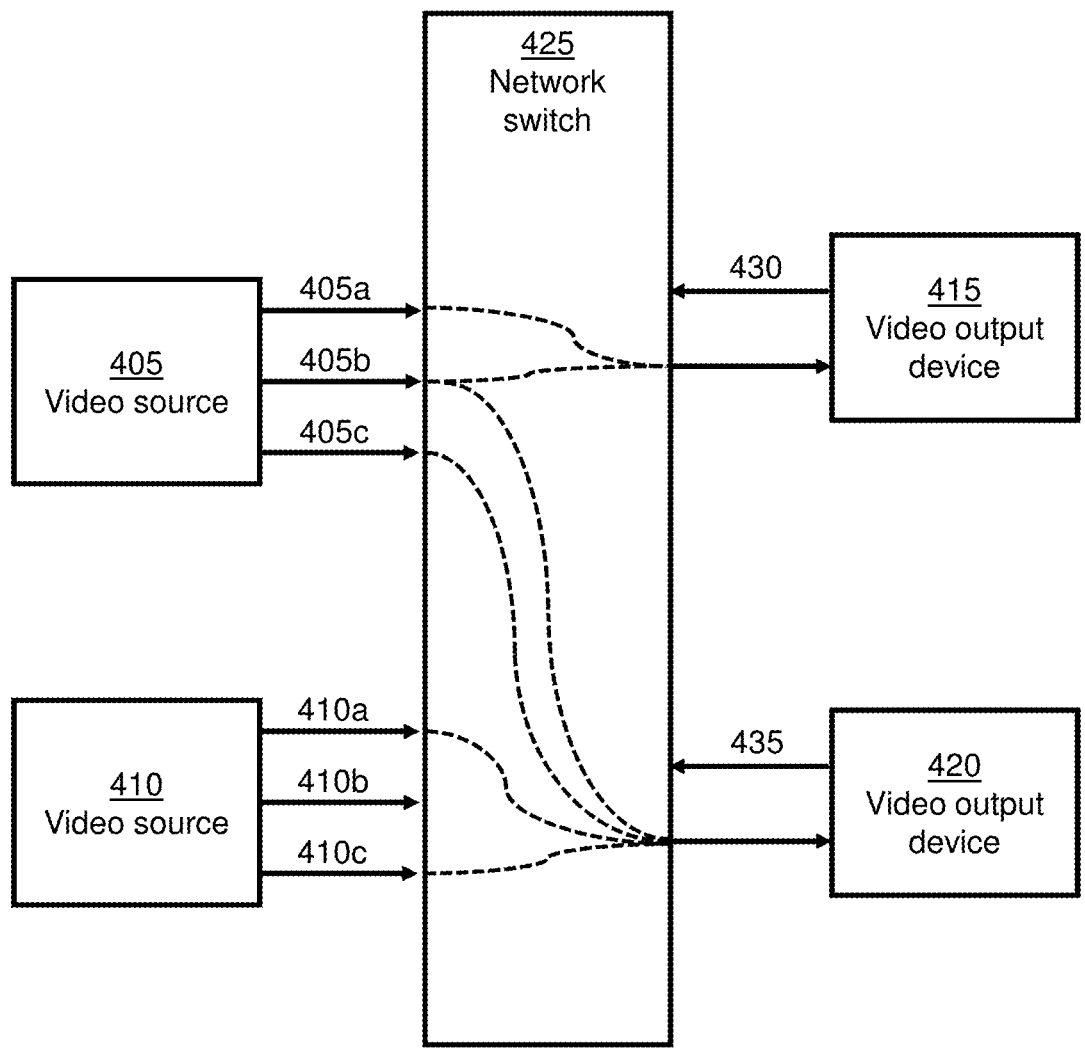
FIG. 4 shows an example of data flow in a video system according to an embodiment of the first aspect of the invention.

FIG. 4 shows an example of data flow in a video system. The system comprises video sources 405, 410 and video output devices 415, 420, connected to each other via a network switch 425. Video source 405 provides multicast streams 405 a-c to the network switch 425, each of which relate to portions of a first video. Video source 410 provides multicast streams 410a-c to the network switch 425, each of which relate to portions of a second video. Multicast streams 405a and 405b correspond to portions of the first video that are for display on the display associated with video output device 415. Multicast streams 405*b* and 405*c* correspond to portions of the first video that are for display on the display associated with video output device 420. Multicast streams 410*a* and 410*c* correspond to portions of the second video that are for display on the display associated with video output device 420. Multicast stream 410*b* corresponds to a portion of the second video that is not for display on either output device 415, 420.

Video output device 415 transmits to the network switch 425 one or more subscription requests 430 identifying streams 405*a* and 405*b*. A single subscription request 430 may be transmitted, identifying both streams 405*a* and 405*b*. Alternatively, video output device 415 may transmit separate subscription requests 430 for each stream 405*a*, 405*b*.

Similarly, video output device 420 transmits to the network switch 425 one or more subscription requests 435 identifying streams 405*b*, 405*c*, 410*a*, 410*c*. A single subscription request 435 may be transmitted, identifying all four streams 405*b*, 405*c*, 410*a*, 410*c*. Alternatively, video output device 420 may transmit one request 435 for streams 405*b*, 405*c* from video source 405, and a second request for streams 410*a*, 410*c* from video source 410. As a further example, separate subscription requests 435 may be transmitted for each stream 405*b*, 405*c*, 410*a*, 410*c*.

Dashed lines within the switch 425 indicate data flow from video sources 405, 410 to video output devices 415, 420 via the switch 425. In response to receiving the above-described subscription requests, the switch 425 transmits each requested stream to the corresponding video output devices 415, 420. Specifically, the switch 425 transmits streams 405*a*, 405*b* to video output device 415, and transmits streams 405*b*, 405*c*, 410*a*, 410*c* to video output device 420.

Figure 5:
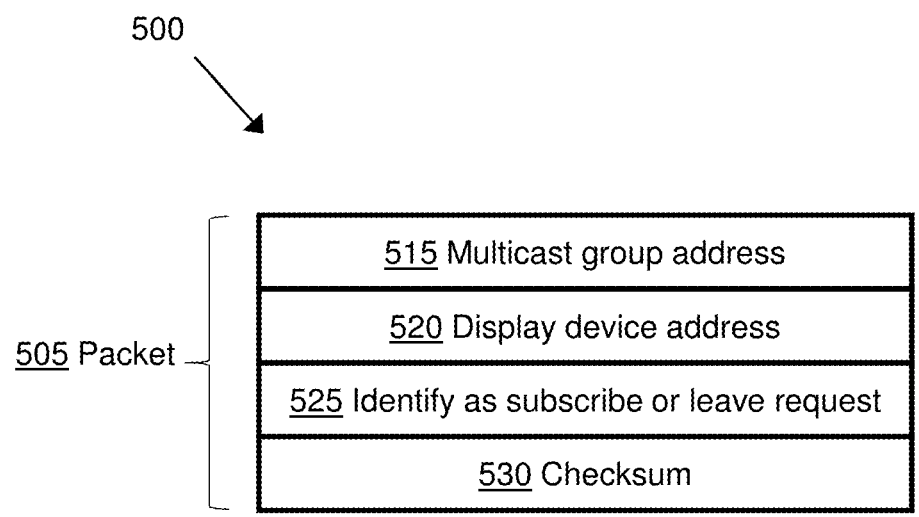
FIG. 5 shows a schematic representation of a subscription request data packet according to an embodiment of the first aspect of the invention.

FIG. 5 shows a schematic representation of a subscription request data packet 500 that is transmitted from a video output device to a network switch according to an embodiment. In analogous embodiments, the packet may be structured according to a standard multicast protocol, for example Internet Group Management Protocol (IGMP).

The packet 500 comprises a network address 515, for example a multicast group IP address, of the source of the video data to which the subscription request relates. In some embodiments, a stream controller receives details of each available stream, including the corresponding multicast group addresses, from each video source. The stream controller transmits these details to each video output device. In other embodiments, video sources broadcast details of available streams to each video output device. Each video output device can thus maintain a record of the available streams, including the multicast group address of each stream.

The packet 500 comprises a network address 520 of the display device from which the subscription request originates.

In some embodiments, the packet 500 further comprises a field 525 identifying the packet as a subscription request. In some examples, the network address 515 is sufficient to identify the packet 500 as a subscription request. In such examples, the packet 500 does not include the identification field 525.

The packet 500 then comprises a checksum 530 to enable the network switch to detect errors in the packet 500. For example, the checksum may comprise the 16-bit one's complement of the one's complement sum of the entire packet 500.

A network switch is configured to identify the packet 500 as a subscription request, for example by identifying the network address 515 as a multicast group address or by way of the identification field 525 identifying the packet as a subscription request. The network switch is configured to maintain a record of subscriptions. The network switch receives each multicast stream from each video source and, based on the record of subscriptions, forwards each stream to the video output devices that have subscribed to that stream.

In some examples, the packet 500 comprises an identification of multiple streams to which the subscription request relates. For example, the packet 500 may identify multiple multicast group addresses. In one such example, the packet 500 comprises a field identifying the bit length of the packet and/or the number of streams to which the request relates.

Figure 6:
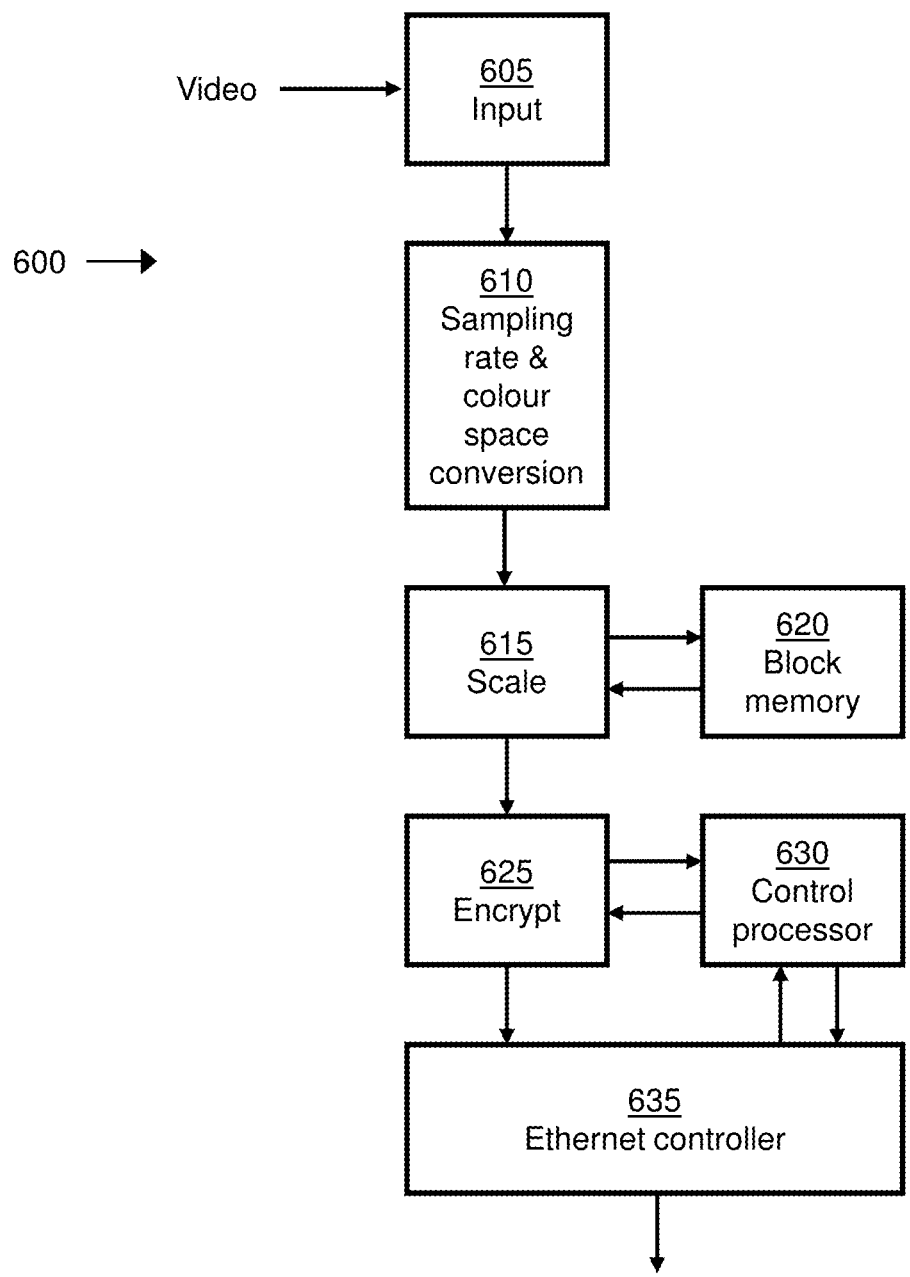
FIG. 6 shows a schematic representation of a video source according to embodiments of the first and second aspects of the invention.

FIG. 6 shows a schematic representation of a video source 600 according to one embodiment. The source 600 comprises various modules. Any or all of these modules could, either alone or in any combination, be implemented by dedicated circuitry, for example one or more field-programmable gate arrays, or be implemented by routines in one or more general processors.

The source 600 comprises an input 605 to receive video data, for example from a storage medium such as a hard disk or solid-state memory, or from a live video feed.

In some examples, video frame data is stored as block-by-block video data. The video frame data is then received at the input as block-by-block data, with each block of a given frame to be sent in a separate multicast stream. Alternatively, video frame data may be stored as line-by-line video frame data and converted by a module of the video source 600 to block-by-block video frame data, with each block corresponding to a separate multicast stream. As an example of such a conversion, 135 lines of video frame data may be cached and, from this, blocks of size 240×135 pixels may be determined. A 1920×1080 pixel frame may thus be converted into an 8×8 grid of blocks. This allows the block size to be modified on the fly, for example in response to a command from a stream controller.

In some examples, block-by-block video frame data is stored such that a given block is stored in successive memory locations of a bank of a memory, with adjacent blocks being stored in different banks of the memory. A given block can thus be rapidly read out from a bank of the memory. In embodiments wherein adjacent blocks are streamed in succession, this arrangement facilitates rapid access to adjacent blocks as one bank of the memory can be read while another is being opened or closed. An example of such block-based storage is described in more detail in European patent EP2446413B1, the contents of which is incorporated herein by reference.

The source comprises a sampling rate and colour conversion module 610, configured to convert the received video to a data rate and/or colour space that is suitable for providing via the network switch to video output devices.

The source 600 comprises a scaling module 615 for downscaling the video data. The scaling module 615 may for example perform block-based downscaling, downscaling each block of video frame data to provide multiple streams for each block, each having a different overall downscaling factor and/or chroma subsampling scheme. The downscaled block data is stored in a block memory 620.

The source 600 comprises an encryption module 625, configured to encrypt the downscaled video frame data into a format suitable for transmission via the network switch to the video output devices.

The source 600 comprises a control processor 630 configured to control an ethernet controller 635 to transmit the encrypted video frame data to the network switch.

Figure 7:
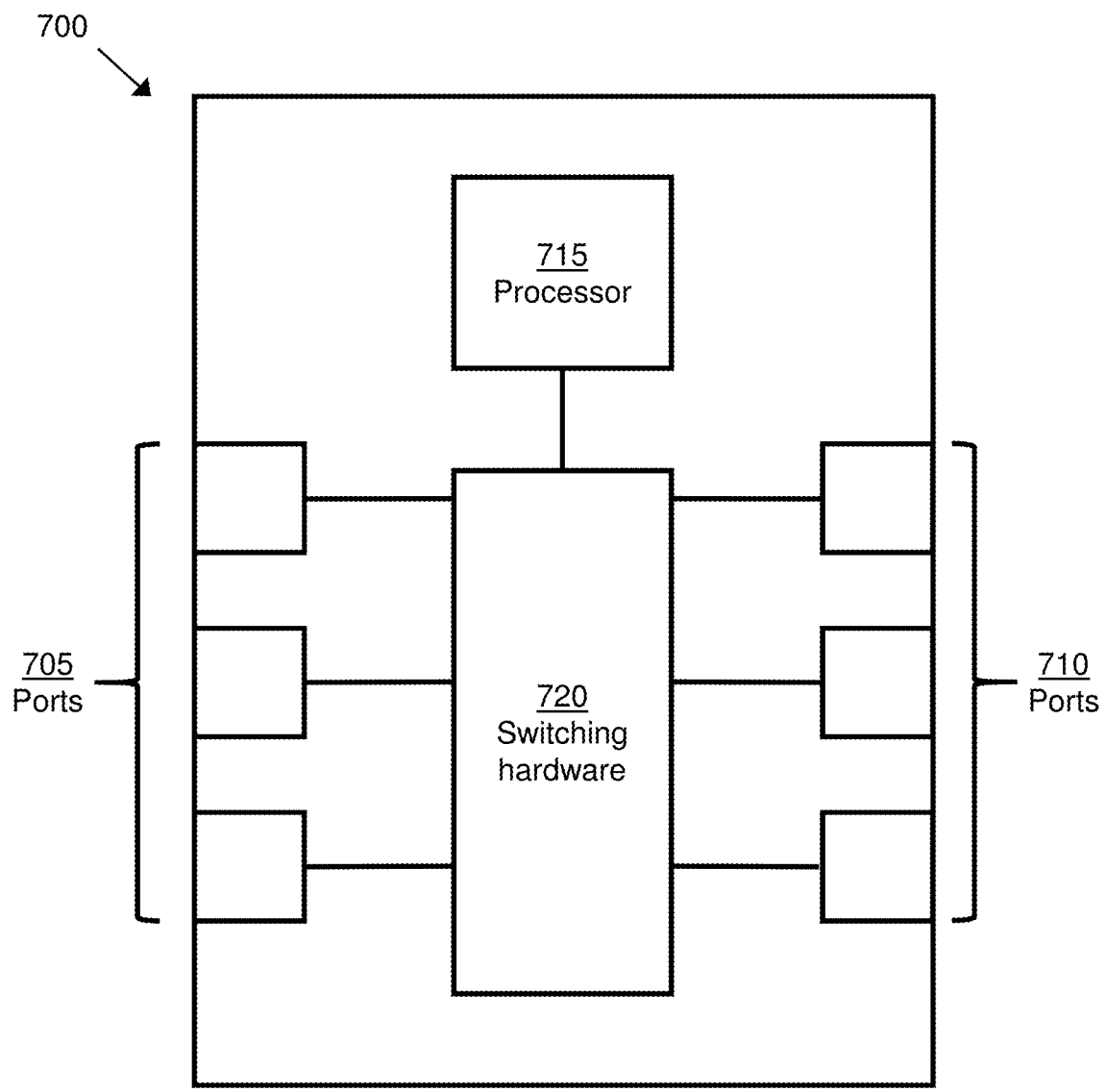
FIG. 7 shows a schematic representation of a network switch according to an embodiment of the first aspect of the invention.

FIG. 7 shows a schematic representation of a network switch 700 according to an embodiment. The switch 700 comprises various modules. Any or all of these modules could, either alone or in any combination, be implemented by dedicated circuitry, for example one or more field-programmable gate arrays, or be implemented by routines in one or more general processors.

The switch 700 comprises ports 705 for receiving multicast streams from one or more video sources. For example, if the switch 700 is an ethernet switch, the ports 705 are ethernet ports.

The switch 700 further comprises ports 710 for receiving subscription requests from a plurality of video display devices. It should be noted that although the ports 705 and the ports 710 are for ease of explanation shown as distinct in FIG. 7, ports 705 are not specifically optimised for connection to video sources and ports 710 are not specifically optimised for connection to display devices. A video source could be connected to a port 710 and/or a video display device could be connected to a port 705.

One or more of the ports 705 and the ports 710 may include buffers for buffering data going to the port (an input buffer) or going from the port (an output buffer). The buffers may be provided by dedicated memory for each port or by logical allocations from a common memory in the switch.

In one embodiment of the present invention, the video frame data is split into multiple data packets, whereby the data packet may be in the form of a wavelet. A wavelet results from a wavelet transformation of the data. In wavelet compression, a type of image data compression, each successive wavelet transformation provides a successively lower resolution video data wavelet which can be sent as a different multicast group. Thus, the video frame data comprises of multiple wavelets of decreasing resolution. Combining all wavelets that constitute the video frame data reconstructs the original resolution, or fewer (lower) wavelet levels can be combined to reconstruct a lower resolution version. Therefore, the final received and reconstructed image can be varied in resolution by subscribing to different wavelet multicast groups. An example of such data compression is described in more detail in United States patent U.S. Pat. No. 5,682,441A.

The switch comprises a processor 715 and switching hardware 720. The processor 715 is configured to process subscription requests received via ports 710. In response to receiving such a request, the processor 715 controls the switching hardware 720 to transmit each requested stream to the video display device from which the request was received.

The switch 700 may be configured to have 'Quality of Service' capabilities, whereby transmission of certain data packets are prioritized. For example, a data packet containing lower resolution video frame data may be prioritized ahead of other data packets waiting to be transmitted from the network switch. In another example, the switch 700 may prioritize the transmission of subscription requests received from a plurality of video display devices for data packets containing lower resolution video frame data.

Alternatively, or in addition to, the 'Quality of Service' capabilities may prevent the loss of a data packet containing lower resolution video data should an output buffer overrun occur. In a comparable example, the 'Quality of Service' capabilities may actively discard a data packet containing higher resolution video data, particularly when the output buffer is overloading or is about to overload. Therefore if data packet loss occurs, a lower resolution set of pixels will still be available in the buffer, and can be transmitted for view on the video display device.

In one embodiment of the present invention, the video frame data packet may be in the form of a wavelet. The switch 700 will give a higher prioritization to the lowest resolution wavelet, and a lower prioritization given to higher resolution wavelets.

Figure 8:
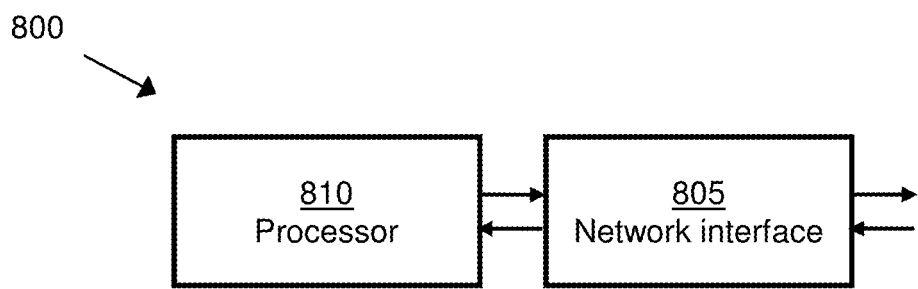
FIG. 8 shows a schematic representation of a video output device according to embodiments of the first and second aspects of the invention.

FIG. 8 shows a schematic representation of a video output device 800 according to some embodiments.

The video output device 800 comprises a network interface 805 and a processor 810 coupled to the network interface. The processor 810 is configured to subscribe, via the network interface 805, to a multicast stream of a plurality of multicast streams. Each multicast stream is streamed from a video source and comprises video frame data corresponding to a portion of a video frame. The multicast stream to which the processor 810 subscribes comprises video frame data that is for display on a display associated with the video output device 800.

The processor 810 is further configured to receive, via the network interface 805, the video frame data that is for display.

Figure 9:
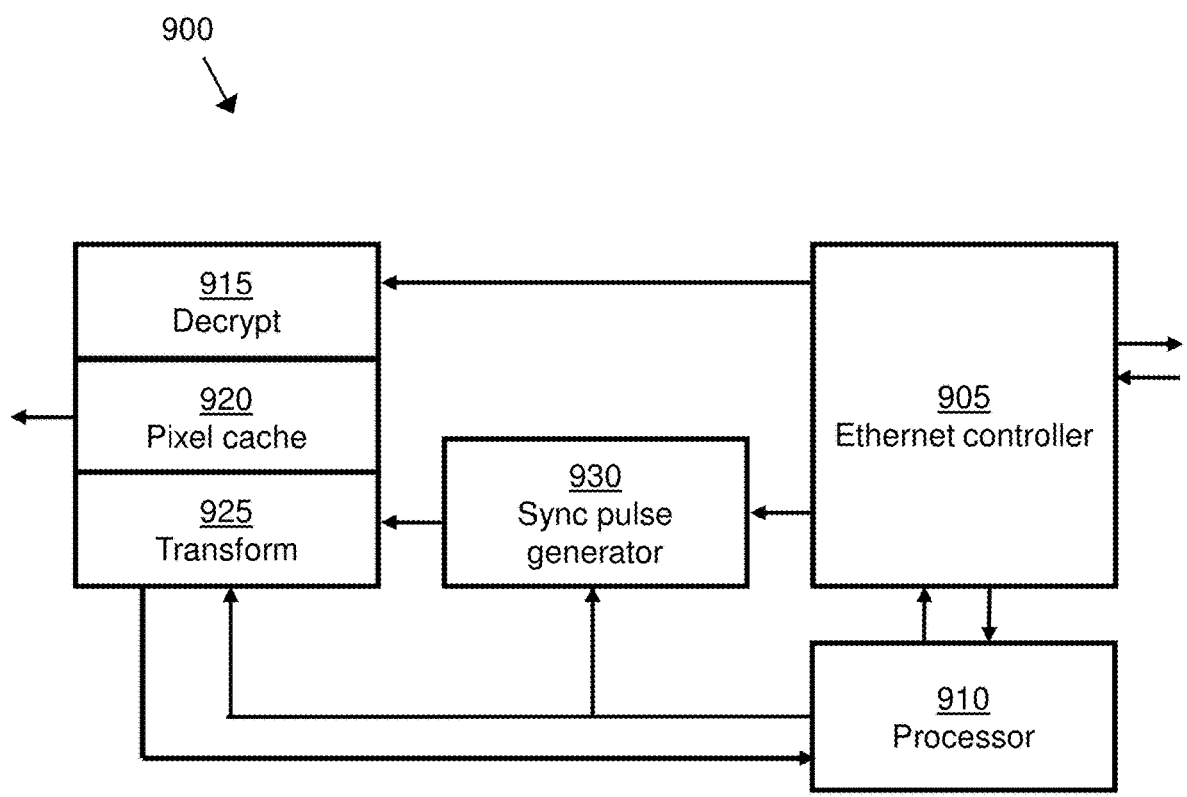
FIG. 9 shows a schematic representation of a video output device according to embodiments of the first and second aspects of the invention.

FIG. 9 shows a schematic representation of a video output device 900 according to an embodiment. The video output device 900 comprises various modules. Any or all of these modules could, either alone or in any combination, be implemented by dedicated circuitry, for example one or more field-programmable gate arrays, or be implemented by routines in one or more general processors.

The video output device 900 comprises an ethernet controller 905 controlled by a processor 910. The processor 910 is configured to transmit a subscription request for a multicast stream, via the ethernet controller 905 to a network switch, for example as described above.

The ethernet controller 905 is further configured to receive the video frame data of the requested stream from the network switch.

The video output device 900 comprises a decryption module 915, which is configured to decrypt the received video frame data into a format suitable for further processing and display.

The video output device 900 comprises a pixel cache 920 in which decrypted video frame data is stored and from which video frame data is output to a display of the video wall.

The video output device 900 comprises a transform module 925, configured to apply transforms to the stored video frame data to produce video frame data suitable for display. For example, the transforms may comprise warping, rotating, up-scaling, down-scaling, de-interlacing and/or edge blending, depending on the desired display configuration of the video frame. Additionally, the transform module 925 may determine the particular multicast streams for subscription, as described in more detail below, and transmit an identification of those streams to the processor 910.

The video output device 900 comprises a sync pulse generator 930 configured to provide a synchronisation signal for synchronising the outputting of video frame data with the refresh rate of the display.

Figure 10:
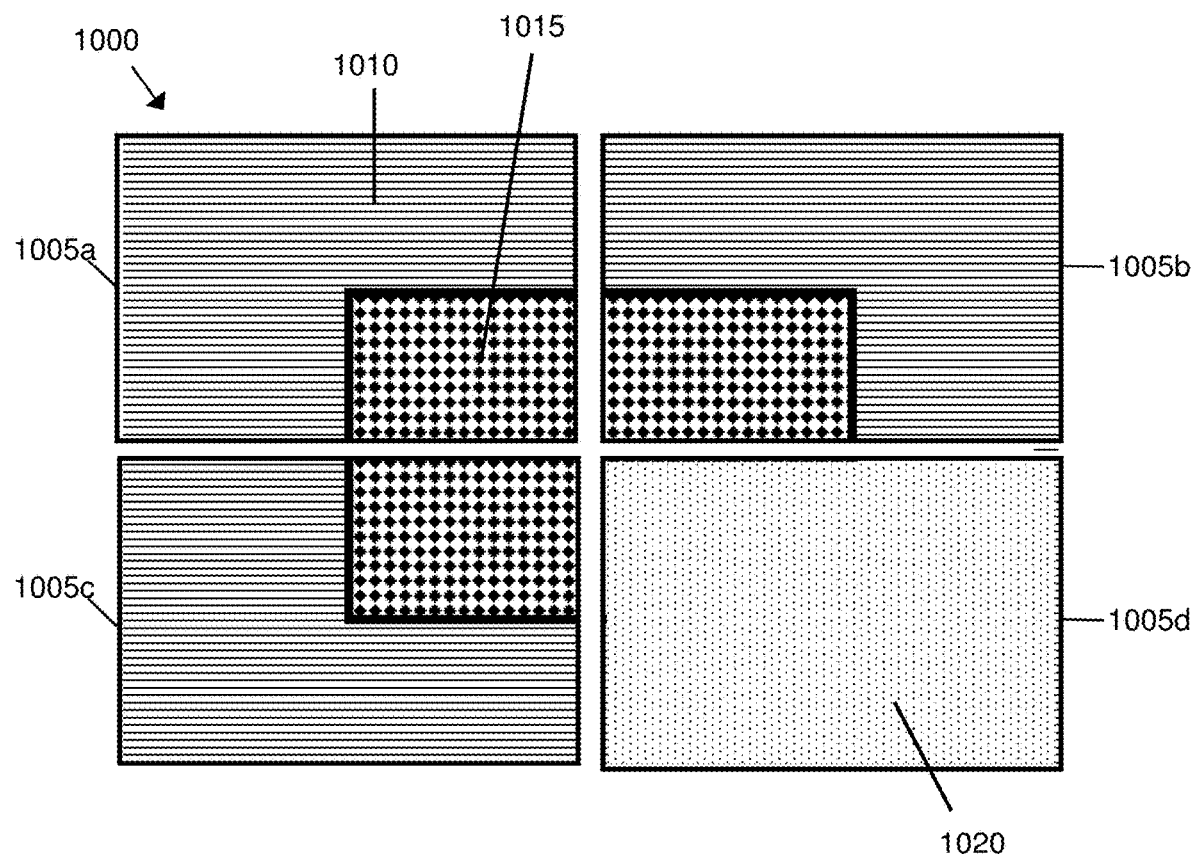
FIG. 10 shows a schematic representation of a video wall according to an embodiment of the first aspect of the invention.

FIG. 10 shows a schematic representation of a video wall 1000. The video wall comprises an array of four displays 1005a-d in a two-by-two layout. The video wall 1000 is configured to display three windows 1010, 1015, 1020. Each window 1010, 1015, 1020 represents a video served by a video server, and by analogy the window also represents a video frame of the video. Each window 1010, 1015, 1020 has a corresponding layer number, with window 1015 having a higher number than window 1010 and window 1020 having a higher number than window 1015. In a region where two windows 1010, 1015, 1020 overlap, the window with the highest layer number is displayed.

Window 1010 (shown in horizontally hatched shading) is displayed at a size equal to the combined area of all four displays 1005a-d.

Window 1015 (shown in diamond shading) is displayed at a size equal to a single display, and located in the geometric centre of the video wall. As such, the top-left quarter of window 1015 is displayed on the top-left display 1005a, the top-right quarter of window 1015 is displayed on the top-right display 1005b and the bottom-left quarter of window 1015 is displayed on bottom-left display 1005c.

Window 1020 (shown in dotted shading) is displayed at a size equal to a single display, filling the bottom-right display 1005d. As such, no portion of windows 1010 and 1015 is displayed on the bottom-right display 1020.

As set out above, each multicast stream corresponds to a portion of a video. Each such portion comprises a block of pixels in a video frame. A video output device determines the relevant streams to which it should subscribe based on determining a position of the video frame relative to the associated display. In some embodiments, determining the location on the display comprises determining a mapping of at least one pixel of the display to a location in the video frame. For example, pixels in the bottom-right quarter of the top-left display 1005a map to positions on the top-left quarter of the video frame in window 1015. Based on the mapping, it is thus determined that the video output device should subscribe to streams corresponding to the top-left corner of the video of window 1015.

Furthermore, pixels in the remaining three quarters of the top-left display 1005a map to positions in the top-left three quarters of the video frame in window 1010. Based on the mapping, it is thus determined that the video output device should subscribe to streams corresponding to the top-left corner of the video of window 1010. The "positions" referred to above may be defined by horizontal and vertical co-ordinates on the display, the canvas and/or the video frame.

In some examples, the mapping is such that a block of pixels received from a given stream is displayed on a block of pixels of the display, the block of pixels of the display having the same dimensions as the received block of pixels. In other examples, the mapping is such that a received block of pixels from a given stream is displayed on a block of pixels of the display, with pixel values of the block of pixels of the display being determined by interpolating between pixel values of the received block of pixels. For example, the video frame data may be displayed with a rotation angle with respect to the display such that a single pixel of the display does not correspond to a single pixel of received video frame data. In such a case, the pixel values of the display are determined by interpolating between pixel values of the received video frame data.

Figure 11:
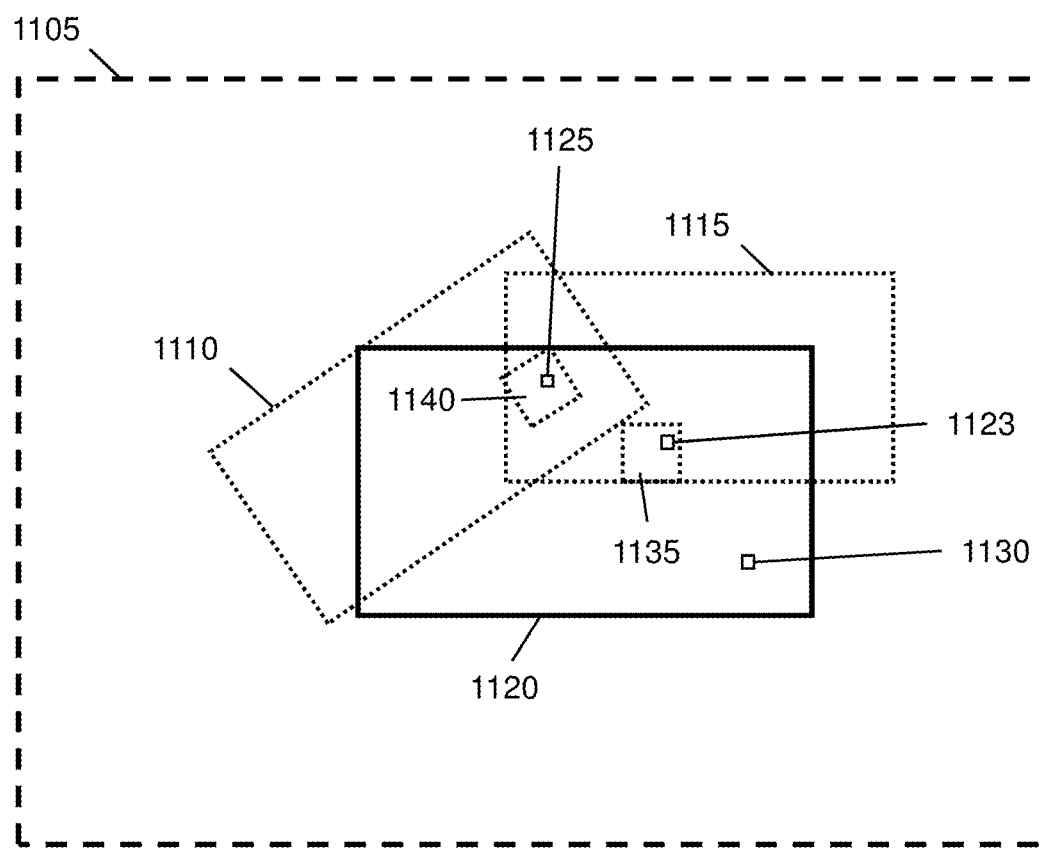
FIG. 11 shows a schematic representation of a layout of a display, a canvas and two video windows according to embodiments of the first and second aspects of the invention.

FIG. 11 shows a schematic representation of a mapping as described above, according to an example. A canvas 1105 is defined. The canvas 1105 is a virtual area in which windows 1110, 1115 are positioned. Each window 1110, 1115 displays video frame data. An area 1120 of the canvas 1105 corresponds to a display, such that portions of windows 1110, 1115 that fall within the display area 1120 are displayed at pixels in corresponding portions of the display.

The video output device maps each pixel of the display 1120 to a corresponding position on the canvas 1105. From this, the video output device maps each such position on the canvas to a position in each relevant window. For example, a pixel 1123 of the display maps onto a corresponding position in window 1115, and a pixel 1125 of the display maps onto corresponding positions in both window 1110 and window 1115. A pixel 1130 does not map onto a corresponding position in any window.

As outlined above, each multicast stream corresponds to a portion of a video, for example a fixed-size 240×135 pixel block. Examples of such blocks are represented in FIG. 11 as dotted squares within each window 1110, 1115. The video output device determines blocks that include the aforementioned positions in each window. The video output device then subscribes to streams corresponding to each determined block. For example, pixel 1123 maps to a position within block 1135 of window 1115; the video output device would thus subscribe to the stream corresponding to this block. Pixel 1130 does not correspond to a position within any window; thus no stream would be subscribed to based on this pixel.

Pixel 1125 maps to a position within window 1115 and also to a position within window 1110. The video output device determines which window 1110, 1115 should be displayed at this position. As described above, each window 1110, 1115 has an associated layer number and the window 1110, 1115 with the highest layer number is displayed in any such overlapping regions. In the present example, window 1110 has a higher layer number than window 1115. Pixel 1125 maps to block 1140 within window 1110, and thus the video output device would subscribe to a stream corresponding to this block. Window 1110 and thus block 1140 is rotated at an angle with respect to the display 1120. As such, once video frame data relating to this block has been received, the video output device may interpolate between pixel values of the block to determine corresponding display pixel values, based on the rotation angle.

Figure 12:
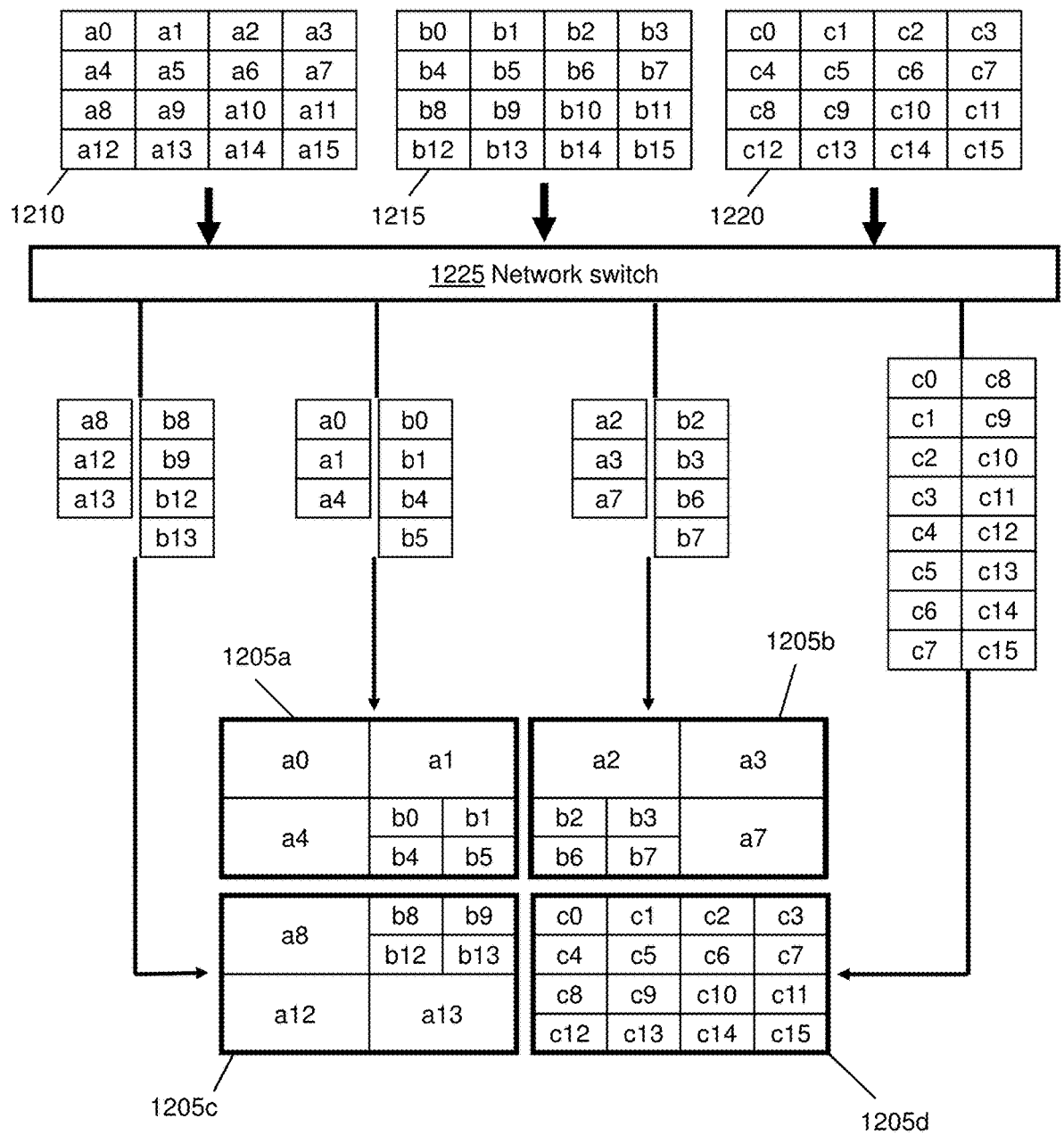
FIG. 12 shows an example of transmission, receipt and display of streamed video data on displays of a video wall according to an embodiment of the first aspect of the invention.

FIG. 12 shows an example of transmission, receipt and display of streamed video data on displays 1205a-d of a video wall.

Three videos 1210, 1215, 1220 are to be displayed on displays 1205a-d. Each display 1205a-d has a resolution of 1920×1080 pixels. The videos 1210, 1215, 1220 are to be displayed in the example arrangement shown in FIG. 10, such that video 1210 is displayed at a size equal to the combined area of all four displays 1205a-d, video 1215 is displayed at a size equal to a single display and located in the geometric centre of the video wall, and video 1220 is displayed at a size equal to a single display, filling the bottom-right display 1205d. Video 1220 has a higher layer number than video 1215, and video 1215 has a higher layer number than 1210.

Each video 1210, 1215, 1220 is divided into a four-by-four grid of pixel blocks. Each video 1210 has a resolution of 3840×2160 pixels. Each block therefore has a size of 960×540 pixels. Large blocks are presented in FIG. 12 for ease of explanation, but blocks of other dimensions may alternatively be used. For example, a 1920×1080 pixel video frame may be divided into an 8×8 grid of blocks, each with a size of 240×135 pixels.

A larger block size requires a smaller number of multicast streams for each video, but requires a higher bandwidth for each stream. A given video output device would need to subscribe to such a high-bandwidth stream even if only a small number of pixels were required from that stream. This would increase the required network bandwidth. Conversely, a smaller block size decreases the required bandwidth for each block, but increases the total number of streams that must be handled by the network switch. The size of the blocks may be optimised based on a balance between these factors.

The size of a given block may be predetermined. In other examples, the size of a given block is varied, for example by a stream controller connected to the network. This allows the block size to be varied based on network conditions, for example available bandwidth and/or network switch processor load.

In FIG. 12, the blocks of video 1210 are identified sequentially as blocks a0-a15, the blocks of video 1215 are identified sequentially as blocks b0-b15, and the blocks of video 1220 are identified sequentially as blocks c0-c15. A multicast stream corresponding to each such block is transmitted to a network switch 1225.

A video output device associated with each display 1205a-d determines which blocks of each video are to be displayed on its corresponding display 1205a-d. The video output device then subscribes to the streams corresponding to those blocks.

As such, the video output device corresponding to display 1205a subscribes to streams corresponding to blocks a0, a1 and a4 of video 1210, and blocks b0, b1, b4 and b5 of video 1215. It does not subscribe to the stream corresponding to block a5 of video 1210, because video 1215 overlaps video 1210 in that region and has a higher layer number. As such, block a5 is not displayed.

Similarly, the video output device corresponding to display 1205b subscribes to streams corresponding to blocks a2, a3 and a7 of video 1210, and blocks b2, b3, b6 and b7 of video 1215. It does not subscribe to the stream corresponding to block a6 of video 1210, because video 1215 overlaps video 1210 in that region and has a higher layer number. As such, block a6 is not displayed.

The video output device corresponding to display 1205c subscribes to streams corresponding to blocks a8, a12 and a13 of video 1210, and blocks b8, b9, b12 and b13 of video 1215. It does not subscribe to the stream corresponding to block a9 of video 1210, because video 1215 overlaps video 1210 in that region and has a higher layer number. As such, block a9 is not displayed.

Finally, the video output device corresponding to display 1205d subscribes to streams corresponding to all blocks c0-c15 of video 1220. It does not subscribe to any of the streams of videos 1210 and 1215, because video 1220 is arranged to fill display 1205d and has the highest layer number. As such, no block of videos 1210 and 1215 is displayed on display 1205d.

As noted above, the displays 1205a-d each have a resolution of 1920×1080 and the videos 1210, 1215, 1220 each have a resolution of 3840×2160. As such, video 1210 is displayed at full resolution and videos 1215 and 1220 are displayed at half resolution. In some embodiments, videos 1215 and 1220 are received at full resolution and downscaled to half resolution by the video output device. In other embodiments, each video source stores multiple downscaled versions of each block, with each version being streamed as a separate multicast stream. For example, streams may be provided with downscaling factors of 100%, 75%, 50% and 25%, or 100%, 50% and 25%, or 100%, 50%, 25% and 12.5%. This increases the required bandwidth from the video source to the network switch 1225. This also increases the number of multicast groups, which correspondingly increases the processing load on the network switch 1225. However, this reduces the required bandwidth from the network switch 1225 to a video display device that subscribes to a downscaled stream. Furthermore, this eliminates the need for the video output device to downscale received video from the full resolution, which reduces the degree of processing that must be performed by the video output device.

The provision of multiple scaled streams from the video sources may be provided using different approaches. Two such approaches are described in the section of the description entitled 'Multiple Scaled Streams' with reference to FIGS. 27 to 35.

In addition to resolution, other examples of video quality include bit depth and the degree of compression applied to each block. Separate multicast streams may be provided from a given video source based on any of these, or other examples of video quality. For example, different chroma subsampling schemes such as 4:2:2 and 4:2:0 may be provided in different streams. In such embodiments, a subscription request comprises an indication of a desired video quality. For example, each stream of a particular quality may have a separate multicast group address. The subscription request would then identify the specific multicast group address corresponding to the desired quality. The received video frame data then comprises video frame data at that desired video quality. In an embodiment, the available video qualities are determined on the fly by a stream controller, and communicated from the stream controller to each video output device and video source. For example, the maximum available video quality may be altered to take into account changing network conditions.

Although the blocks may be compressed using for example JPEG compression, such a compression algorithm would potentially cause spikes in the data rate over the network for example where a series of detailed blocks is transmitted in succession, as efficient JPEG compression relies on some areas of a compressed image having little detail and thus being highly compressed. A discrete cosine transform compression algorithm with a fixed compressed size per compressed block of data is particularly advantageous in the present system, because it ensures minimal variability in the data rate over the network. Such an algorithm may for example be based on a modification of the discrete cosine transform algorithm that is used in JPEG compression, to remove higher frequencies more harshly and to give more colour depth to less detailed areas. A constant compressed size per block ensures that the network data rate is more easily monitored to ensure that network capacity is not exceeded.

FIG. 13 shows a table of example pixel rates of video data of various bit depths at various resolutions with corresponding data rates required to transmit uncompressed video data at each resolution with various subsampling schemes. For example, assuming for simplicity that a given source provides a single multicast stream for each block of a given video frame, a data rate of 0.69 Gbit/s would be required for a video source to provide uncompressed 720p60 video frame data to network switch. Similarly, a data rate of 0.69 Gbit/s would be required for the network switch to provide such 720p60 video frame data to a given video output device. Such data transmissions could thus be handled by a 1 Gb non-blocking network switch. Because the video source provides a multicast stream corresponding to each block of a video frame, the bandwidth of video frame data streamed from a video source will not change, regardless of how many displays the video frame is spread across. Similarly, depending on the number of blocks into which each video stream is broken, the bandwidth of video frame data streamed from the network switch to an video output device may not be significantly higher than the bandwidth required to stream a single video frame to that video output device. The aforementioned 1 Gb non-blocking network switch would thus be usable regardless of how many video sources or video output devices operate on the network, and regardless of how many different videos are simultaneously displayed on the video wall.

Conversely, if a video source could provide video at 4k60 resolution and each video output device could output 1080p60 video to its corresponding display, the system may be configured such that the video source compresses video using a 4:1 compression scheme. A network switch with a 10 Gb connection for the or each video source, and a 1 Gb connection for each video output device, could then be used. From the table in FIG. 7 it may be seen that uncompressed 4k60 video, using a 4:4:4 sampling scheme with a bit depth of 8 bits, would require a data rate of 12.4 Gbit/s. If compressed at a 4:1 ratio this would require a quarter of that, i.e. 3.1 Gbit/s into the network switch. Given four video output devices, each video output device would then extract 1080p60 video data at a quarter of 3.1 Gbit/s i.e. at around 0.78 Gbit/s.

In an embodiment, a video output device determines a change of the location, on its corresponding display, at which a video frame is displayed. Such a change in location may mean that a greater or lesser extent of that video frame is displayed. For example, a video frame may be moved partially on to the display or partially off the display. As another example, a video frame may be moved such that a previously-overlapped portion of another video frame is exposed. Based on the determined change in location, the video output device determines a particular further multicast stream to request. The video output device then transmits a further subscription request to the network switch, the further subscription request identifying the particular further multicast stream. In embodiments, this process is performed on a frame-by-frame basis such that streams are subscribed to in real time based on such changes in locations. The window locations may change faster than the time required for a video output device to subscribe to a new stream. In some embodiments the video output device does not render such a change in window location until video frame data has been received from the new stream. For example, there may be a delay of one frame in rendering the location update. In order for such changes in window location to be promptly rendered, it is preferable for the network switch to be capable of responding promptly to a subscription request, for example within a time corresponding to a single frame.

Figure 14:
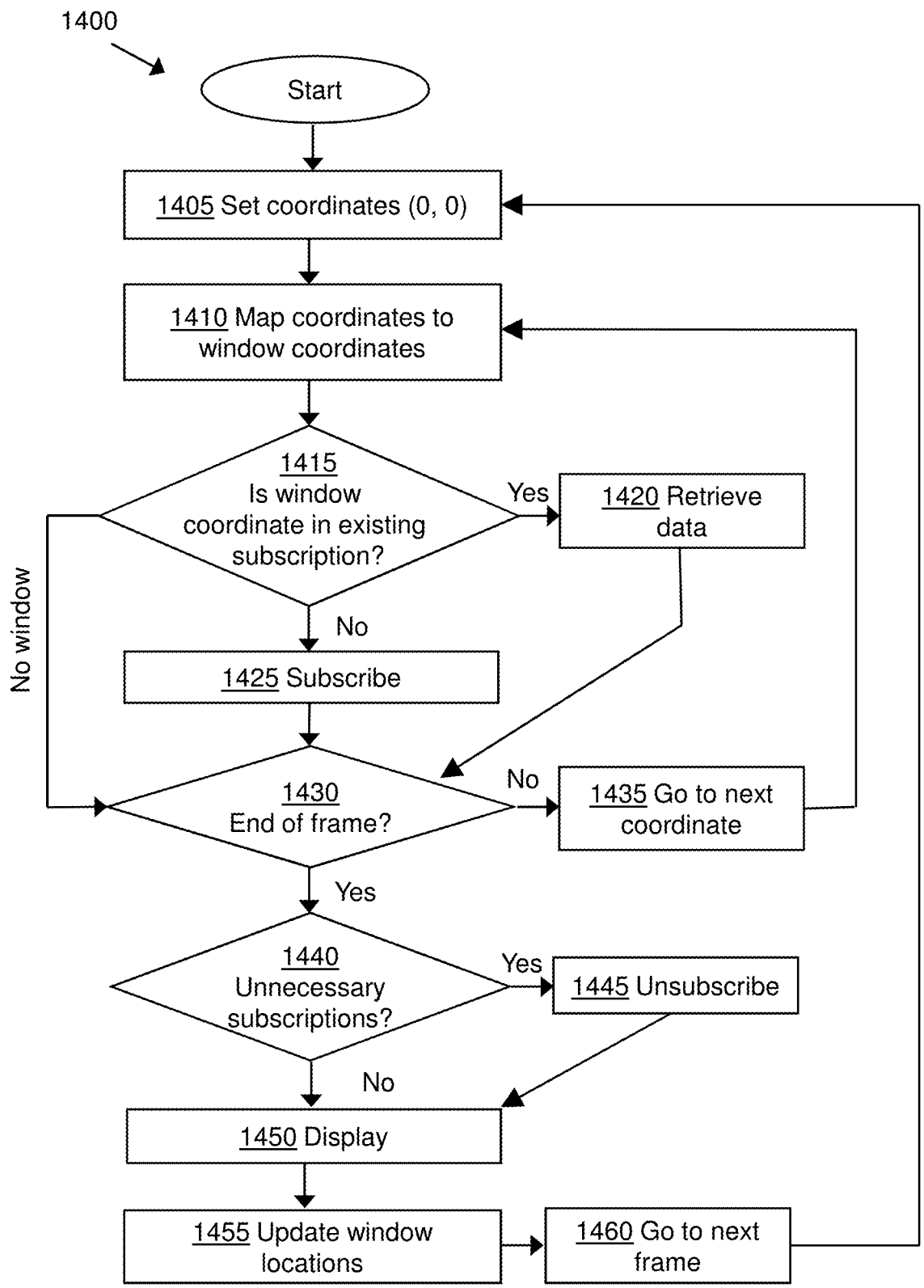
FIG. 14 shows an example procedure for a video output device to subscribe to streams according to an embodiment of the first aspect of the invention.

FIG. 14 shows an example procedure 1400 for a video output device to subscribe to streams, based on the mapping approach discussed above in relation to FIG. 11. The procedure takes into account changes in locations at which a given video is to be displayed.

At step 1405, the display coordinates are set to (0, 0) which may for example represent the top-left pixel of the display.

At step 1410, the display coordinates are mapped to the window coordinates as outlined above in relation to FIG. 11. In other words, this step determines which particular window is to be displayed at that pixel of the display (if any) and, for that particular window, what coordinates of the window are relevant for that pixel of the display.

If no window is to be displayed at the (0, 0) pixel, the flow proceeds to determining whether the end of the frame has been reached at step 1430.

If a window is to be displayed, the procedure determines at step 1415 whether the determined window coordinate corresponds to a stream to which the video output device is subscribed.

If the video output device is already subscribed to that stream, video frame data corresponding to the window coordinates is retrieved, for example from a cache of the video output device which has earlier received video data from the corresponding stream, at step 1420. The corresponding display pixel value is then determined and stored in a display buffer in preparation for outputting to the display. Determining the display pixel value may comprise interpolating between window pixel values as described above in relation to FIG. 11.

If the video output device is not already subscribed to that stream, the video output device subscribes to that stream at step 1425. For example, the video output device may maintain a record of available streams and the video frame blocks to which each stream relates. In some embodiments, updates to such a record are communicated to the video output device by a stream controller. For example, a stream controller may transmit such an update in response to receiving an indication of a change in available streams from a particular video source. Video frame data from that stream is thus received and cached. The corresponding display pixel value is then determined and stored in the display buffer.

The procedure then determines at step 1430 if all pixels of the display have been accounted for i.e. whether the end of the display frame has been reached.

If the end of the frame has not been reached, the procedure moves to step 1435 in which display coordinates are updated to the next coordinates of the display, and the flow returns to mapping the new display coordinates to window coordinates at step 1410. In this manner, the procedure can be repeated pixel-by-pixel across the display, determining a mapping of each display pixel to corresponding window coordinates, and subscribing to streams as required. The repeat loop for cycling through the pixels of the display may, for example, correspond to a scan of pixels across a first line of the display, followed by a scan of pixels across a second line of the display and so on. Hence, the procedure can perform a raster-like scan across the pixels of the display.

If the end of the display frame has been reached, the procedure moves to step 1440. At step 1440 it is determined whether the video output device is subscribed to any subscriptions that correspond to video frame regions that will not be displayed. For example, window locations may have changed such that a previously-displayed region is now overlapped by another window. As another example, window locations may have changed such that a previously-displayed region is now displayed on a different display of the video wall. In one embodiment, at step 1420 a flag is set corresponding to each subscription from which data is retrieved. Similarly, at step 1425 a flag is set corresponding to each new subscription. The flags thus identify necessary subscriptions. As such, any remaining unflagged subscriptions correspond to video frame regions that will not be displayed.

If such unnecessary subscriptions are determined, the video output device unsubscribes from these subscriptions at step 1445. In some embodiments, unsubscribing comprises transmitting an unsubscribe request to the network switch. In response to receiving such a request, the network switch stops transmitting that stream to the video output device.

The procedure then moves to step 1450. At step 1450, the buffered display pixel values for the complete frame are output to the display. In doing so, the display buffer is emptied in preparation for the next frame.

The positions of the window(s) on the canvas are then updated at step 1455, preferably within a vertical blank of the canvas frame. The positions of the windows may, for example, be updated based on a time-based movement of the windows across the display and/or a sudden appearance, disappearance or reconfiguration of a window or windows on the video wall.

Finally, the flow proceeds at step 1460 to the next video frame, whereby the display coordinates are reset to (0, 0) at 1405, and the aforementioned steps of the procedure repeated for the next frame and so on.

In an alternative procedure to FIG. 14, the display of buffered display pixel values may occur before the end of the frame, for example, on a line-by-line or pixel-by-pixel basis.

In a further alternative, the procedure of FIG. 14 may be performed without retrieving or displaying data but just determining which streams to subscribe to or unsubscribe from.

Figure 15:
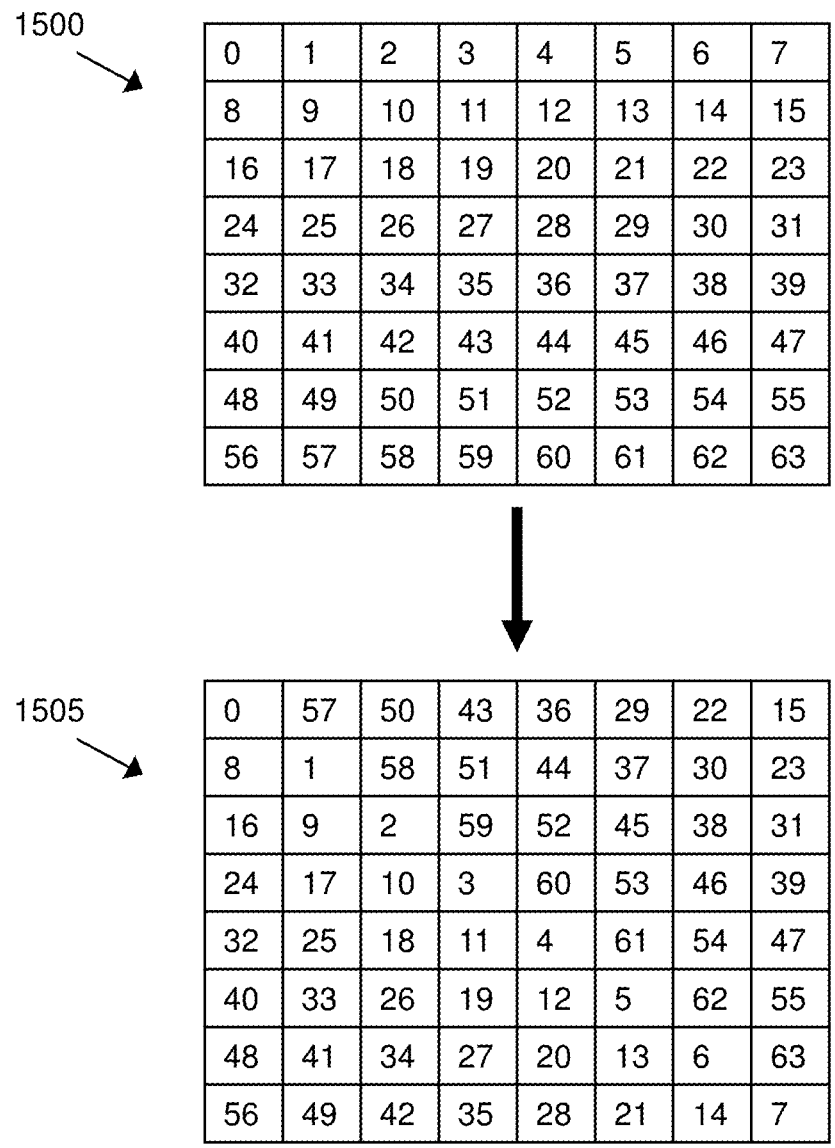
FIG. 15 shows an ordering of blocks of video frame data for transmission according to an embodiment of the first aspect of the invention.

FIG. 15 shows an ordering of blocks of video frame data for transmission, according to an embodiment. A video frame 1500 is divided into an 8-by-8 grid of blocks. The blocks are numbered sequentially from 0 to 63. Video frame data of each block is transmitted in a separate multicast stream. Data of each multicast stream is transmitted from the video source in series.

In some embodiments, transmissions from each video source to the network switch are synchronised, for example with a display refresh rate. For example, each video source could transmit blocks in series from block 0 to block 63. Streams corresponding to equivalent areas of different videos would thus arrive at the network switch at the same time. For example, video frame data corresponding to the top-left corner of each video, i.e. block 0, would be transmitted from corresponding video sources simultaneously.

With some window arrangements, a given video output device may subscribe to streams corresponding to equivalent areas of multiple videos. For example, an output box may display the top portion of each of many videos. As such, in embodiments wherein transmissions from each video source are synchronised, a large number of streams would simultaneously arrive at the network switch and require transmitting to the output video device. This would require a high peak network bandwidth. In one example, such streams are buffered by the network switch and transmitted spread out in time. This would maintain the same average bandwidth but reduce the required peak bandwidth. However, the network switch may have insufficient memory for buffering such a quantity of video frame data.

Two examples of embodiments will now be described which address possible size limits of memory of the output buffer of the network switch. In one embodiment, the blocks of the video frame data are pseudorandomly re-ordered, such that consecutive blocks are not transmitted sequentially. In another embodiment, the blocks of the video frame data are further divided into multiple packets. The packets are transmitted spread out in time over the video frame. This avoids an overrun of the buffer of the network switch, even in the case where several multicast blocks are subscribed to.

In the first example according to some embodiments, the blocks 0 to 63 of video frame 1500 are reordered for transmission such that video frame data corresponding to adjacent portions of a single video frame 1500 is transmitted nonconsecutively. For example, video frame data corresponding to adjacent portions of a single video frame 1500 may be transmitted in a pseudorandom order. The order may be optimised to avoid overloading the network switch as outlined above. FIG. 15 shows the blocks of video frame 1500 re-ordered in such a manner 1505. Each column of the re-ordering 1505 comprises a cyclic permutation of the corresponding column of video frame 1500. As an illustrative example, the re-ordering 1505 is such that blocks 0-7 corresponding to the top edge of video frame 1500 are not adjacent to each other. Similarly, blocks corresponding to the left, right and bottom edges of video frame 1500 are not adjacent to each other.

Adjacent blocks of the video frame 1500 are thus transmitted nonconsecutively. Each video source 1500 may re-order video frames based on a different re-ordering, such that for example top-left block 0 from one video source is not transmitted at the same time as top-left block 0 from another video source. This reduces the peak bandwidth required when a given output box subscribes to equivalent blocks, for example the top-left corner, from multiple video sources.

A consequence of such re-ordering is that delays are caused in providing streams from a video source. For example, a video source may retrieve a given frame from a video store, in preparation for re-ordering and transmitting, in a line-by-line or block-by-block fashion. The source would thus retrieve blocks 0-7 first, followed by blocks 8-15, and so on. However, in the re-ordering 1505, block 0 is transmitted first and followed by block 57. The video source would thus need to wait until it had retrieved block 57, which is located on the last line of the re-ordering 1505. This adds up to one frame to the system latency.

Figure 16:
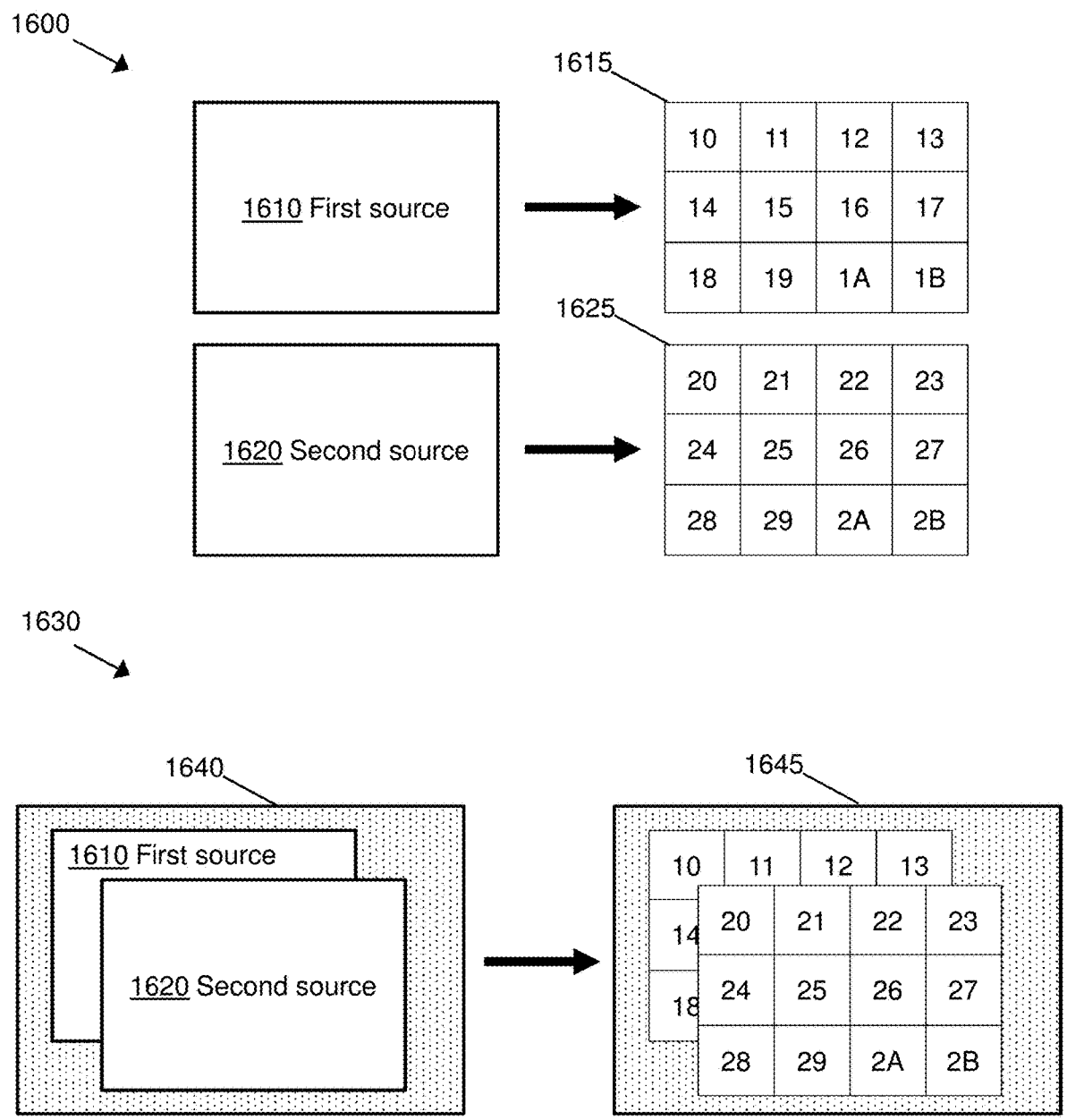
FIG. 16 shows a division of video frame data for transmission and an example of a display layout according to an embodiment of the first aspect of the invention.

FIG. 16 shows a window arrangement, according to an embodiment. A first video source 1610 is divided into a 3-by-4 grid of blocks 1615. The blocks are sequentially numbered in hexadecimal from 10 to 1B. A second video source 1620 is divided into a 3-by-4 grid of blocks 1625, whereby the blocks are also hexadecimally numbered from 20 to 2B. Video frame data of each block is transmitted in a separate multicast stream.

In some embodiments, the first video source 1610 and second video source 1620 are arranged on a display 1640, whereby the first video source 1610 may be partially obscured by the second video source 1620. The arrangement of the grid of blocks 1615 from the first video source 1610 and the grid of blocks 1625 from the second video source 1620 are displayed in the corresponding display 1645.

In such an embodiment, transmission from each video source to the network switch may be synchronised, for example with a display refresh rate. For example, the first video source 1610 could transmit blocks in series from blocks 10 to 14 simultaneously to the second video source 1620 transmitting blocks in series from blocks 20 to 24. Streams corresponding to equivalent areas of different video sources would thus arrive at the network switch at the same time. Simultaneous arrival of multiple blocks risks overrunning the buffer at the output of the network switch.

Figure 17:
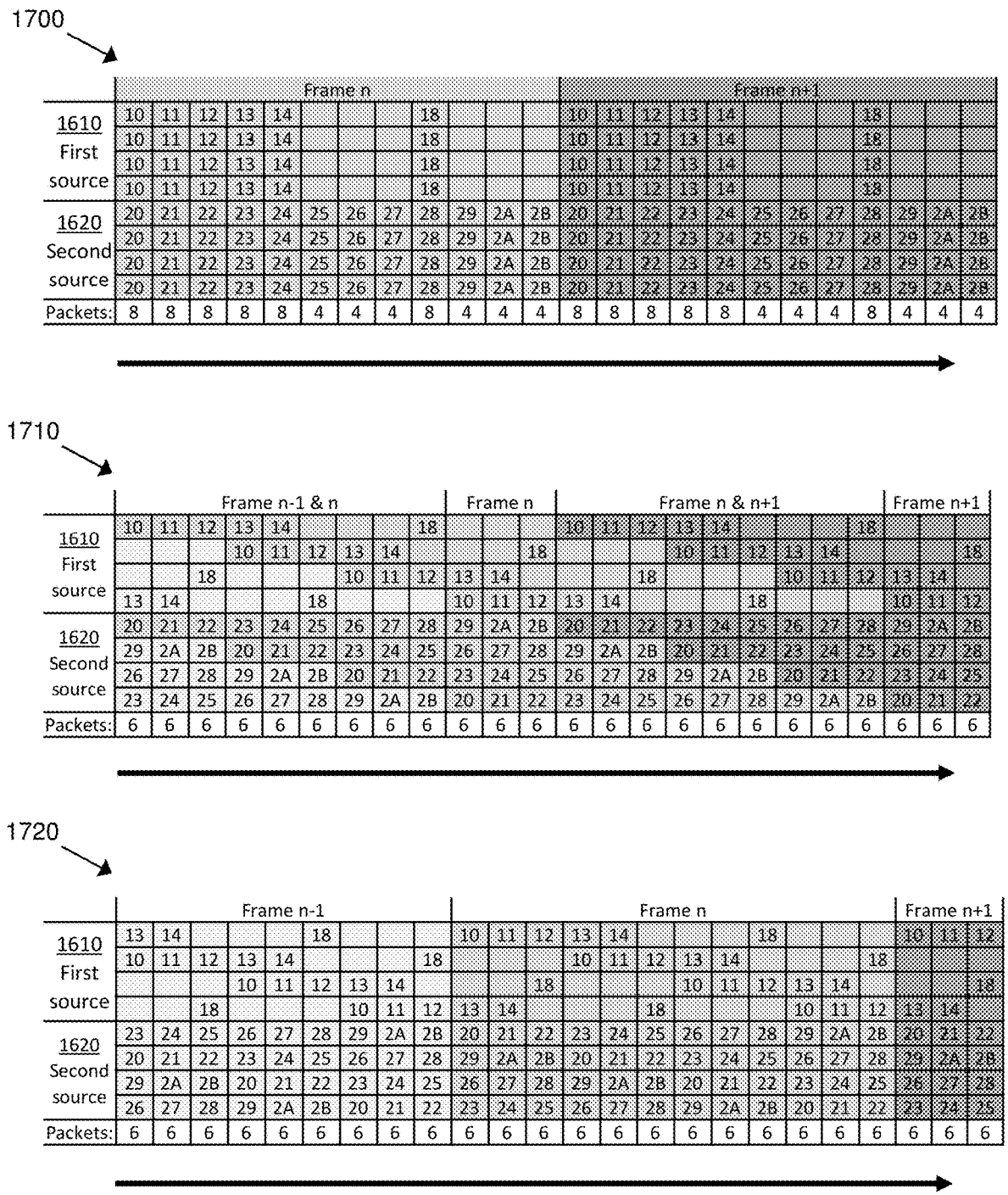
FIG. 17 shows a schematic representation of transmission of packets of video frame data according to an embodiment of the first aspect of the invention.

FIG. 17 shows three timing diagrams for the transmission of the blocks from the network switch for different video sources 1610 and 1620. The blocks originate from the first video source 1610 and the second video source 1620 for the display arrangement 1645 of FIG. 16 in which the first video source 1610 is partially obscured by the second video source 1620. Each block (or multicast stream) of a video frame is split into multiple data packets. For simplicity, FIG. 17 shows 4 data packets per block but in a typical system, the blocks may be divided into many more packets.

In the display arrangement 1645 shown in FIG. 16, the transmission of data packets, originating from the first video source 1610 and second video source 1620, would ordinarily follow the timing diagram 1700. Two sequential-in-time frames, Frame n and Frame n+1, are displayed. The number of packets transmitted to the network switch fluctuates from 8 to 4, wherein the higher transmission rate of 8 packets risks an output buffer overrun. In the timing diagram 1700, all 4 of the data packets that constitute block 10 are sent to the network switch at the same time. Note that although unsubscribed blocks are not shown for simplicity in the timing diagram, they would still be sent from the source to the switch. However, since they are unsubscribed, these blocks would not be sent from the switch to the output and thus would not cause a buffer overrun at the switch's output.

In the second example in one embodiment 1710, the data packets of Frame n, originating from the first video source 1610 and the second video source 1620, can be spread across the neighbouring frames. The data packets that constitute Frame n are interleaved in time with the preceding frame, Frame n-1 (lighter shaded area), and the proceeding frame, Frame n+1 (darker shaded area). In the timing diagram 1710, the 4 data packets that constitute block 10 are sent to the network switch at different times, whereby each successive packet in the sequence is sent at a later point in time (i.e. there is a delay between each packet). In such an example, at any specific time, there may be transmission of data packets from multiple frames to the network switch. The total number of packets transmitted to the network switch remains constant in time (i.e. the overall packet rate remains constant), and a risk of an output buffer overrun is reduced.

In the second example in a separate embodiment 1720, the data packets, originating from the first video source 1610 and the second video source 1620, can be spread across a single frame, Frame n. The data packets corresponding to each frame are spread in time across that, and only that, frame. In the timing diagram 1720, the 4 data packets that constitute block 10 are sent to the network switch at different times. However in contrast to the example above, the data packets corresponding to consecutive blocks may not be sent in order. For example for Frame n, one data packet from block 13 is transmitted before a data packet from block 11. In such an example, at any specific time, there will only be transmission of data packets from a single frame to the network switch. In such an embodiment, the number of packets transmitted to the network switch remains constant in time, but introduces a one frame latency in the system. Transmission of all data packets from each corresponding block from the video source is required to have completed before transmission to the network switch.

The splitting of the blocks (or multicast steams) into multiple packets and the distribution of those packets in time across a frame is described above as taking place in the video source(s). However, similar benefits can be achieved by the network switch receiving a block and spreading the multiple packets out in time at the output of the switch. For example, the switch can receive the data for a multicast stream at an input buffer according to the timing diagram 1700 but provide that data as a sequence of data packets at an output buffer according to the timing diagrams 1710 or 1720. A general processing unit in the switch can be responsible for selectively retrieving the packets from the input buffer at the appropriate time.

The transmission of data packets across a single frame allows for a simultaneous transmission of a plurality of subscribe/unsubscribe requests. In such an example, when the transmission of all data packets has completed at the end of the frame period, a plurality of subscribe and unsubscribe requests may be transmitted from the video display devices. Simultaneous transmission of requests provides a simpler solution when the plurality of video display devices have different frame rates and synchronisations.

Distributed Video Wall

FIGS. 18 to 26 show examples and representations relating to the distributed aspect of the present invention.

When describing embodiments of the multicast aspect of the present invention previously, the term 'video output device' was utilized. In the following descriptions of the distributed aspect of the present invention, the term 'video client' will instead be used.

Figure 18:
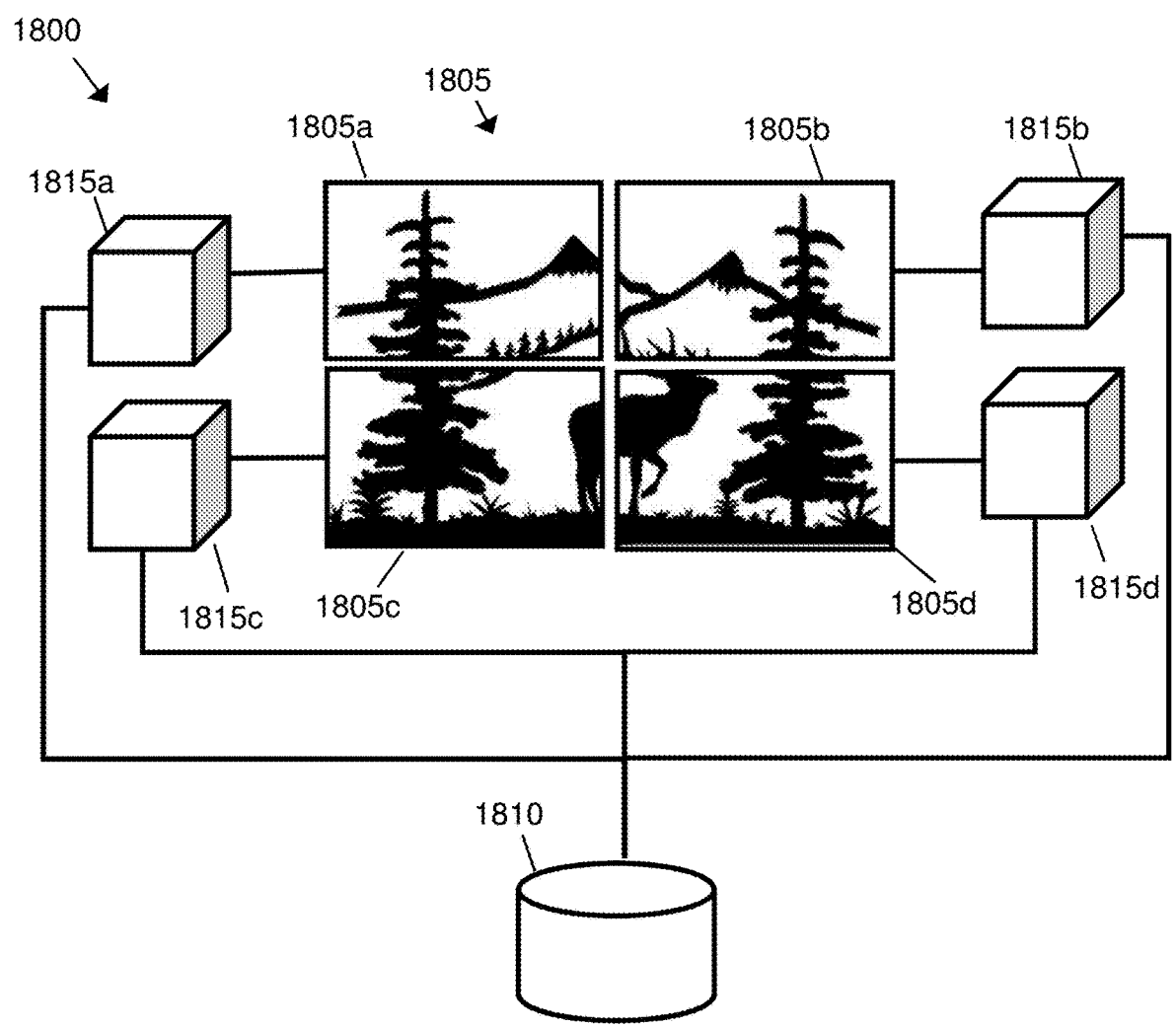
FIG. 18 shows a video wall system according to an embodiment of the second aspect of the invention.

Referring to FIG. 18, there is shown an example video system 1800. The system 1800 comprises a video wall 1805 comprising an array of four display devices 1805a-d arranged in a two-by-two layout. Although the video system 1800 is shown as a video wall system, it will be appreciated that embodiments of the present disclosure are also applicable to other video systems including, for example, systems where a plurality of displays do not necessarily form a video wall. Example video systems include systems used in courtrooms, government assemblies, boardrooms, command & control centers, simulators, operating theatres, television studios, live stage events, casinos and sports stadiums.

Each display device may, for example, be a computer monitor, a video projector or a television screen. The displays may be general-purpose display devices or, alternatively, they may be display devices designed specifically for use in a video wall 1805.

The system 1800 comprises at least one video server 1810. The video server 1810 is configured to provide video frame data for display on the video wall 1805. In some embodiments, a single video server provides a single identifiable video for display on the video wall 1805. In another embodiment, a single video server 1810 provides multiple identifiable videos for simultaneous display on the video wall. In a further embodiment, the system 1800 comprises a plurality of video servers 1810, each of which are configured to provide respective video frame data for display on the video wall 1805. In the case where there are multiple video servers 1810, some video servers may provide single videos while other video servers provide multiple videos for simultaneous display on the video wall. In some examples, multiple video servers 1810 provide the same video frame data. Such an arrangement provides redundancy in the system so that a loss of video from one video server 1810 can be compensated for by the provision of the same video from another video server.

In some embodiments, for example where provision of video frames would require particularly high bandwidth or processing power, a single source video can be divided, for example spatially, into separate videos, each corresponding to a region of the single source video. For example, video frames may be divided into a number of evenly spaced vertical strips.

The system then handles these vertical strips as separately identifiable videos. The separate videos can then be provided by separate video servers. This approach is useful for relatively high resolution source videos.

A video served by the video server 1810 may be identifiable or addressable in the system by a video identifier. The video may comprise a sequence of video frames, and individual video frames may be identifiable or addressable in the system, for example, by a video frame identifier or a timing identifier.

In the example shown in FIG. 18, the video server 1810 provides a single video for display across the entire video wall 1805 such that the top-left quarter of a given video frame is displayed on display device 1805*a*, the top-right quarter is displayed on video device 1805*b*, the bottom-left quarter is displayed on display device 1805*c* and the bottom-right quarter is displayed on video device 1805*a*. The video server 1810 is communicatively coupled with a video source, from which it receives the video frame data. The video source may, for example, comprise a storage medium such as a hard disk or flash memory for storing a video file, which can be retrieved when a video needs to be output by the video source. The video could also originate from a live source such as video from a video camera. The video source can be local to the video server such as a video on a flash memory in the same cabinet as the video server. Alternatively, the video source can be remote from the video server such as a video camera coupled via a wireless link to the video server. Preferably, the video source is provided by one or more dedicated video source devices as will be explained in more detail below.

The system further comprises a plurality of video clients 1815*a-d*. Each video client 1815*a-d* is associated with a corresponding display device 1805*a-d* of the video wall. Each video client 1815*a-d* is configured to transmit a video frame data request to a video server 1810, wherein the request is for a portion of a video frame, the portion being associated with the display of the video wall.

In some embodiments, a given video client 1815*a-d* is incorporated within the functionality of its corresponding display device 1805*a-d*. For example, a display device 1805*a-d* may comprise a dedicated video client 1815*a-d* hardware. Alternatively, a general purpose processor of a display device 1805*a-d* may implement the functionality of a video client 1815*a-d*.

The portion of the video frame may be a region within the video frame, or an area within the video frame. If the video frame is available in different resolutions, the portion of a video frame may be a portion of a video frame at a particular resolution. If the video frame at a particular resolution has particular number of pixels then the portion of the video frame may be a portion, region or area of the video frame covering a subset of the full set of pixels. If the video frame at a particular resolution is represented by a particular set of video frame data then the portion of the video frame may be a portion, region or area of the video frame incorporating a subset of video frame data.

In some examples, the requested portion may comprise a portion that, when output to the display, fills the entire frame of the display on the display device 105*a-d*. Each request can define the requested portion based on a location of the requested portion within the video frame. For example video client 1815*a*, associated with display device 1805*a*, may transmit a request for the entire top-left quarter of the given video frame.

In embodiments where a single video is divided into strips, each strip will be treated as a separate video with separate video frames, and may be served from multiple video servers. A video client 1815*a-d* may, for example, transmit a request for a portion of a video frame from one of the separate videos.

The video server 1810 is configured to receive a request for a portion of a video frame from one of the video clients 1815*a-d*, and to respond by transmitting to that video client 1815*a-d* corresponding video frame data. The video frame data comprises a portion of video frame data based on the requested portion of the video frame. A given video client 1815*a-d* thus only receives video frame data based on its respective requested portion or portions. Hence, the system avoids the need to transmit the video frame data for the entire video frame to each video client. As such, the overall bandwidth requirements of the system can be reduced.

It has been observed that, in systems in which the full or entire video frame is sent to each video client, the required network bandwidth increases with the number of displays. Similarly, the required processing power of a video server increases with the number of displays. This can increase to the point that no further displays can be added to the video wall. In the present system, each pixel or group of pixels of a video frame provided by a video server 1810 is generally transmitted only to the video client 1815*a-d* that will display that pixel on its corresponding display 1805*a-d*. As such, the overall bandwidth of video frame data requested from the video server 1810 will not be significantly higher than the bandwidth required for transmitting a single version of the video frame data, regardless of how many displays 1805*a-d* the video frame is spread across. Additional displays, with corresponding video clients, can thus be added to the system without requiring additional or upgraded video servers 1810 or corresponding video sources. This remains true if such an additional display is physically remote from the rest of the network hardware, but it may be necessary to connect the additional display via upgraded connection hardware capable of transmission over an extended distance.

Analogously, the number of video sources and/or resolution of such sources can be increased by way of an updated media server 1810 or servers capable of handling increased bandwidth, or by increasing the number of media servers 1810. Provided that each video client 1815*a-d* is capable of outputting video frame data at the maximum resolution of its corresponding display 1805*a-d*, it may not be necessary to upgrade the video clients 1815*a-d*. This remains true if an additional source and/or media server is physically remote from the rest of the network hardware, but it may be necessary to connect the additional source and/or media server via upgraded connection hardware capable of transmission over an extended distance.

After receiving the video frame data from the video server 1810, each video client 1815*a-d* then outputs display data, based on the received video frame data, to its corresponding display 1805*a-d*. For example, the display data may comprise video data compatible with the HDMI standard for transmission over an HDMI interface to the display. In some embodiments, received portions of video frame data each comprise the portion requested in the corresponding request. For example, a given video client 1815*a-d* may request and receive only the portion of video frame data that is for display on its corresponding display 1805*a-d*. In other examples, a video client 1815*a-d* may produce the display data by identifying a part of the received video frame data as not being for display, and producing the display data as not including the identified part of the received video frame data.

In some embodiments, video frame data is requestable in fixed-size blocks. The blocks may be a group of pixels, and the group of pixels may be defined by a number of pixels in the horizontal direction in a video frame, and a number of pixels in the vertical direction in the video frame. In some embodiments, a given video client 1815*a-d* transmits a request for blocks such that the requested blocks together include the region of the video frame that is for display on its corresponding display 105*a-d*. The requested blocks may also cover further regions of the video frame, adjoining the region that is for display. The video client 1815*a-b* may thus identify such further regions as not for display, and produce the display data so as to omit the data from the blocks relating to the further regions.

In an embodiment, a video client 1815*a-d* is configured to transmit at least one further video frame data request to the video server 1810, wherein the or each further video frame data request is for respective further portions of the video frame associated with the display of the video wall. For example, if video frame data is requestable in fixed-size blocks, a video client 1815*a-d* may transmit multiple requests, each request relating to a separate block. The video client 1815*a-d* then receives further video frame data from the video server, the received further video frame data each comprising a portion of video frame data based on the respective requested further video frame data. The combined requested portions can together comprise the entirety of video frame data that is for display on the video device. In such embodiments, a video client 1815*a-d* might typically be expected to request a series of adjoining portions. Based on this, the video server 1810 may, upon receiving a request or requests for one or more portions, predict further portions which are likely to be requested and prepare in advance for transmitting these further portions, for example by caching them in a memory.

In some embodiments, when a video client 1815*a-d* does not receive a given block, for example due to network errors, the video client 1815*a-d* can interpolate the missing data from surrounding pixel blocks. Alternatively, the video client 1815*a-d* may replace the missing block with a corresponding block from the previous frame, for example held in a buffer. A missing block may further be remedied by re-requesting that block, provided that enough time is available between the initial request and the time at which the pixels must be displayed. However, provided that a large number of blocks are not missing, such errors are typically not very noticeable on a display.

Figure 19:
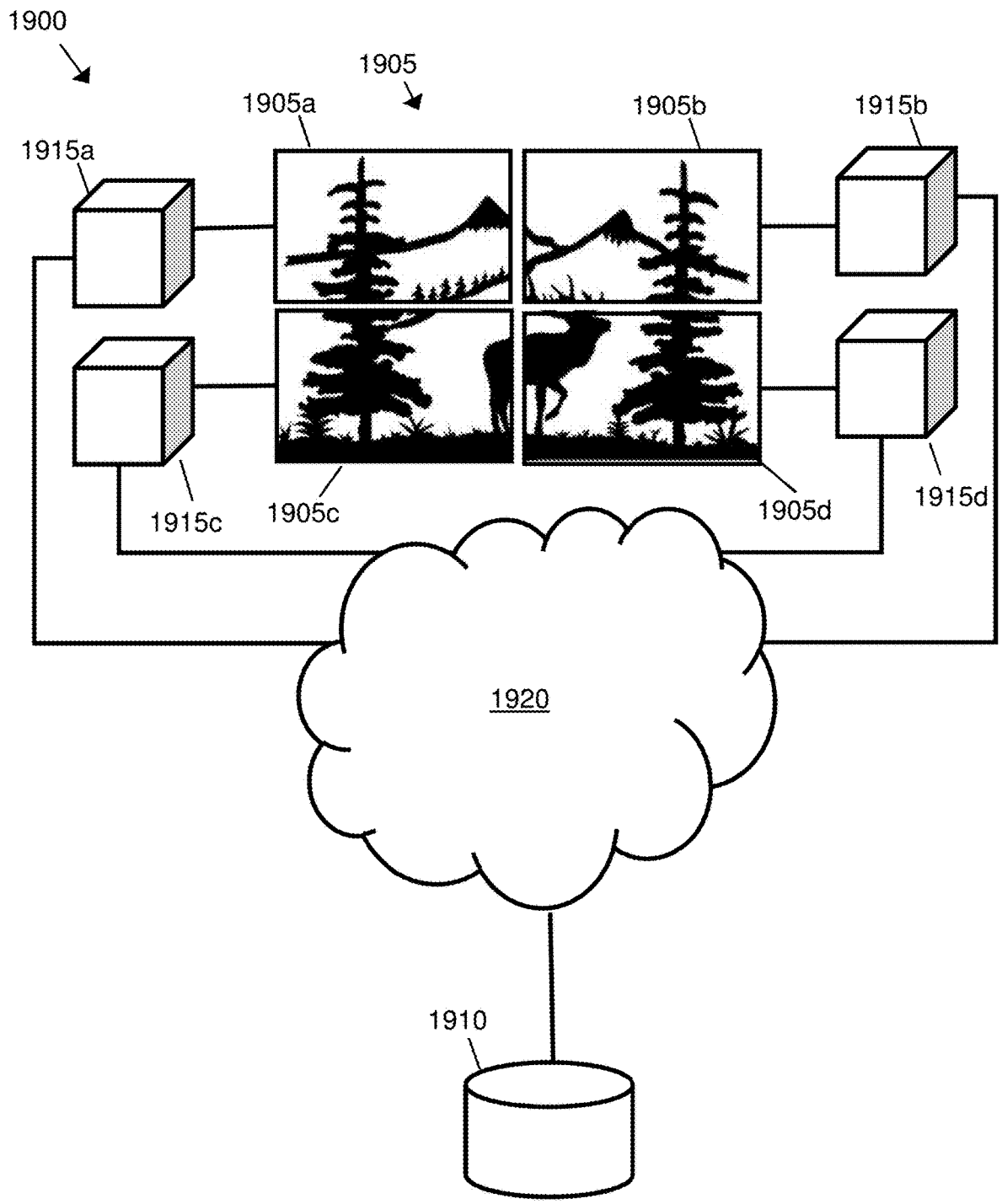
FIG. 19 shows a video wall system according to an embodiment of the second aspect of the invention.

FIG. 19 shows a video wall system 1900 according to an embodiment. The system 1900 comprises a video wall 1905 comprising display devices 1905*a-d*, one or more video servers 1910 and video clients 1915*a-d* as described above in relation to FIG. 18. In this example, the plurality of video clients 1915*a-d* and the at least one video server 1910 comprise nodes of a network 1920. Each video client 1915*a-d* is configured to transmit its requests for video data via the network 1920. The or each video server 1910 is configured to transmit video frame data via the network 1920.

Links between network nodes may for example comprise 1G, 10G or 25G copper or fibre links. The links may also be ethernet links.

The network 1920 may comprise further components. For example, the network 1920 may comprise a single network switch, such as non-blocking network switch, to link the video clients 1915*a-d* with the or each video server 1910. A network switch includes a number of bidirection input/output ports. A non-blocking network switch is one where each port can typically pass data to every other port, and typically the internal bandwidth of the switch can handle all the port bandwidths, at the same time, at full capacity. A switch may be utilised to provide a master Dynamic Host Configuration Protocol (DHCP) server and/or time server for the network 1920. In some embodiments, multiple switches can be used. In an example video wall 205 in which the total required bandwidth, for all displayed videos, does not exceed 10 Gb, the one or more video servers 1910 may be linked to a single 10 Gb switch. This is then linked via a single 10 Gb link to a similar switch, to which all video clients 1915*a-d* are connected. For large or complex video walls 1905, multiple switches could be configured, with each switch being connected to a subset of the displays 1905*a-d*. In some embodiments in which multiple switches are used, each switch is located physically near the video clients 1915*a-d* and/or video servers 1910 to which it is connected. The switches may then be connected to each other via a fast interconnection, such as a fibre interconnection. In such examples, it is preferable for the interconnection to be capable of supporting non-blocking usage over all connected ports. The interconnection should preferably be capable of handling the greater of the total video client 1915*a-d* bandwidth and the total video server 1910 bandwidth.

As a further example of network hardware, in embodiments in which the required bandwidth is beyond that of a single network cable, two or more cables could be configured to send and/or receive data from/to the video server 1910. As an example a given video client 1915*a-d*, using two connections, could alternate requests across both connections. The video server 1910 would receive requests on either port and perform the same steps regardless which port a pixel block request arrived on. This configuration is particularly advantageous in embodiments where the resolution of the source image frame data is higher than the display resolution, as it allows a higher resolution video frame to be displayed on the video wall 1905.

Alternatively or additionally, two or more connections could be used to send video frame data to a given video client 1915*a-d*. Such a configuration is particularly useful in embodiments such as control rooms, wherein multiple lower resolution videos are displayed on a single display, as this configuration allows a higher resolution display to be used since more pixel block data can be retrieved by a given video client 1915*a-d* from the video servers 1910.

A further advantage of the use of two connections to video clients 1915*a-d* and/or video servers 1910 is that such a system could, in response for example to a network issue, use only one of the two connections. Such a system thus provides redundancy in case of network faults. As an example, when both links from a video server 1910 are in use, video frame data could be transmitted at a lower compression ratio and when a single link is in use, video frame data could be transmitted at a higher compression ratio. Switching between these modes of operation may be triggered by automated sensing of a network issue, for example by further network hardware such as a network controller.

Figure 20:
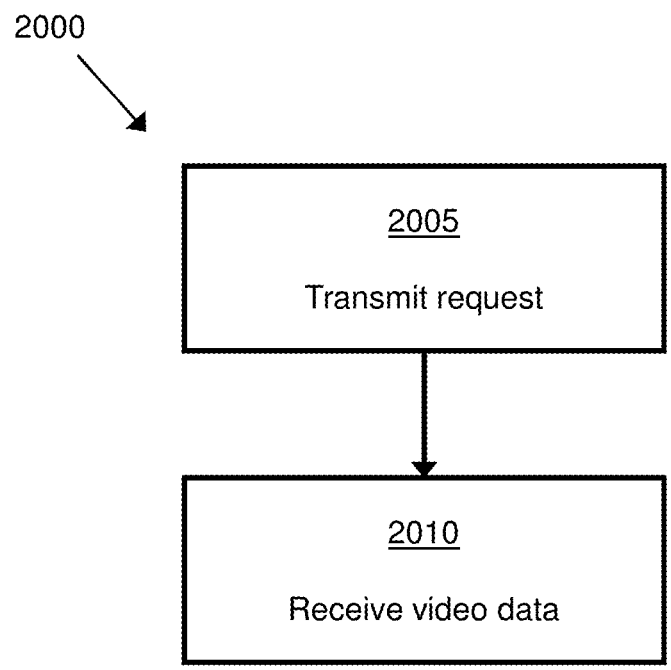
FIG. 20 shows a schematic representation of a method in a video client according to an embodiment of the second aspect of the invention.

FIG. 20 shows a schematic representation of a method 2000, in a video client, for acquiring video data for display on a display of a video wall according to a first aspect of the present disclosure. The method 2000 comprises a transmitting step 2005 of transmitting a video frame data request to a video server. The request is for a portion of a video frame, and the portion is associated with the particular display of the video wall.

The method then comprises a receiving step 2010 of receiving video frame data from the video server. The received video frame data comprises a portion of video frame data based on the requested video frame data.

Figure 21:
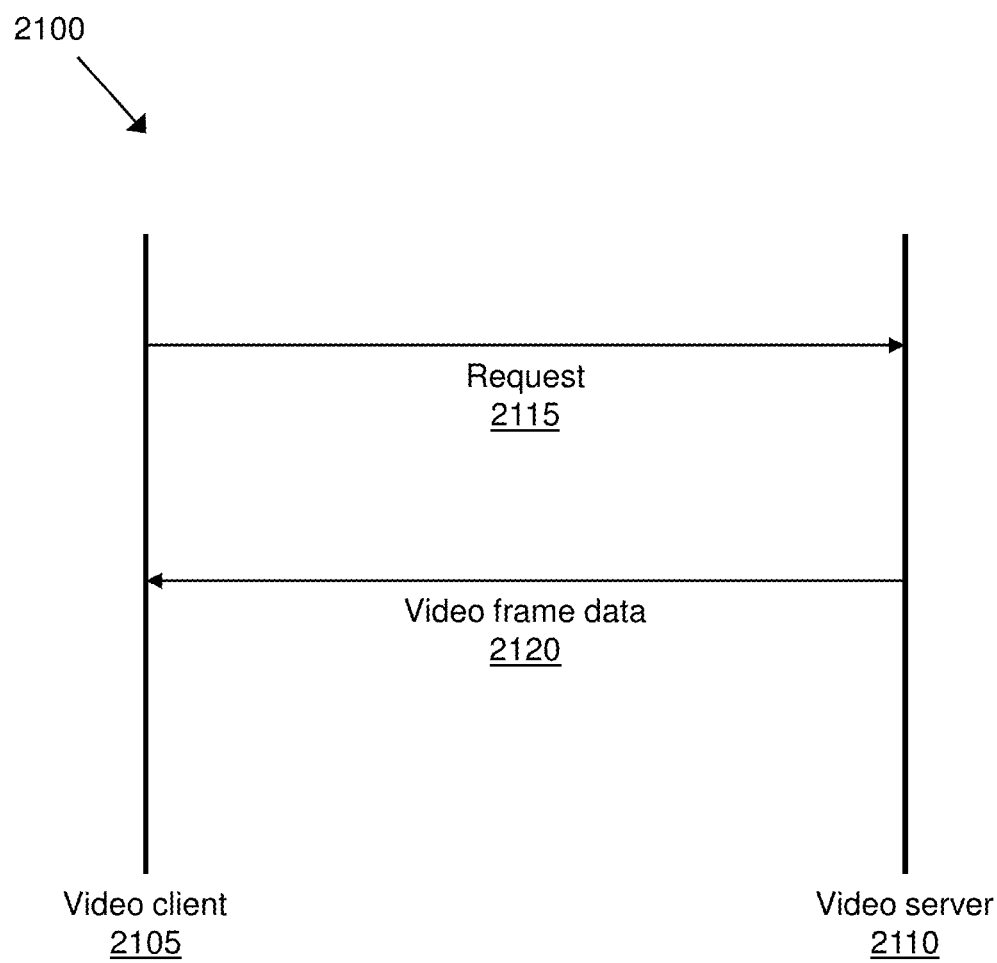
FIG. 21 shows a schematic representation of a method of video frame data transmission in a video wall system according to an embodiment of the second aspect of the invention.

FIG. 21 shows a schematic representation of a similar method 2100 of video frame data transmission in a video wall system. The system, as described above in connection with FIGS. 20 and 21, comprises a plurality of video clients wherein each video client is associated with a corresponding display of the video wall. The method comprises data flow between a given video client 2105 of the plurality of video clients, and a video server 2110.

The video client 2105 transmits to the video server 2110 a video frame data request 2115. The request, as set out above, is for a portion of a video frame, where the portion is associated with the corresponding display of the video wall.

Responsive to receiving a said request from a given video client 2105, the video server 2110 transmits, to the video client 2105, video frame data 2120. As set out above, the video frame data comprises a portion of video frame data based on the requested portion.

Figure 22:
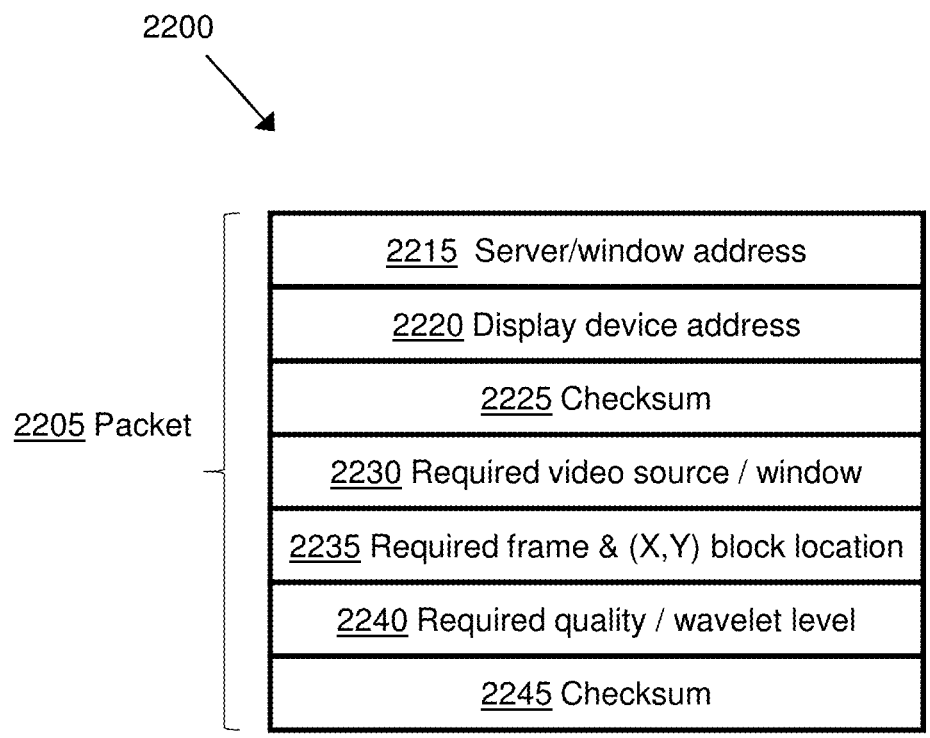
FIG. 22 shows a schematic representation of a request data packet according to an embodiment of the second aspect of the invention.

FIG. 22 shows a schematic representation of a request data packet 2205 that is transmitted from a video client to a network switch according to an embodiment.

The packet 2205 comprises a server address 2215, for example an IP address, of the source of the video data, for example a video server, to which the request relates.

The packet 2205 comprises a display device address 2220 of the video client from which the request originates.

The packet 2205 comprises a checksum 2225 to enable the network switch, or the video source, to detect errors in the packet 2205. For example, as described in relation to FIG. 5, the checksum may comprise the 16-bit one's complement of the one's complement sum of the entire packet 2205.

The packet 2205 comprises a required video source 2230 information, for example the video frame data requested by the video client.

The packet 2205 then comprises a required video frame and (X,Y) block location 2235 of the requested video frame data.

The packet 2205 may comprise a field 2240 specifying the required quality of the video frame, for example a particular resolution depth, or the wavelet level of the video frame.

The packet 2205 finally comprises a checksum 2245 to enable the network switch, or the video source, to detect errors in the packet 2205.

A network switch is configured to route the request data packet 2205. The network switch receives each video frame data from each video source and forwards each video frame data to the video client that has requested the video frame data.

Figure 23:
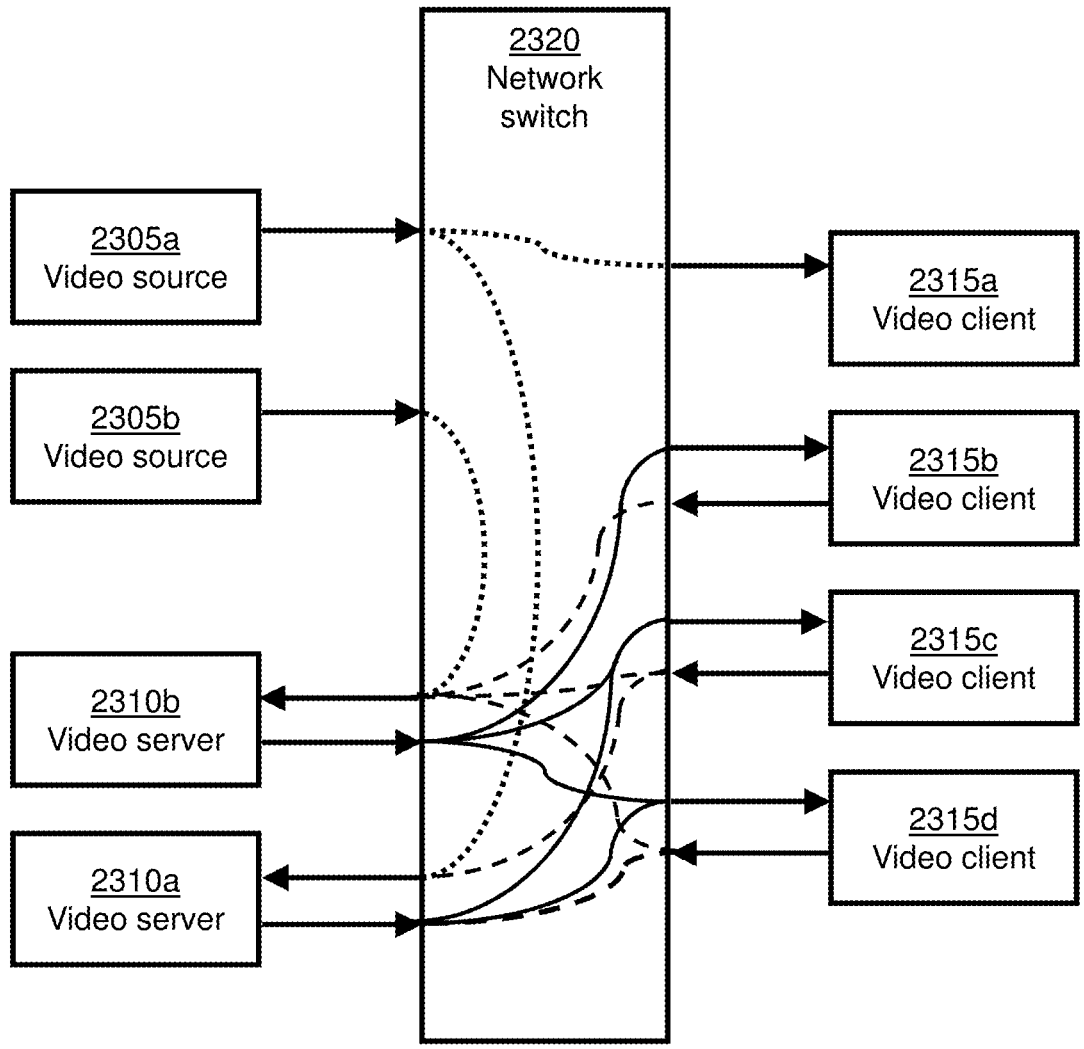
FIG. 23 shows an example of data flow in a video wall system according to an embodiment of the second aspect of the invention.

FIG. 23 shows an example of data flow in a video wall system. The system comprises video sources 2305*a,b*, video servers 2310*a,b* and video clients 2315*a-d*, connected to each other by a network switch 2320. Video frame data from video source 2305*b* is for display on displays associated with video clients 2315*b-d*, and video frame data from video source 2305*a* is for display on displays associated with video clients 2315*a*, 2315*c* and 2315*d*.

Dotted lines within the switch 2320 indicate data flow from video sources 2305*a,b*. Video source 2305*a* provides multicast video frame data to video server 2310*a*, and video source 2305*b* provides multicast video frame data to video server 2310*b*. Additionally, video source 2305*a* is configured to provide video frame data directly to video client 2315*a* without passing via a video server. As such, video client 2315*a* is not required to transmit any request for video frame data from video source 2305*a*.

Dashed lines within the switch 2320 indicate data flow from video clients 2315*b-d* to video servers 2310*a,b* in the form of requests for data. Specifically, video clients 2315*b-d* transmit requests for video frame data to video server 2310*b*, and video clients 2315*c,d* transmit requests for video frame data to video server 2310*a*.

Solid lines within the switch indicate data flow from video servers 2310*a,b* to video clients 2315*b-d*. Responsive to receiving the aforementioned requests, video server 2310*b* transmits different unicast video frame data, based on each request, to the corresponding video client 2315*b-d*. Simi- larly, responsive to receiving its requests, video server 2310*a* transmits different unicast video frame data, based on each request, to the corresponding video client 2315*c,d*.

Figure 24:
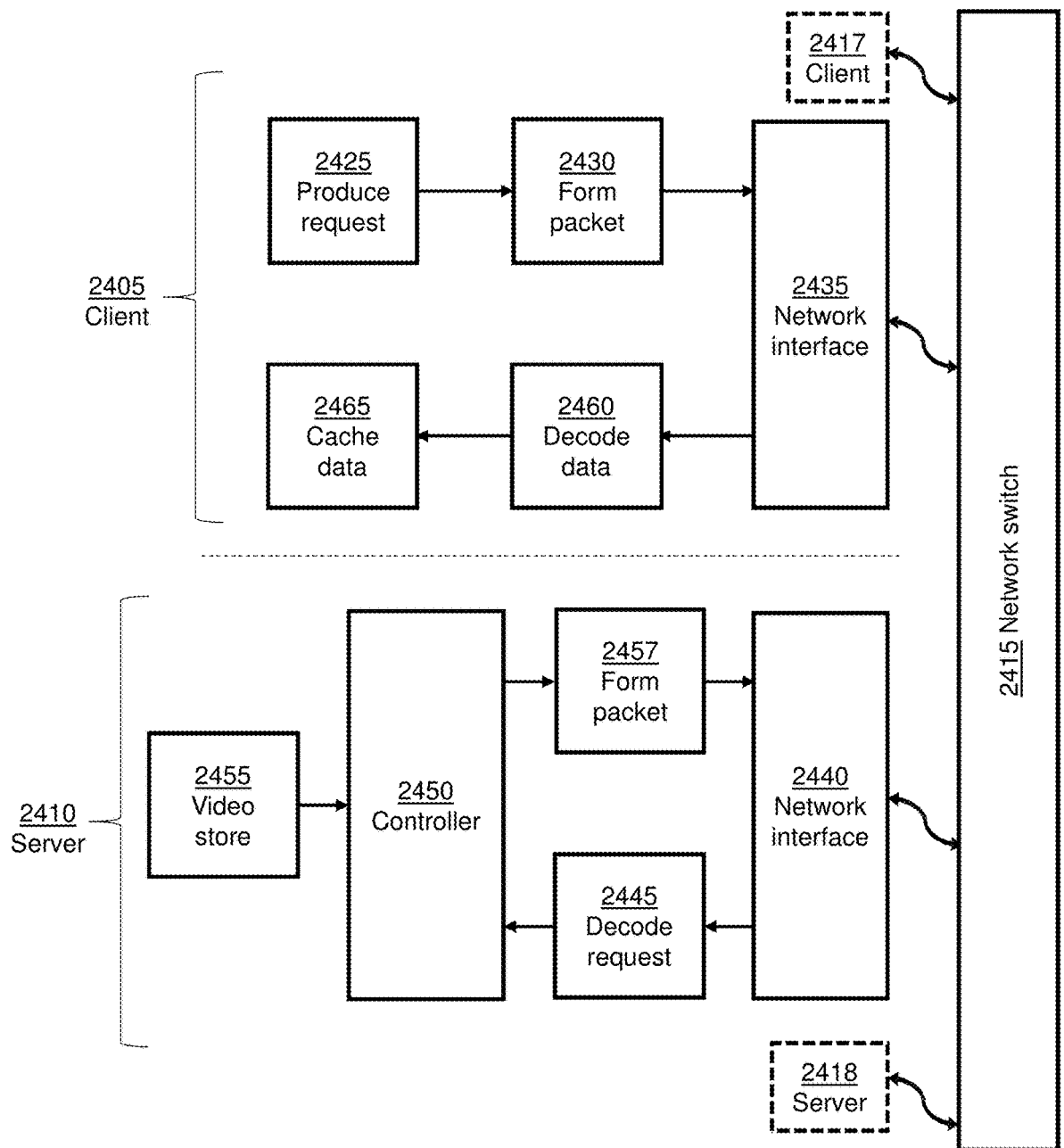
FIG. 24 shows an example of data flow in a video wall system according to an embodiment of the second aspect of the invention.

FIG. 24 shows an example of data flow in a video wall system, according to an embodiment. Steps 2405 are performed by a video client, and steps 2410 are performed by a video server. The client and server are connected by a network switch 2415. Further video clients 2417 and video servers 2418 may also be connected via the network switch 2415, as set out in FIG. 23 by way of example.

At 2425, the video client produces a video frame data request, the request being for a portion of a video frame, wherein the portion is associated with its corresponding display as described above. A network packet, for example an Internet Protocol (IP) packet is then formed, at 2430, including the request. The packet is transmitted via a network interface at 2435, over the network 2415, to a network interface of the video server at 2440. The request is then decoded at 2445, so as to identify the requested video frame data. Based on the decoded request a controller 2450 of the server retrieves the requested video frame data from a video store at 2455. The video store may for example be a memory or other storage that holds video data. The controller 2450 then forms at 2457 a network packet or packets including the retrieved video frame data. In some examples, forming the packet at step 2457 comprises compressing the retrieved video frame data. In other examples, the video is stored as compressed video frame data, such as a compressed version of each video frame. In such examples, the controller at 2450 may retrieve the compressed video frame data and form the packet or packets directly from this.

In some embodiments wherein image frame data is requestable in fixed-size blocks, each block may be stored separately compressed.

Although the blocks may be compressed using, for example, JPEG compression, such a compression algorithm would potentially cause spikes in the data rate over the network for example where a series of detailed blocks is transmitted in succession, as efficient JPEG compression relies on some areas of a compressed image having little detail and thus being highly compressed. A discrete cosine transform compression algorithm with a fixed compressed size per compressed block of data is particularly advantageous in the present system, because it ensures minimal variability in the data rate over the network. Such an algorithm may for example be based on a modification of the discrete cosine transform algorithm that is used in JPEG compression, to remove higher frequencies more harshly and to give more colour depth to less detailed areas. A constant compressed size per block ensures that the network data rate is more easily monitored to ensure that network capacity is not exceeded.

The packet is transmitted via the network interface at 2440, over the network 2415, to the network interface of the video client at 2435. The client decodes at 2460 the received video frame data. Where the video frame data is received as compressed video frame data, decoding the data at 2460 will also comprise decompressing the received data. Following decoding, the client caches 2465 the decoded data for display.

In some embodiments, requests for video frame data comprise an indication of desired video quality. The video frame data transmitted from the server to the client then comprises video frame data at the desired video quality. The desired video quality may comprise a desired degree of video compression. Alternatively or additionally, the desired video quality may comprise a desired video frame resolution and/or a desired bit depth. Where provision of video frame data at the desired resolution would exceed the available network bandwidth, the degree of compression may be increased.

In some embodiments where video data is to be displayed at a resolution below the resolution of the source video, the video client may request video frame data at that lower resolution, and the video server can respond with video data at the corresponding lower resolution as will be described below in more detail. This can occur when a relatively high resolution video needs to be displayed on a relatively small region of a display, or the display itself is low resolution. The benefit of sending just the lower resolution video data is a reduction in the required network bandwidth. Another benefit is that it eliminates the need for the video client to downscale received video from the full resolution, which reduces the degree of processing that must be performed by the video client. In some examples, the video quality is defined by additional network components, such as a network controller, for example to control the utilisation of network bandwidth.

In some examples, where downscaled video frame data is required, the video server performs this downscaling as and when video frame data is requested, when forming network packets at 2457. In an alternative example, video data is stored in the video store 2455 at different downscaling ratios, for example 100%, 75%, 50% and 25%, or 100%, 50% and 25%, or 100%, 50%, 25% and 12.5%. Video data at each downscaling ratio is then available from the video store 2455 for access by the video server. This may be referred to as pre-scaling since the data is available in the downscaled form even before a request is made by the video client. The controller 2450 thus retrieves the appropriately downscaled video frame data based on the desired degree of downscaling, and transmits that video frame data to a video client as required.

The provision of multiple scaled streams from the video sources may be provided using different approaches. Two such approaches are described with reference to FIGS. 25 to 34 in the section of the description below entitled 'Multiple Scaled Streams'.

As an example, video data may be stored in the video store 2455 as luma-chroma (YCrCb) colour space data, with each component transmitted separately to a given video server. Different chroma subsampling/downscaling schemes may be applied to the YCrCb data, such as 4:2:2 and 4:2:0. The video client may request video frame data with a particular subsampling scheme.

For continuity, FIG. 13 is now described in relation to the distributed aspect of the present invention according to one embodiment. FIG. 13 shows a table of example pixel rates of video data of various bit depths at various resolutions with corresponding data rates required to transmit uncompressed video data at each resolution with various subsampling schemes. For example, a data rate of 0.69 Gbit/s may be required for a video server to provide uncompressed 720p60 video frame data to a video client. Such data transmission could thus be performed via a 1 Gb non-blocking network switch. As noted above, the overall bandwidth of video frame data requested from a video server will not be significantly higher than the bandwidth required for transmitting a single version of the video frame data, regardless of how many displays the video frame is spread across. The aforementioned 1 Gb non-blocking network switch would thus be usable regardless of how many video servers or video clients operate on the network, and regardless of how many different videos are simultaneously displayed on the video wall.

Conversely, if a video server could provide video at 4k60 resolution and each video client could output 1080p60 video to its corresponding display, the system may be configured such that the video server compresses video using a 4:1 compression scheme. A network switch with a 10 Gb connection for the or each video server, and a 1 Gb connection for each video client, may be used. From the table in FIG. 13 it may be seen that uncompressed 4k60 video, using a 4:4:4 sampling scheme with a bit depth of 8 bits, would require a data rate of 12.4 Gbit/s. If compressed at a 4:1 ratio this would require a quarter of that, i.e. 3.1 Gbit/s into the network switch. Given four video client, each video client would then extract 1080p60 video data at a quarter of 3.1 Gbit/s i.e at around 0.78 Gbit/s.

Previously described above according to one embodiment of the multicast aspect of the present invention, FIG. 6 is now described according to one embodiment of the distributed aspect of the invention. FIG. 6 shows a schematic representation of a video source 600 according to one embodiment, from which a video server can receive video frame data. The source 600 comprises various modules. Any or all of these modules could, either alone or in any combination, be implemented by dedicated circuitry, for example one or more field-programmable gate arrays, or be implemented by routines in one or more general processors. The source 600 may be a dedicated video source device. Alternatively, the source 600 may be implemented within another device such as a general-purpose computer.

The source 600 comprises an input 605 to receive video data, for example from a storage medium such as a hard disk or solid-state memory, or from a live video feed. The input may for example comprise an HDMI or VGA interface.

Video frame data may be received, and subsequently processed and transmitted to a video server, as line-by-line video frame data. Alternatively, for example in embodiments wherein blocks of video frame data are to be requestable by a video client, received line-by-line video frame data may be converted by a module of the video source to block-by-block video frame data. As an example of such a conversion, four lines of video frame data may be cached and, from this, 4×4 blocks of video frame data may be determined. Similarly, eight lines of video frame data may be cached and, from this, 8×8 blocks of video frame data may be determined.

The source comprises a sampling rate and colour conversion module 610, configured to convert the received video to a data rate and/or colour space that is suitable for providing over a network to a video server.

The source 600 comprises a scaling module 615 for downscaling the video data. The scaling module 615 may for example perform block-based downscaling, downscaling each block of video frame data to provide multiple streams, each having a different overall downscaling factor and/or chroma subsampling scheme. The downscaled block data is stored in a block memory 620.

The source 600 comprises an encryption module 625, configured to encrypt the downscaled video frame data into a format suitable for transmission via the network to the video server.

The source 600 comprises a control processor 630 configured to control an ethernet controller 635 to transmit the encrypted video frame data to the video server.

Figure 25:
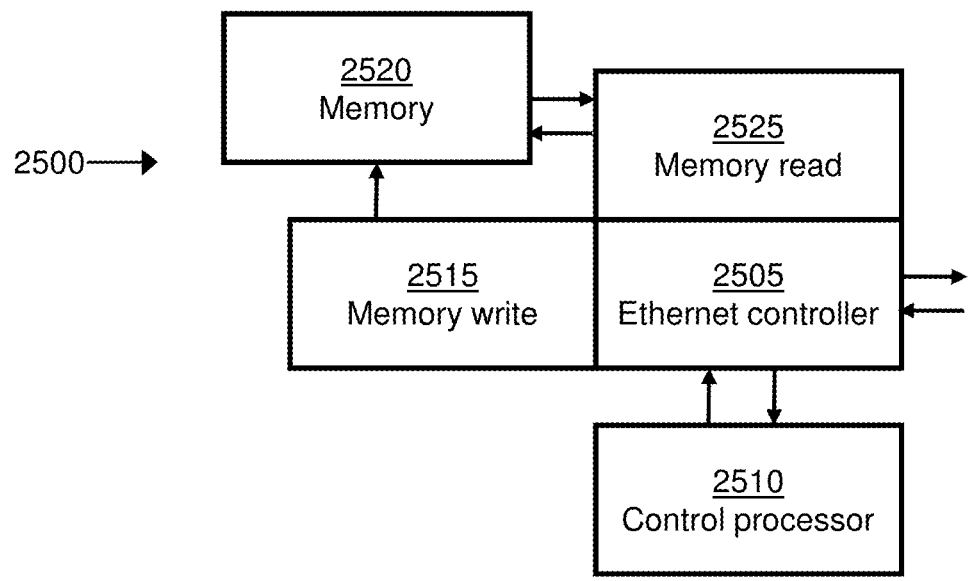
FIG. 25 shows a schematic representation of a video server according to an embodiment of the second aspect of the invention.

FIG. 25 shows a schematic representation of a video server 2500 according to one embodiment, configured to retrieve video frame data from a video source and transmit video data to one or more video clients. The server 2500 comprises various modules. Any or all of these modules could, either alone or in any combination, be implemented by dedicated circuitry, for example one or more field-programmable gate arrays, or be implemented by routines in one or more general processors. For example, the server 2500 may be a Network Attached Storage (NAS) PC server. Alternatively, the server 2500 may share storage with an SSD-driven PC.

The server 2500 comprises an ethernet controller 2505 controlled by a control processor 2510 and configured to receive video frame data from a video storage and to receive requests for video frame data from one or more video clients.

The server 2500 comprises a memory write module 2515 configured to write the received video frame data to a video memory 2520, which may for example be DDR3 SDRAM memory.

As noted above, in embodiments wherein blocks of video frame data are to be requestable by a video source, video frame data may be received from the video source as block-by-block video frame data. Alternatively, video frame data may be received from the video source as line-by-line video frame data and converted by the video server 2500 to block-by-block video frame data. In some examples, block-by-block video frame data is stored such that a given block is stored in successive memory locations of a bank of the memory 2520, with adjacent blocks being stored in different banks of the memory 2520. A given block can thus be rapidly read out from a bank of the memory 2520. Adjacent blocks are likely to be requested in succession, and this arrangement facilitates rapid access to adjacent blocks as one bank of the memory 2520 can be read while another is being opened or closed. An example of such block-based storage is described in more detail in European patent EP2446413B1, the contents of which is incorporated herein by reference.

For example, the received video frame data may comprise multicast streams of 8×8 pixel blocks in varying resolutions.

The server 2500 comprises a memory read module configured to receive a request for video frame data, and to read from the memory 2520 video frame data corresponding to the request. That video frame data is then provided via the ethernet controller 2505 to the video client from which the request was sent.

Previously described above according to one embodiment of the multicast aspect of the present invention, FIG. 8 is now described according to one embodiment of the distributed aspect of the invention. FIG. 8 shows a schematic representation of a video client 800 according to some embodiments. The video client 800 is associated with a display of a video wall.

The video client 800 comprises a network interface 805 and a processor 810 coupled to the network interface. The processor 810 is configured to transmit a video frame data request, via the network interface 805, to a video server. The request is for a portion of a video frame, the portion being associated with the display.

The processor 810 is further configured to receive video frame data, via the network interface 805, from the video server. The received video frame data comprises a portion of video frame data based on the requested video frame data.

Previously described above according to one embodiment of the multicast aspect of the present invention, FIG. 9 is now described according to one embodiment of the distributed aspect of the invention. FIG. 9 shows a schematic representation of a video client 900 according to an embodiment. The video client 900 comprises various modules. Any or all of these modules could, either alone or in any combination, be implemented by dedicated circuitry, for example one or more field-programmable gate arrays, or be implemented by routines in one or more general processors.

The video client 900 comprises an ethernet controller 905 controlled by a processor 910. The processor 910 is configured to determine a portion of video frame data to request, and to transmit a request for that video frame data, via the ethernet controller 905 to a video server, for example as described above.

The ethernet controller 905 is further configured to receive the requested video frame data from the video server.

The client 900 comprises a decryption module 915, which is configured to decrypt the received video frame data and decrypt it into a format suitable for further processing and display.

The client 900 comprises a pixel cache 920 in which decrypted video frame data is stored and from which video frame data is output to a display of the video wall.

The client 900 comprises a transform module 925, configured to apply transforms to the stored video frame data to produce video frame data suitable for display. For example, the transforms may comprise warping, rotating, up-scaling, down-scaling, de-interlacing and/or edge blending, depending on the desired display configuration of the video frame. Additionally, the transform module 925 may determine particular blocks to request, as described in more detail below, and transmit an identification of those blocks to the processor 910.

The client comprises a sync pulse generator 930 configured to provide a synchronisation signal for synchronising the outputting of video frame data with the refresh rate of the display.

FIG. 10 shows a schematic representation of a video wall 1000. Display 1005a of the video wall displays a region of video frame 1010. In an embodiment, a mapping is determined of at least one pixel of the display to a location in the video frame. Requested portions of a video frame each comprise at least one block of pixels, wherein each block of pixels corresponds to said location in the video frame. For example, pixels in the bottom-right quarter of the display 1005a map to positions on the top-left quarter of the video frame 1010. Based on the mapping, it is thus determined that the top-left quarter of the video frame 1010 should be requested.

In some examples, the mapping is such that a given requested block of pixels is displayed on a block of pixels of the display, the block of pixels of the display having the same dimensions as the requested block of pixels. In other examples, the mapping is such that a given requested block of pixels is displayed on a block of pixels of the display, with pixel values of the block of pixels of the display being determined by interpolating between pixel values of the requested block of pixels. For example, the video frame data may be displayed with a rotation angle with respect to the display such that a single pixel of the display does not correspond to a single pixel of received video frame data. In such a case, the pixel values of the display are determined by interpolating between pixel values of the received video frame data.

Each request may define a requested portion based on a position of a block of pixels within the video frame. In one example, as mentioned above, video frame data is requestable in fixed-size blocks of predefined spatial dimensions such as 8×8 pixel blocks. A sufficient number of these blocks are requested such that the combined requested blocks include at least the required top-left corner of the video frame 1010. The request may define the requested portion based on, for example, horizontal and vertical co-ordinates of each block and/or an index number or other identifier associated with each block. In alternative embodiments the request defines the requested portion based on a specific pixel coordinate or coordinates; the video server then retrieves video frame data corresponding to the requested pixels and converts this to block-based video frame data.

Previously described above according to one embodiment of the multicast aspect of the present invention, FIG. 11 is now described according to one embodiment of the distributed aspect of the invention. FIG. 11 shows a schematic representation of a mapping as described above, according to an example. A canvas 1105 is defined. The canvas 1105 is a virtual area in which windows 1110, 1115 are positioned. Each window 1110, 1115 represents a video served by a video server, and by analogy the window also represents a video frame of the video. An area 1120 of the canvas 1105 corresponds to a display, such that portions of windows 1110, 1115 that fall within the display area 1120 are displayed at pixels in corresponding regions of the display.

The video client maps each pixel of the display 1120 to a corresponding position on the canvas 1105. From this, the video client maps each of said positions on the canvas to a position in each relevant window. For example, a pixel 1123 of the display maps onto a corresponding position in window 1115, and a pixel 1125 of the display maps onto corresponding positions in both window 1110 and window 1115. A pixel 1130 does not map onto a corresponding position in any window. The "positions" referred to above may be defined by horizontal and vertical co-ordinates on the display, the canvas and/or the video frame.

As outlined above, video frame data is requestable in blocks of pixels, for example fixed-size 8×8 pixel blocks, examples of which are represented in FIG. 11 as dotted squares within each window 1110, 1115. The video client may determine and request blocks that include the aforementioned positions in each window. For example, pixel 1123 maps to a position within block 1135 of window 1115; the video client would thus request this block. Pixel 1130 does not correspond to a position within any window; therefore, no request would be sent based on this pixel.

Pixel 1125 maps to a position within window 1115 and also to a position within window 1110. The video client determines which window 1110, 1115 should be displayed at this position. In one example, each window 1110, 1115 has an associated layer number and the window 1110, 1115 with the highest layer number being displayed in such overlapping regions. In the present example, window 1110 has a higher layer number than window 1115. Pixel 1125 maps to block 1140 within window 1110, and thus the video client requests this block. Window 1110 and thus block 1140 is rotated at an angle with respect to display. As such, once video frame data relating to this block has been received, the video client may interpolate between pixel values of the block to determine corresponding display pixel values, based on the rotation angle.

Figure 26:
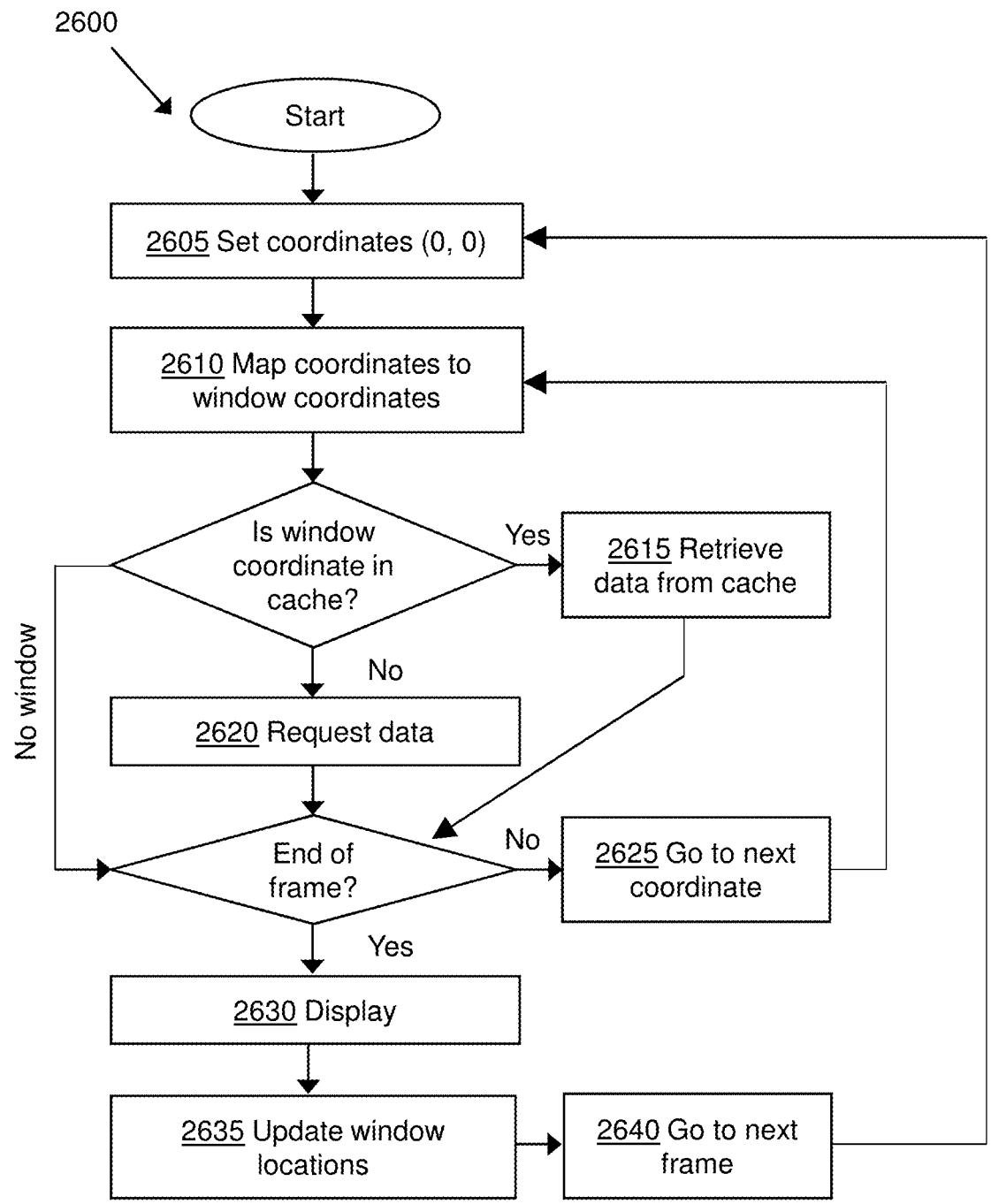
FIG. 26 shows an example process for mapping between a display and a video window according to an embodiment of the second aspect of the invention.

FIG. 26 shows an example procedure 2600 for generating requests for video data using the mapping approach discussed above, in accordance with one embodiment.

At step 2605, the display coordinates are set to (0, 0) which may for example represent the top-left pixel of the display.

At step 2610, the display coordinates are mapped to window coordinates as outlined above in relation to FIG. 11. In other words, this step in the procedure determines which particular window is to be displayed at that pixel of the display (if any), and for that particular window, what coordinates of the window are relevant for that pixel of the display.

If no window is to be displayed at the (0, 0) pixel, the flow proceeds to determining whether the end of the frame has been reached.

If a window is to be displayed, the procedure determines whether video frame data corresponding to the determined window coordinates have already been received and cached at the video client. For example, a block comprising the window coordinates may already have been requested and received by the video client. If such video frame data is in the cache, the video frame data is retrieved from the cache at step 2615.

If the video frame data is not in the cache, a video frame data request for that video frame data is transmitted at step 2620. The requested video frame data is then received and cached. The pixel value at the display coordinates is then determined and stored in a display buffer. The step of determining the pixel value may for example comprise interpolating between window pixel values as described above in relation to FIG. 11.

The procedure then determines if all pixels of the display have been accounted for i.e. whether the end of the display frame has been reached. If the end of the frame has not been reached, the procedure moves to step 2625 in which display coordinates are updated to the next coordinates of the display, and the flow returns to mapping the new display coordinates to window coordinates at step 2610. In this manner, the procedure can be repeated pixel-by-pixel across the display, determining a mapping of each display pixel to corresponding window coordinates, and making requests for video frame data accordingly. The repeat loop for cycling through the pixels of the display may, for example, correspond to a scan of pixels across a first line of the display, followed by a scan of pixels across a second line of the display and so on. Hence, the procedure can perform a raster-like scan across the pixels of the display.

If the end of the display frame has been reached, the procedure moves to step 2630. In step 2630, the buffered display pixel values for the complete frame are output to the display.

The positions of the window(s) on the canvas are then updated at step 2635, preferably within a vertical blank of the canvas frame. The positions of the windows may, for example, be updated based on a time-based movement of the windows across the display and/or a sudden appearance, disappearance or reconfiguration of a window or windows on the video wall.

Finally, the flow proceeds at step 2640 to the next video frame, whereby the display coordinates are reset to (0, 0) at 2605, and the aforementioned steps of the procedure repeated for the next frame and so on.

In an alternative procedure to FIG. 26, the display of buffered display pixel values may occur before the end of the frame, for example, on a line-by-line or pixel-by-pixel basis.

Previously described above according to some embodiments of the multicast aspect of the present invention, FIG. 10 is now described according to some embodiments of the distributed aspect of the invention. Returning to FIG. 10, in some embodiments, a display 1005b of the video wall 1000 displays portions of two video frames of different videos 1010, 0215. As mentioned above, video frame data for the second frame 1015 may be provided from a different video server to the video frame data for the first frame 1010, or from the same video server. In some of these embodiments, the video client corresponding to the display 1005*b* transmits a second video frame data request to either the same video server as that of the first video frame 1010, or to a second video frame server, as appropriate. The second request is for a portion of the second video frame 1015 associated with the display 1005*b*. That video client then receives second video frame data from the video server to which the second video frame data request was sent, the received second video frame data comprising a portion of second video frame data based on the requested second video frame data. In other words, the process described herein for requesting and receiving video frame data for a single frame may be analogously repeated for any number of further portions of frames to be displayed on a given display.

Multiple Scaled Streams

FIGS. 27 to 35 relate to the provision of multiple scaled streams and efficiencies that are described in relation to the first and second aspects of the present invention.

Figure 27:
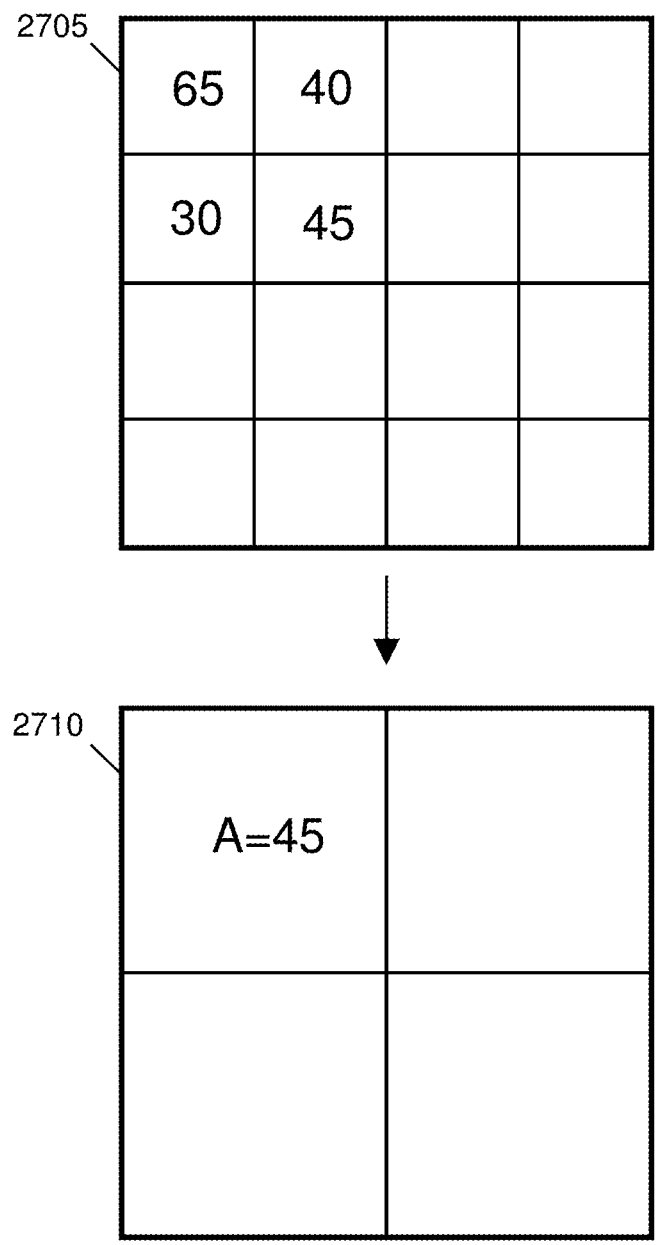
FIGS. 27 to 30 show example methods of downscaling video data.

As explained above, videos or video steams can be thought of as a sequence of individual still images which are often referred to as video frames, and each image or video frame consists of a number of pixels arranged in a grid of horizontal rows and vertical columns FIG. 27 shows a simplified video frame 2705 consisting of 4 horizontal rows and 4 vertical columns. The video frame therefore has a resolution of 4×4 with 16 pixels in total. For a colour video frame, each pixel may have 3 colour component values that each range from 0 to 255 i.e. an 8-bit value. The range of values is often referred to as the colour depth, with 8-bit, 10-bit, and 12-bit colour depths being typical colour-depths used in current video. The component values may represent the colours red (R), green (G), and blue (B). The 4×4 grid of pixels can therefore be divided into a 4×4 grid of red pixels, a 4×4 grid of green pixels, and a 4×4 grid of blue pixels. Alternatively, the component values may represent luminance (Y), blue-difference chroma (Cb), and red-difference chroma (Cr). In this case, the 4×4 grid of pixels can be divided into a 4×4 grid of Y pixels, a 4×4 grid of Cb pixels, and a 4×4 grid of Cr pixels.

Because each pixel is represented by component values, the more pixels in an image, the larger the number of values, and the larger the number of bits needed to represent the video frame. Accordingly, the number of bits needed to represent a video frame can be reduced by lowering the resolution of the video frame. The second video frame 2710 in FIG. 27 shows a 2×2 video frame which is half the resolution of the 4×4 video frame 2705, and requires only a quarter of the number of bits to represent it.

The process of lowering the resolution of a video frame and the associated video stream is known as downscaling. For example, the video frame 2705 in FIG. 27 is downscaled to a half-resolution video frame 2710. The process of downscaling involves combining component values of pixels in the original video frame to determine the component values of each pixel in the downscaled video frame. In the example shown in FIG. 27, the luminance component value for the 4 pixels in the top left portion of video frame 2705 are shown. The corresponding pixel in the downscaled image is shown in the top left corner of video frame 2710, and the luminance component A is calculated by summing the luminance components 65, 40, 30, 45 to give a summed value 180 and then dividing by the number of pixels 4 to give the pixel value 45.

The half resolution video frame 2710 can be further downscaled by a half, resulting in a quarter resolution image which will be just a single pixel value.

Following this principle, a 4K high-definition video stream with a resolution of 3840 (horizontal)×2160 (vertical) can be downscaled to a half resolution version with a resolution 1920×1080 (also known as 1080p HD video) which in turn can be downscaled to a quarter resolution version with a resolution 960×540, and an eighth resolution version 480×270. The lower resolution versions of the 4K video stream can be sent and viewed on equipment that may not be capable of sending or viewing 4K video. Furthermore, the lower resolution video streams can be used to conserve bandwidth in a video system since the bit-rate for these lower resolution versions is significantly less than the original 4K video stream.

An alternative way of reducing the bit-rate of a video stream is by selectively reducing the resolution of particular pixel components of the video frame. In particular, this process is known as chroma subsampling when the video components consist of luminance (Y), blue-difference chroma (Cb), and red-difference chroma (Cr).

Figure 28:
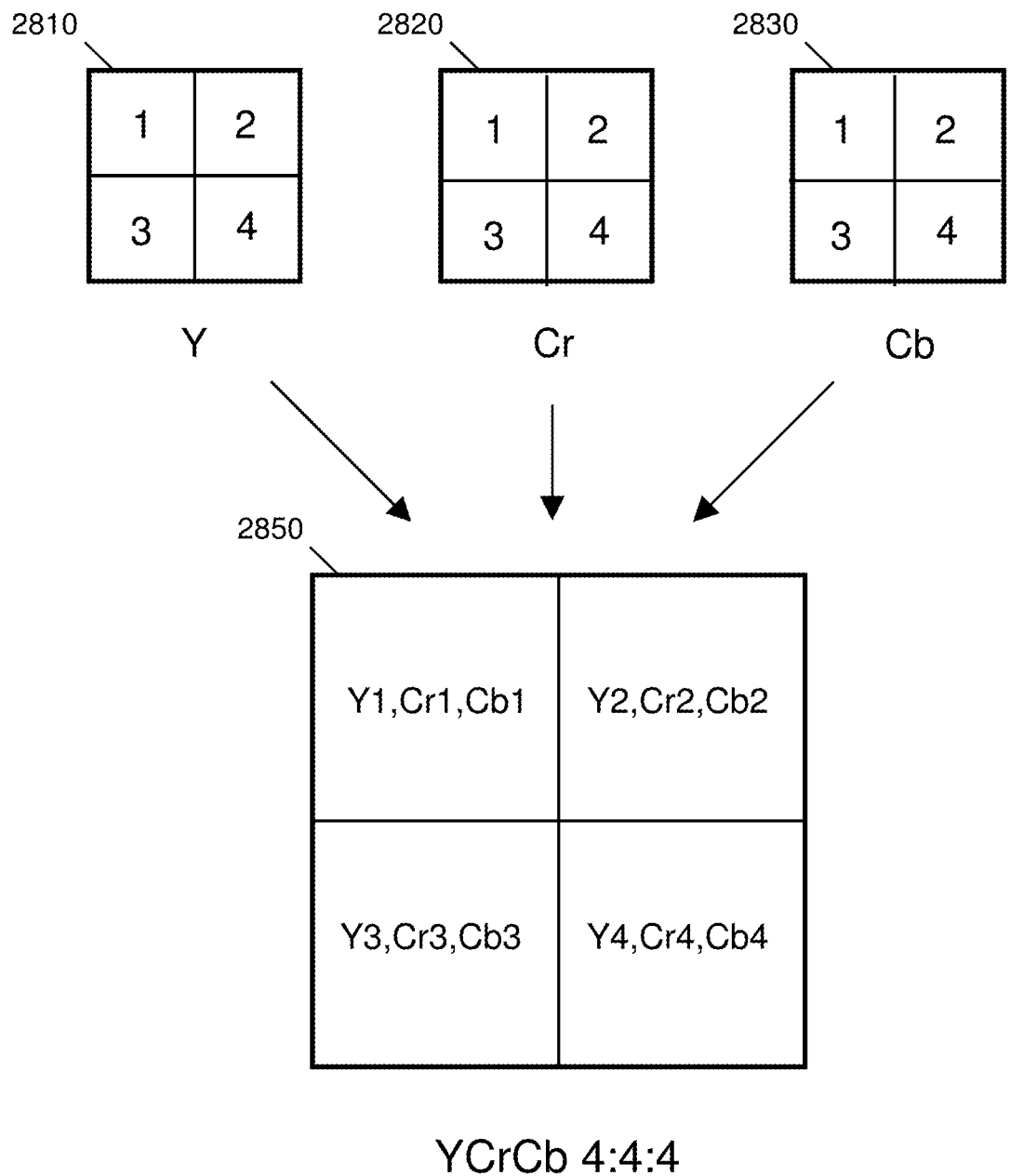

FIG. 28 shows a simple 2×2 video frame comprising a 2×2 Y pixel grid 2810, a 2×2 Cr pixel grid 2820, and a 2×2 Cb pixel grid 2830. The pixel values are labeled 1, 2, 3, and 4 for each grid. The overall 2×2 pixel grid 2850 comprises a combination of the values from each of the component grids so that the sets of pixel values consist of (Y1, Cr1, Cb1), (Y2, Cr2, Cb2), (Y3, Cr3, Cb3), and (Y4, Cr4, Cb4). When all the components share the same resolution like this, the video is known as a YCrCb 4:4:4 video stream.

Figure 29:
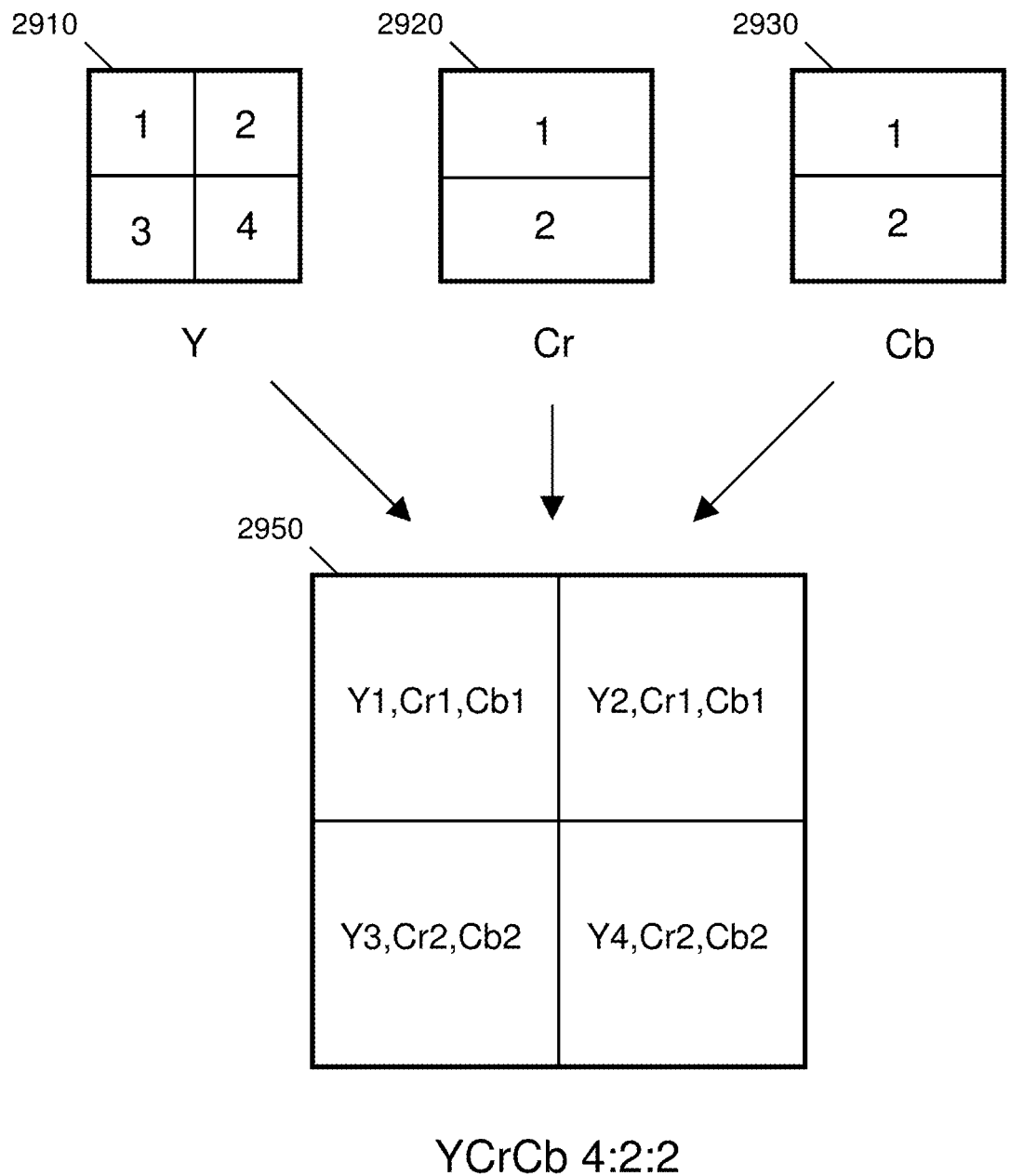

FIG. 29 shows a second simple 2×2 video frame comprising a 2×2 Y pixel grid 2910, a 1×2 Cr pixel grid 2920, and a 1×2 Cb pixel grid 2930. The pixel values are labeled 1, 2, 3, and 4 for the Y grid and just 1 and 2 for the Cr and Cb grids. The overall 2×2 pixel grid 2950 comprises a combination of the values from each of the component grids so that the sets of pixel values consist of (Y1, Cr1, Cb1), (Y2, Cr1, Cb1), (Y3, Cr2, Cb2), and (Y4, Cr2, Cb2). When the Cr and Cb components have a half resolution in just the horizontal direction, as in this example, the video is known as a YCrCb 4:2:2 video stream.

Figure 30:
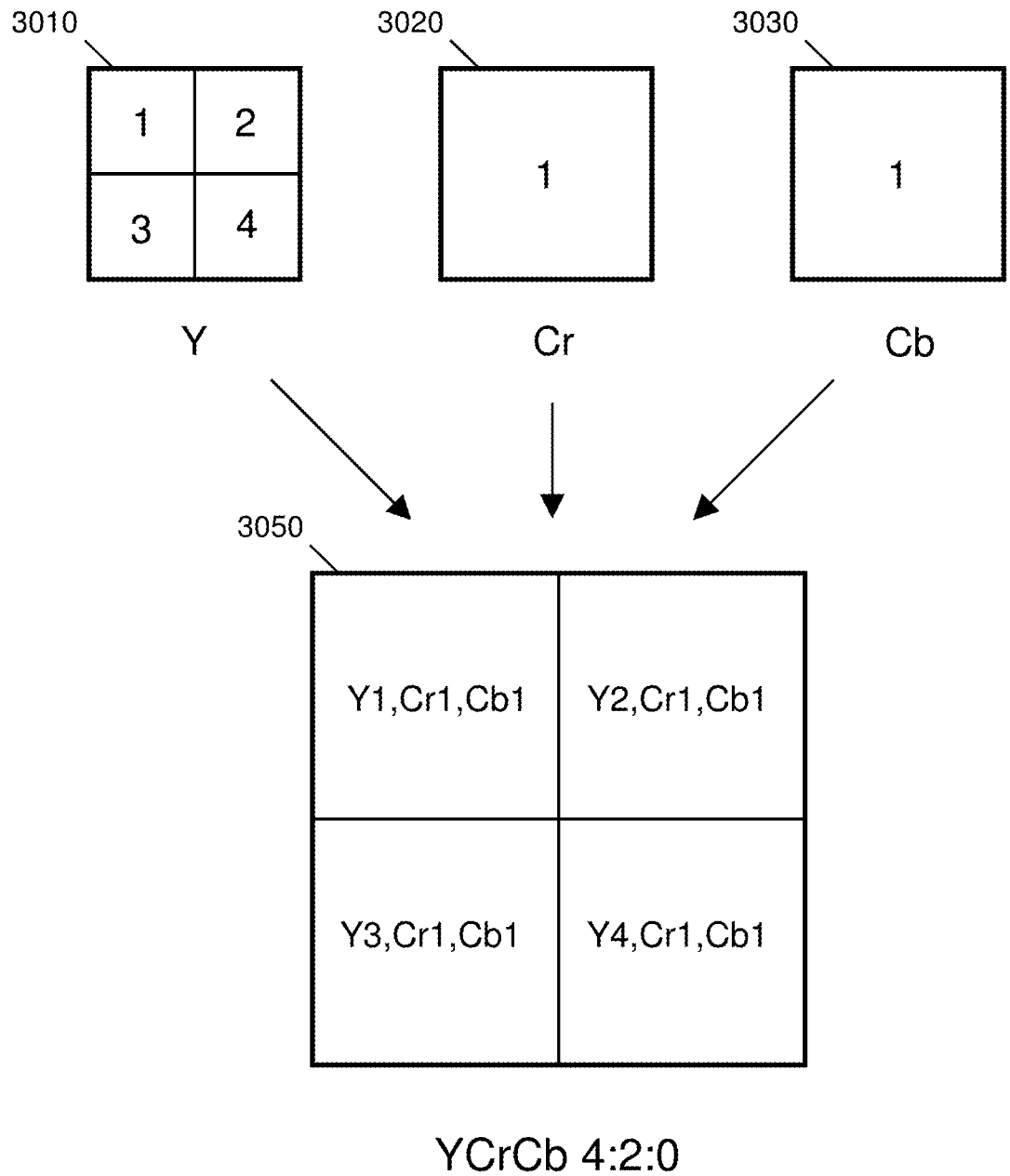

FIG. 30 shows a third simple 2×2 video frame comprising a 2×2 Y pixel grid 3010, a single Cr pixel 3020, and a single Cb pixel 3030. The pixel values are labeled 1, 2, 3, and 4 for the Y grid and just 1 for the Cr and Cb pixels. The overall 2×2 pixel grid 3050 comprises a combination of the values from each of the component grids so that the sets of pixel values consist of (Y1, Cr1, Cb1), (Y2, Cr1, Cb1), (Y3, Cr1, Cb1), and (Y4, Cr1, Cb1). When the Cr and Cb components have a half resolution in both the horizontal and vertical direction, as in this example, the video is known as a YCrCb 4:2:0 video stream.

When sending video between components of a video system, it is often useful to provide the video at various downscaled resolutions and/or with different chroma subsampling versions. In this way, the sending component can provide video at different quality and bit-rates, and different destination components can receive video at their desired quality without having to downscale themselves.

According to a first approach, an original video stream can be downscaled by a component of a video system into half, quarter, and eighth resolution video streams. Each of the 4 video streams can then be multicast separately by the sending component.

According to an alternative novel approach, the video frame can be sent in multiple parts, including one part which is a true downscaled version of the video frame, and other parts which when processed together with the downscaled part can provide other, gradually higher resolutions of the video frame. By processing all the parts together, it is possible to reproduce the original video frame.

In other words, the novel approach involves sending a video image in multiple parts, whereby the most basic part is of very low resolution, then other parts with gradually higher resolution (and with gradually increasing bandwidth) add more detail until the last part 'fills-in' the last missing parts of the video image. The parts are then sent as separate video streams. The gradually higher resolution parts or streams may not repeat information that has already been sent from the lower-resolution streams. Instead, they may supplement the information from the lower resolution stream or streams in order to provide information needed to build a higher resolution version.

If the streams according to this novel approach are multi-cast on a network, then receiving devices can subscribe to only the streams that they want in order to receive a video of the desired quality. The approach therefore enables receiving devices to selectively choose the relevant streams that correspond to the desired resolution of video for display including, in some cases, the desired chroma subsampling format. By doing so, the system makes efficient use of bandwidth to the receiving device since the combined bit-rate of the lower resolution streams may not exceed the bit-rate of the original video frame.

The bandwidth required for sending the partial video streams according to the novel approach over a single connection is equal to the sum of the bit-rates for each of the partial video streams. Likewise, the bandwidth required for sending the various standalone downscaled video streams according to the first approach over a single connection is equal to the sum of the bit-rates for each of the downscaled video streams.

Ideally, the bandwidth requirement for the partial video streams according to the novel approach will be lower than the bandwidth requirement for sending the various standalone downscaled video streams according to the first approach. Also, the bandwidth requirement for the partial video streams according to the novel approach will ideally not significantly exceed the bandwidth requirement for streaming the full resolution video stream as will be explained in more detail below. However, if no downscaling is provided from a sending component of the system, i.e. only the full resolution video stream is multicast, then a relatively high bandwidth usage on the network connection will result, and the receiving devices may then be required to downscale the received full resolution video stream.

If the video image is broken-up into different colour components, specifically YCrCb, then the Y, Cr and Cb components could be sent separately, with each component being sent as multiple resolution partial video streams. Thus a 4:2:2 YCrCb image could be received from a full 4:4:4 YCrCb image by only subscribing to half horizontal resolution streams of the Cr and Cb components—saving about 20% of the bandwidth normally required for a 4:4:4 image. Similarly, a 4:2:0 YCrCb image could be received from a full 4:4:4 YCrCb image by only subscribing to half resolution (i.e. half horizontal and half vertical) streams of the Cr and Cb components—saving about 40% of the bandwidth normally required for a 4:4:4 image.

For example, a 4k resolution, 60 frame per second, 4:4:4 YCrCb 24-bit video, when placed onto a network, will require around 12.4 Gbits/s of bandwidth. However, a receiving device with an SDI output might only support a 4:2:2YCrCb format. Hence, the receiving device might subscribe to the full Y resolution streams but just the lower resolution Cr and Cb streams and thereby reduce the overall bit-rate to around 9.8 Gbits/s (and may permit the video to be sent on a single 10Gb ethernet connection instead of two 10Gb ethernet connections).

In another example, the receiving device may include an HDMI output that only supports 4k resolution, 60 frame per second, 4:2:0 YCrCb 24-bit video. In this case, instead of receiving the whole 4:4:4 resolution video and processing it down to the HDMI output, the receiving device could subscribe to the full resolution Y streams and just the half resolution Cr and Cb streams, thereby reducing the bandwidth requirement from 12.4 Gbits/s to around 7.5 Gbits/s.

Where a single source is multicasting the aforementioned streams of data, any outputs can effectively avoid the need to down-scale the image by only subscribing to the necessary streams—thus avoiding some image processing and excess bandwidth in the process. This is especially true of a multi-viewer, where a single video image on a display is replaced by multiple smaller resolution video images arranged side-by-side on the display. For example, a 2×2 arrangement of 4k60 images, each having been down-scaled to half resolution in the horizontal and vertical directions in order to fit into a single 4k60 output, would normally require the bandwidth for all four original 4k60 video frames to be received. By just subscribing to the lower half resolution streams of all four videos, the resulting bandwidth and processing is greatly reduced.

Another benefit is where a temporary network failure results in the loss of data packets. For a normal image transmission system, this might result in a section of the image being missing or badly corrupted. When sent as partial streams, the bad packets can be ignored and the image partly restored from the good packets—giving only a reduction in image quality on the affected area.

A further benefit is when a cross-fade is required on an output—where two live video sources are faded between, so that at the mid-point both are visible as a 'dissolve' effect. Normally this would require twice the bandwidth of a single video feed to be sent and for the output to product the cross-fade. But by altering the stream subscription during the fade (reducing the outgoing image quality/resolution whilst the incoming image quality/resolution is increased) the bandwidth requirement can be kept to around the same level as that of a single video feed. Generally a fade or dissolve is done quite quickly to prevent this being noticed—and since the outgoing image's quality reduction occurs as it becomes less visible this should prevent the quality reduction from being a perceptable problem for a viewer.

The novel approach for encoding and sending partial video streams will now be described with reference to the example shown in FIGS. 31 to 34.

Figure 31:
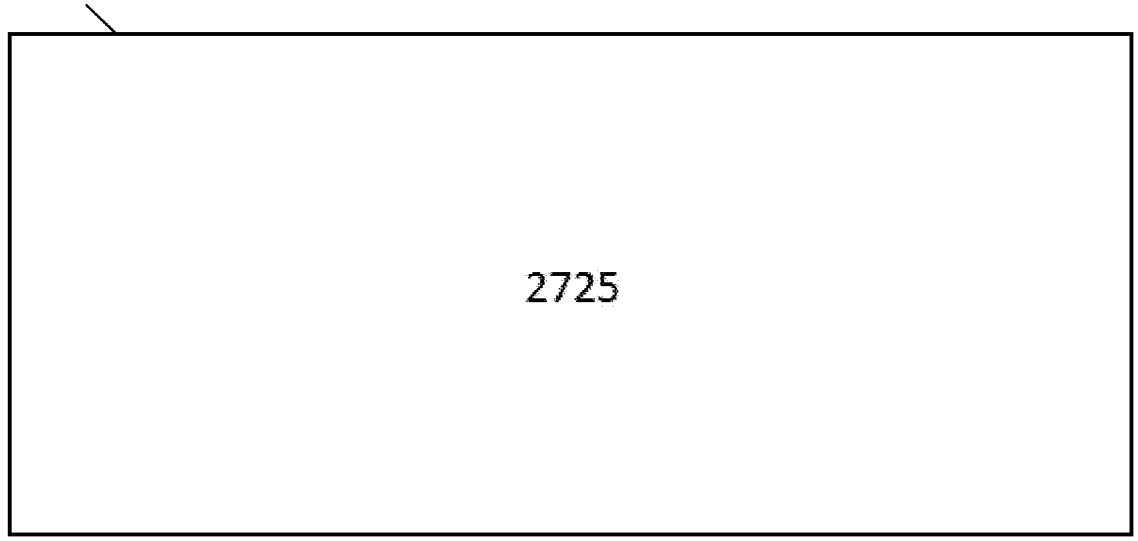

Referring first to FIG. 31, there is shown an 8×8 video frame 3110 with 8 rows and 8 columns containing in total 64 pixel values. This grid of pixels may represent a particular colour component of the video such as a R, G, B, Y, Cr, and/or Cb component.

Each pixel value may range from 0 to 255 which corresponds to an 8-bit pixel depth. Therefore, 512 bits (8×64) would be required to represent this colour component of the video frame. For a video frame containing three such colour components, the total number of bits for the video frame would be 1536 bits (3×512).

The video frame 3110 can be encoded in parts represented by the downscaled video frame 3120, and the 6 partial video frames 3210, 3220, 3310, 3320, 3410, and 3420.

The downscaled video frame 3120 (known as "H3V3") is an accumulated total of all the pixel values from the original video frame 3110, and so effectively gives a 'pixel' value as if the pixels were down-scaled to ⅛th horizontally and vertically (although with greater colour depth). Since the original pixels are 8-bit values, then this accumulated value would need to be 14-bits in size, since it might need to store a minimum value of 0, and a maximum value of 64*255=16,320 (note: 2'14=16,384).

Figure 32:
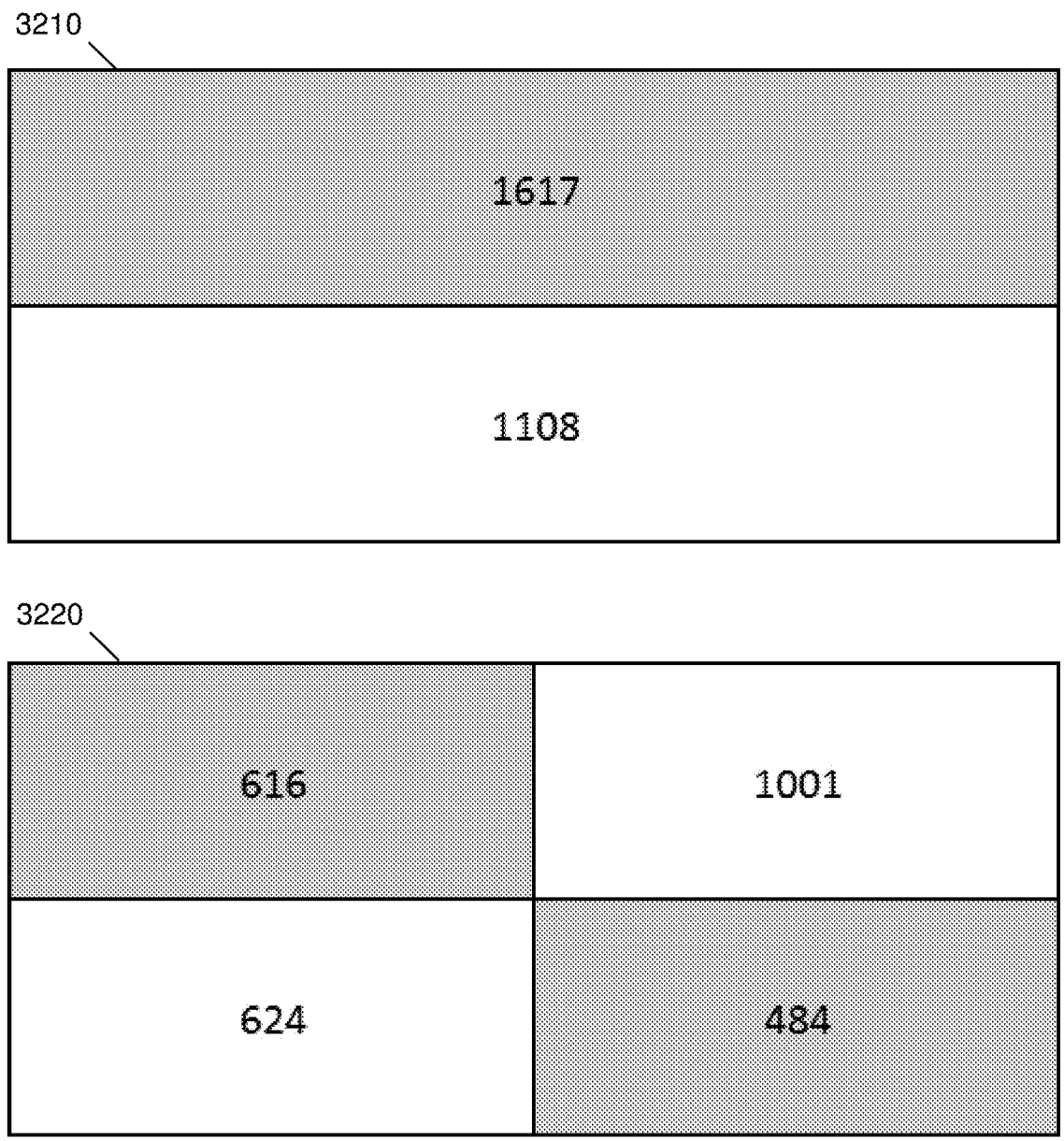
Figure 33:
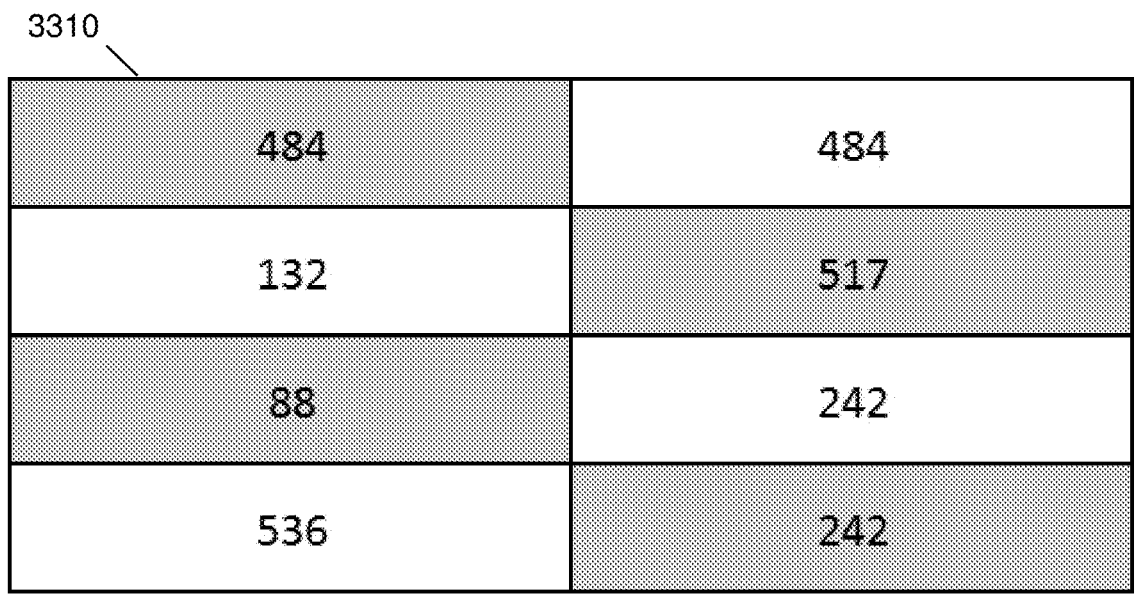
Figure 33:
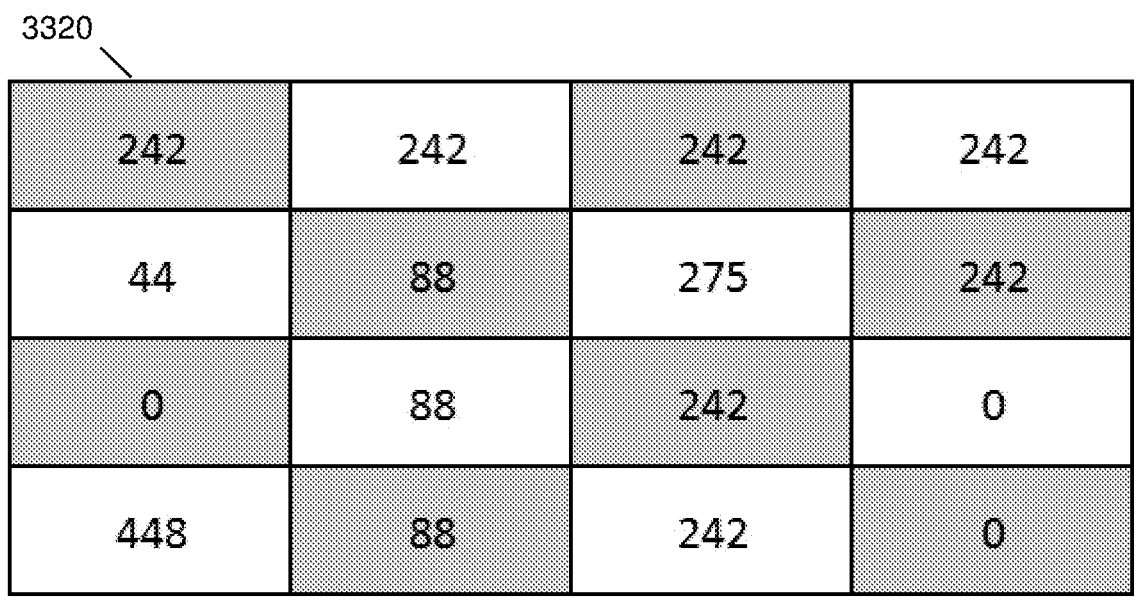

The first partial video frame 3210 (known as "V2") is shown in FIG. 32, and comprises a single pixel value of 1,617 calculated by the accumulated total of all the pixels in the upper 4 rows of the 8×8 block of pixels 3110, and needs to be a 13-bit value.

In all the partial video frames, the pixel value or values stored and sent are just the values shown in grey highlighting in the Figures. The other values are values that would make up the video frame at a particular resolution (or subsampling format), and can be derived from a combination of the downscaled video frame 3120 and other partial video frames.

Taking the video frame 3210, the value of the lower pixel 1108 can be calculated by simply subtracting the upper pixel value from the pixel value 2725 from the downscaled video frame 2020. i.e. 2725−1617=1108.

The next partial video frame 3220 (known as "H2") has two values stored and sent 616 and 484 (highlighted in grey), each being 12-bits in size, and each representing the total of values for a 4×4 block of pixels of the original video frame. The 2 other 4×4 blocks of pixels can have their total worked out using simple subtraction e.g. 616 was sent for the upper-left 4×4 block, and hence the upper-right block must therefore be 1,617 −616=1,001. H2 effectively represents an image than has been down-scaled to ¼th in the horizontal and vertical directions.

The remaining partial video frames 3310 ("V1"), 3320 ("H1"), 3410 ("V0") and finally 3420 ("H0") are all sent in similar ways, with half the values being sent and the other half derivable from lower-resolution streams. The bit-depth required also reduces to 11-bits for V1, 10 bits for H1, 9 bits for V0 and finally 8-bits for the H0 stream.

The pixel values sent in H2, V1, H1, V0, and H0 are all arranged in a checkerboard pattern. Alternative patterns may be used without deviating from the general concept. The use of a checkerboard pattern is preferred as it helps improve interpolation of data should lower-resolution streams become corrupted or are missing.

Efficiency

Since the lower-resolution accumulated values in the streams 3120, 3210, 3220, 3310, 3320, 3410, and 3420 can be quite large compared to the values of the original pixels in the video frame 3110, they require sending using more bits than the original 8 bit single-pixel values.

The additional number of bits needed to enable the transmission of lower resolution information can be referred to as the overhead.

In the example of FIGS. 31 to 34, the original video frame is represented by 512 bits (64×8).

The number of bits required for each of the 7 streams 3120, 3210, 3220, 3310, 3320, 3410, and 3420 are as follows:

H3V3 520 requires 1×14=14 bits.
V2 610 requires 1×13=13 bits.
H2 620 requires 2×12=24 bits.
V1 710 requires 4×11=44 bits.
H1 720 requires 8×10=80 bits.
V0 810 requires 16×9=144 bits.
H0 820 requires 32×8=256 bits.

The total bits required for all 7 streams is therefore 575 bits (14+13+24+44+80+144+256). This represents an overhead of 63 bits compared to the original video frame, which is around 12% in addition to the original 512 bits and represents a bandwidth efficiency of 89%.

For higher original colour bit-depths, the resulting bandwidth efficiency improves, as detailed in the table in FIG. 35 which shows the bandwidth efficiencies for 8-bit, 10-bit, 12-bit, and 16-bit original video frame colour depths.

These values demonstrate that the ability to encode and send multiple resolution streams does not increase bandwidth significantly over sending just the original video frame.

If the first approach is used for sending the original video frame together with half, quarter, and eighth standalone downscaled streams, the total number of bits required would be much greater. For example, the 8×8 video frame 3110 in FIG. 31 would be represented by 512 bits, while the half resolution version would be 128 bits (16×8), the quarter resolution 32 bits (4×8), and the eighth resolution 8 bits (1×8). This gives a total number of 680 bits (512+128+32+8) which corresponds to an overhead of 168 bits. This overhead is significantly greater than the overhead provided by the novel approach of 63 bits. At the same time, the downscaled streams would not provide the half horizontal resolution video frames that are beneficial for chroma subsampling format transmissions.

Examples

The following are examples of how a video receiving device can subscribe to the video streams encoded using the novel approach.

For a subscribing receiver to receive the chroma subsampling format 4:2:0 equivalent of an 8-bit video image at full resolution, the Y component would need to receive all of the 7 Y component H3V3, V2, H2, V1, H1, V0, H0 streams. However, the Cr and Cb components do not require the Cr/Cb component H0 or V0 streams, just the Cr/Cb component H3V3, V2, H2, V1, H1 streams. Hence of the original 3×512=1536 bits of information, only 575+175+175=925 bits need to be received. This is 60.2% of the original bandwidth.

To receive a chroma subsampling format 4:2:2 equivalent of an 8-bit video image at full resolution, the Y component would again need to receive all of the 7 Y component H3V3, V2, H2, V1, H1, V0, H0 streams. However, the Cr and Cb components do not require the Cr/Cb component H0 stream, just the Cr/Cb component H3V3, V2, H2, V1, H1, V0 streams. Hence of the original 3×512=1536 is reduced to 575+319+319=1213 bits. This is 79.0% of the original bandwidth.

For a video system to display, on a single monitor, a small preview window of each video source would normally require a special (separate) video stream to be sent from each source (since receiving a full-resolution for all sources, and downscaling them, would be very difficult). But with the suggested mechanism that video 'preview' window is already available as the H3V3 stream, which is a single 14-bit value representing a ⅛th scaled block of 8×8 pixels, being 2.7% of the original image's bandwidth. Hence, it would be possible to display around 40 times the number of images to be sent instead of sending them in their original resolution.

The lower-resolution streams to do not need to stop at H3V3 (the lowest resolution above). Further lower resolutions could be offered when starting from a larger original video frame block such as 16×16.

An alternative to the above method may involve sending all the pixel values for the H2 video frame 3220 and omitting the video frames H3V3 and V2. However, this would only offer very slightly better efficiency (reducing the 575 bits down to 572, for 512 bits of data).

The method described here is most suited to loss-less transmission of video data, although it may be possible to add further compression techniques to the individual streams.

Methods of the present disclosure may be implemented by way of a non-transitory computer-readable storage medium comprising a set of computer-readable instructions stored thereon which, when executed by at least one processor, cause the at least one processor to perform a method according to the present disclosure. The computer readable instructions may be retrieved from a machine-readable media, e.g. any media that can contain, store, or maintain programs and data for use by or in connection with an instruction execution system. In this case, machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read only memory (ROM), an erasable programmable read-only memory, or a portable disc.

The above embodiments are to be understood as illustrative examples of the two aspects of the invention. Further embodiments of the invention are envisaged. For example, the display devices may be video projectors used for projection mapping. In such embodiments, it may be desirable to mask certain areas of a given video frame such that no video data is displayed in those areas. Such a mapping may be defined by any of the video source, video output device (which may comprise a video client), and/or other networked components such as a projection mapping controller. In examples wherein the mapping is defined by the video output device (which may comprise a video client), a given video output device may subscribe to video frame data based on the mapping such that unneeded portions are not received.

For example, the video sources may be file servers. In such embodiments, the file servers may multicast the video frame data packet from either a static video image or a motion video image.

Further embodiments of the two aspects of the invention may be implemented with dedicated circuitry, for example discrete integrated circuits, one or more field-programmable gate arrays, software running on a central or graphics processing units, or in any combination of the examples described. In examples wherein such embodiments comprise of a graphics processing unit, the implementation may be spread over many multiple parallel processing units. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method for encoding a frame of original video data by a component of a video system into a plurality of frames for inclusion in video streams of different spatial resolutions, the method comprising:
   dividing the original frame of original video data into grids each grid containing a predetermined number of pixel values;
   summing pixel values within each of the grids of pixel values to form a total pixel value for each grid of pixel values;
   encoding the total pixel values to form a downscaled frame;
   encoding the original pixel values in each of the plurality of grids of pixel values to form a higher resolution frame, wherein fewer than all the pixel values within each grid of pixel values are encoded in the higher resolution frame and a final pixel value of each grid that is not encoded is derivable using the encoded total value of a corresponding grid of the downscaled frame and the pixel values encoded in the grid of the higher resolution frame,
   wherein the method is a lossless encoding such that the downscaled frame and the higher resolution frame allow recreation of the original frame without loss.

2. A method according to claim 1 wherein the component of the video system is configured to form a downscaled frame that has a resolution that is at least one of a half, quarter or eighth resolution of the original video data.

3. A method according to claim 1, wherein the frame of original video data is a frame of original video data comprising a single colour component.

4. A method according to claim 3, wherein the single colour component is one of luminance, red-difference chroma and blue difference chroma.

5. A method according to claim 1, wherein one or more further downscaled frame is formed by dividing a preceding downscaled frame into grids each grid containing a predetermined number of pixel values;
   summing pixel values within each of the grids of pixel values of the preceding downscaled frame to form a total pixel value for each grid of pixel values; and
   encoding the total pixel values to form the further downscaled frame.

6. A method according to claim 5, comprising forming a final downscaled video frame that encodes an accumulated total of all the pixel values from the original video frame.

7. A method according to claim 1 further comprising forming a first video stream comprising the downscaled frame and forming a second video stream comprising the higher resolution frame.

8. A method according to claim 1 further comprising dividing each total pixel value by the number of pixels in the grid prior to encoding the total pixel values to form a downscaled frame.

9. A method for decoding a frame of video data by a component of a video system, the method comprising:
   obtaining downscaled video data for a downscaled frame, the downscaled video data encoding total values of pixels for grids of a higher resolution frame;
   obtaining enhanced video data for the higher resolution frame, the enhanced video data encoding fewer than all the pixel values that form the grids of the higher resolution frame; and
   determining pixel values for all pixels of a grid of the higher resolution frame by deriving at least one missing pixel value from the total pixel value of the corresponding grid of the downscaled frame and the pixel values of the grid encoded in the enhanced video data.

10. A component of a video system comprising a processor and a non-transitory computer-readable storage medium comprising a set of instructions that, when executed by the processor, cause the component to perform a method for encoding a frame of original video data into a plurality of frames for inclusion in video streams of different spatial resolutions, the method comprising:
dividing the original frame of original video data into grids each grid containing a predetermined number of pixel values;
summing pixel values within each of the grids of pixel values to form a total pixel value for each grid of pixel values;
encoding the total pixel values to form a downscaled frame;
encoding the original pixel values in each of the plurality of grids of pixel values to form a higher resolution frame, wherein fewer than all the pixel values within each grid of pixel values are encoded in the higher resolution frame and a final pixel value of each grid that is not encoded is derivable using the encoded total value of the corresponding grid of the downscaled frame and the pixel values encoded in the grid of the higher resolution frame
wherein the method is a lossless encoding such that the downscaled frame and the higher resolution frame allow recreation of the original frame without loss.

* * * * *